United States Patent
Hoff

(10) Patent No.: US 11,921,478 B2
(45) Date of Patent: Mar. 5, 2024

(54) SYSTEM AND METHOD FOR ESTIMATING PERIODIC FUEL CONSUMPTION FOR COOLING OF A BUILDING WITH THE AID OF A DIGITAL COMPUTER

(71) Applicant: Clean Power Research, L.L.C., Napa, CA (US)

(72) Inventor: Thomas E. Hoff, Napa, CA (US)

(73) Assignee: CLEAN POWER RESEARCH, L.L.C., Napa, CA (US)

( * ) Notice: Subject to any disclaimer, the term of this patent is extended or adjusted under 35 U.S.C. 154(b) by 1074 days.

(21) Appl. No.: 16/450,482

(22) Filed: Jun. 24, 2019

(65) Prior Publication Data
US 2019/0311283 A1     Oct. 10, 2019

Related U.S. Application Data

(63) Continuation of application No. 15/096,185, filed on Apr. 11, 2016, now Pat. No. 10,332,021, which is a (Continued)

(51) Int. Cl.
G05B 17/00     (2006.01)
G05D 23/00    (2006.01)
(Continued)

(52) U.S. Cl.
CPC ............. G05B 17/00 (2013.01); G05D 23/00 (2013.01); *F24F 2120/00* (2018.01);
(Continued)

(58) Field of Classification Search
CPC .......................... G06F 30/13; G06F 2119/08
See application file for complete search history.

(56) References Cited

U.S. PATENT DOCUMENTS 3,354,943 A     11/1967   Alden
3,923,038 A  *  12/1975   Cutchaw ................ F24S 10/75
                                                                          126/635
(Continued)

FOREIGN PATENT DOCUMENTS

AU     2011298219     3/2012
CN     102155358      8/2011
(Continued)

OTHER PUBLICATIONS

"1997 ASHRAE Handbook," "Chapter 28 Nonresidential cooling and heating load calculation procedures," 1997, ASHRAE, 65 pages (Year: 1997).*

(Continued)

*Primary Examiner* — Akash Saxena
(74) *Attorney, Agent, or Firm* — Leonid Kisselev

(57) ABSTRACT

A system and method to determine building thermal performance parameters through empirical testing is described. The parameters can be formulaically applied to determine fuel consumption and indoor temperatures. To generalize the approach, the term used to represent furnace rating is replaced with HVAC system rating. As total heat change is based on the building's thermal mass, heat change is relabeled as thermal mass gain (or loss). This change creates a heat balance equation that is composed of heat gain (loss) from six sources, three of which contribute to heat gain only. No modifications are required for apply the empirical tests to summer since an attic's thermal conductivity cancels out and the attic's effective window area is directly combined with the existing effective window area. Since these tests are empirically based, the tests already account for the additional heat gain associated with the elevated attic temperature and other surface temperatures.

16 Claims, 13 Drawing Sheets

Related U.S. Application Data continuation-in-part of application No. 14/664,742, filed on Mar. 20, 2015, now Pat. No. 10,467,355, which is a continuation of application No. 14/631,798, filed on Feb. 25, 2015, now Pat. No. 10,339,232.

(51) Int. Cl.
  *G06F 17/12* (2006.01)
  *G06F 30/13* (2020.01)
  *G06Q 10/04* (2023.01)
  *G06Q 50/06* (2012.01)
  *F24F 120/00* (2018.01)
  *G06F 111/10* (2020.01)
  *G06F 119/08* (2020.01)

(52) U.S. Cl.
  CPC .............. *G06F 17/12* (2013.01); *G06F 30/13* (2020.01); *G06F 2111/10* (2020.01); *G06F 2119/08* (2020.01); *G06Q 10/04* (2013.01); *G06Q 50/06* (2013.01)

(56) References Cited

U.S. PATENT DOCUMENTS

| | | | |
|---|---|---|---|
| 4,089,143 A * | 5/1978 | La Pietra | E06B 3/28 52/208 |
| 4,992,942 A * | 2/1991 | Bauerle | A01G 31/00 706/930 |
| 5,001,650 A * | 3/1991 | Francis | G01S 3/7864 348/169 |
| 5,177,972 A * | 1/1993 | Sillato | F25B 41/385 62/505 |
| 5,602,760 A * | 2/1997 | Chacon | G06V 10/255 342/159 |
| 5,803,804 A * | 9/1998 | Meier | F24F 11/63 454/256 |
| 6,134,511 A * | 10/2000 | Subbarao | G06F 30/13 703/1 |
| 6,148,623 A * | 11/2000 | Park | G01M 99/005 62/129 |
| 6,366,889 B1 * | 4/2002 | Zaloom | G06Q 10/06375 705/400 |
| 6,748,327 B1 * | 6/2004 | Watson | G01W 1/12 702/3 |
| 7,451,017 B2 * | 11/2008 | McNally | G06Q 50/06 700/278 |
| 7,742,892 B2 * | 6/2010 | Fromme | G01K 11/32 702/85 |
| 7,742,897 B2 * | 6/2010 | Herzig | H02J 13/00016 702/182 |
| 7,920,997 B2 * | 4/2011 | Domijan, Jr. | G01W 1/10 703/2 |
| 8,140,193 B2 * | 3/2012 | Lee | G06F 30/20 700/286 |
| 8,155,900 B1 * | 4/2012 | Adams | F24F 11/46 702/62 |
| 8,369,994 B1 * | 2/2013 | Rosen | F24F 11/62 700/277 |
| 8,370,283 B2 | 2/2013 | Pitcher et al. | |
| 9,007,460 B2 * | 4/2015 | Schmidt | H04N 13/204 348/143 |
| 9,020,650 B2 * | 4/2015 | Lutze | H02J 3/466 700/287 |
| 9,086,585 B2 * | 7/2015 | Hamada | H10K 59/12 |
| 9,098,876 B2 * | 8/2015 | Steven | G06Q 40/04 |
| 9,103,719 B1 * | 8/2015 | Ho | G01J 1/1626 |
| 9,134,353 B2 * | 9/2015 | Jia | G05B 15/02 |
| 9,171,276 B2 * | 10/2015 | Steven | G06F 17/10 |
| 9,286,464 B2 * | 3/2016 | Choi | G06F 21/36 |
| 9,524,529 B2 * | 12/2016 | Sons | G06Q 50/06 |
| 9,599,597 B1 | 3/2017 | Steele et al. | |
| 9,638,831 B1 * | 5/2017 | Hoff | G06Q 50/06 |
| 9,690,312 B2 * | 6/2017 | Steven | G06Q 50/06 |
| 9,772,643 B2 * | 9/2017 | Steven | G05B 13/026 |
| 9,880,230 B1 * | 1/2018 | Hoff | G06Q 10/04 |
| 10,024,733 B1 * | 7/2018 | Hoff | G01R 21/02 |
| 10,103,548 B2 | 10/2018 | He et al. | |
| 10,140,401 B1 * | 11/2018 | Hoff | G06F 30/20 |
| 10,156,554 B1 * | 12/2018 | Hoff | G06F 30/20 |
| 10,197,705 B2 * | 2/2019 | Hoff | G06Q 10/04 |
| 10,203,674 B1 * | 2/2019 | Hoff | F24F 11/46 |
| 10,309,994 B2 * | 6/2019 | Hoff | G06F 30/20 |
| 10,332,021 B1 * | 6/2019 | Hoff | G05D 23/00 |
| 10,339,232 B1 * | 7/2019 | Hoff | G06F 30/20 |
| 10,354,025 B1 * | 7/2019 | Hoff | G06F 30/20 |
| 10,409,241 B2 * | 9/2019 | Wartena | H02J 4/00 |
| 10,409,925 B1 * | 9/2019 | Hoff | G06F 30/20 |
| 10,436,942 B2 * | 10/2019 | Hoff | G06F 17/18 |
| 10,467,355 B1 * | 11/2019 | Hoff | G05B 15/02 |
| 10,503,847 B2 * | 12/2019 | Hoff | G05B 15/02 |
| 10,599,747 B1 * | 3/2020 | Hoff | G06F 17/18 |
| 10,627,544 B2 * | 4/2020 | Hoff | G06Q 10/04 |
| 10,651,788 B2 * | 5/2020 | Hoff | H02J 3/38 |
| 10,663,500 B2 * | 5/2020 | Hoff | G06F 17/16 |
| 10,670,477 B2 * | 6/2020 | Hoff | G01K 3/08 |
| 10,719,636 B1 * | 7/2020 | Hoff | G06Q 10/0631 |
| 10,719,789 B1 * | 7/2020 | Hoff | G06Q 50/06 |
| 10,740,512 B2 * | 8/2020 | Hoff | G06F 30/20 |
| 10,747,914 B1 * | 8/2020 | Hoff | G06F 30/20 |
| 10,789,396 B1 * | 9/2020 | Hoff | G06F 30/20 |
| 10,803,212 B2 * | 10/2020 | Hoff | G01J 1/42 |
| 10,963,605 B2 * | 3/2021 | Hoff | G06F 30/20 |
| 11,068,563 B2 * | 7/2021 | Hoff | G06F 17/18 |
| 11,238,193 B2 * | 2/2022 | Hoff | G06F 30/20 |
| 11,333,793 B2 * | 5/2022 | Hoff | G01W 1/12 |
| 11,416,658 B2 * | 8/2022 | Hoff | G06F 30/20 |
| 11,423,199 B1 * | 8/2022 | Hoff | G06F 30/13 |
| 11,649,978 B2 * | 5/2023 | Hoff | G05B 13/026 700/276 |
| 11,651,121 B2 * | 5/2023 | Hoff | F24F 11/62 703/2 |
| 2002/0055358 A1 * | 5/2002 | Hebert | H04L 67/04 455/67.11 |
| 2003/0201749 A1 | 10/2003 | Hossain et al. | |
| 2005/0055137 A1 * | 3/2005 | Andren | G06Q 30/02 700/291 |
| 2005/0095978 A1 | 5/2005 | Blunn et al. | |
| 2005/0222715 A1 * | 10/2005 | Ruhnke | F24F 11/30 237/2 A |
| 2007/0084502 A1 * | 4/2007 | Kelly | F24S 50/20 136/246 |
| 2007/0119718 A1 * | 5/2007 | Gibson | C25B 1/04 205/637 |
| 2007/0233534 A1 | 10/2007 | Martin et al. | |
| 2008/0258051 A1 * | 10/2008 | Heredia | H01L 31/0543 250/252.1 |
| 2009/0037241 A1 | 2/2009 | Olsen et al. | |
| 2009/0106079 A1 | 4/2009 | Gutlapalli et al. | |
| 2009/0125275 A1 * | 5/2009 | Woro | G06F 30/20 73/170.27 |
| 2009/0154384 A1 * | 6/2009 | Todd | H04W 28/02 370/311 |
| 2009/0217965 A1 * | 9/2009 | Dougal | H01L 31/0504 136/244 |
| 2009/0271154 A1 * | 10/2009 | Coad | G06F 30/13 703/1 |
| 2009/0302681 A1 * | 12/2009 | Yamada | H02J 7/35 700/286 |
| 2010/0070084 A1 | 3/2010 | Steinberg et al. | |
| 2010/0161502 A1 * | 6/2010 | Kumazawa | G06Q 30/018 705/317 |
| 2010/0188413 A1 * | 7/2010 | Hao | G06T 11/001 345/589 |
| 2010/0198420 A1 * | 8/2010 | Rettger | H02S 10/00 706/46 |
| 2010/0211222 A1 * | 8/2010 | Ghosn | G01K 17/00 702/182 |
| 2010/0219983 A1 * | 9/2010 | Peleg | G01K 13/00 340/870.16 |
| 2010/0263709 A1 | 10/2010 | Norman et al. | |

(56) References Cited

U.S. PATENT DOCUMENTS

| | | | |
|---|---|---|---|
| 2010/0309330 A1* | 12/2010 | Beck | G01W 1/10 348/222.1 |
| 2010/0324962 A1 | 12/2010 | Nesler et al. | |
| 2010/0332373 A1* | 12/2010 | Crabtree | G06Q 40/04 709/224 |
| 2011/0137591 A1* | 6/2011 | Ishibashi | G06Q 10/04 702/60 |
| 2011/0137763 A1* | 6/2011 | Aguilar | G06Q 30/0282 705/347 |
| 2011/0145037 A1 | 6/2011 | Domashchenko et al. | |
| 2011/0272117 A1* | 11/2011 | Hamstra | G06Q 50/06 165/185 |
| 2011/0276269 A1* | 11/2011 | Hummel | H02J 3/381 702/3 |
| 2011/0282504 A1* | 11/2011 | Besore | H02J 3/14 700/291 |
| 2011/0307109 A1* | 12/2011 | Sri-Jayantha | G06Q 10/04 700/291 |
| 2012/0065783 A1 | 3/2012 | Fadell et al. | |
| 2012/0066168 A1 | 3/2012 | Fadell et al. | |
| 2012/0078685 A1* | 3/2012 | Krebs | G06Q 10/06375 703/1 |
| 2012/0084063 A1 | 4/2012 | Drees et al. | |
| 2012/0095798 A1 | 4/2012 | Mabari | |
| 2012/0130556 A1* | 5/2012 | Marhoefer | G05B 15/02 700/291 |
| 2012/0143383 A1* | 6/2012 | Cooperrider | H05B 47/175 700/295 |
| 2012/0143536 A1 | 6/2012 | Greaves et al. | |
| 2012/0158350 A1* | 6/2012 | Steinberg | F24F 11/47 702/130 |
| 2012/0191439 A1* | 7/2012 | Meagher | G06F 30/20 703/18 |
| 2012/0232701 A1 | 9/2012 | Carty et al. | |
| 2012/0271576 A1 | 10/2012 | Kamel et al. | |
| 2012/0278051 A1* | 11/2012 | Jiang | G06Q 10/04 703/2 |
| 2012/0310416 A1* | 12/2012 | Tepper | F24F 11/30 700/286 |
| 2012/0310427 A1* | 12/2012 | Williams | G05B 23/0218 702/182 |
| 2012/0310729 A1 | 12/2012 | Dalto et al. | |
| 2012/0330626 A1* | 12/2012 | An | G01K 17/20 703/2 |
| 2013/0008224 A1* | 1/2013 | Stormbom | G01N 21/274 73/1.06 |
| 2013/0030590 A1* | 1/2013 | Prosser | H02J 3/14 700/295 |
| 2013/0054662 A1* | 2/2013 | Coimbra | G06Q 10/04 708/230 |
| 2013/0060471 A1* | 3/2013 | Aschheim | G01K 17/00 702/136 |
| 2013/0134962 A1 | 5/2013 | Kamel et al. | |
| 2013/0152998 A1* | 6/2013 | Herzig | G06F 30/20 126/714 |
| 2013/0166266 A1* | 6/2013 | Herzig | G01W 1/10 703/6 |
| 2013/0190940 A1 | 7/2013 | Sloop et al. | |
| 2013/0204439 A1* | 8/2013 | Scelzi | G05B 11/01 702/61 |
| 2013/0245847 A1* | 9/2013 | Steven | G06Q 10/00 700/291 |
| 2013/0262049 A1* | 10/2013 | Zhang | H02J 3/004 703/2 |
| 2013/0268129 A1* | 10/2013 | Fadell | G07F 17/0014 700/278 |
| 2013/0274937 A1* | 10/2013 | Ahn | H04L 12/12 700/291 |
| 2013/0289774 A1* | 10/2013 | Day | G06F 16/358 700/276 |
| 2013/0304269 A1 | 11/2013 | Shiel | |
| 2013/0314699 A1* | 11/2013 | Jungerman | G01J 1/0242 356/139.01 |
| 2013/0325377 A1 | 12/2013 | Drees et al. | |
| 2014/0039648 A1 | 2/2014 | Boult et al. | |
| 2014/0039709 A1* | 2/2014 | Steven | H02J 13/00034 700/291 |
| 2014/0039965 A1* | 2/2014 | Steven | G06Q 10/06315 705/7.25 |
| 2014/0107851 A1* | 4/2014 | Yoon | F24F 11/46 700/291 |
| 2014/0129197 A1* | 5/2014 | Sons | G06F 30/13 703/7 |
| 2014/0142862 A1* | 5/2014 | Umeno | G06Q 50/06 702/19 |
| 2014/0214222 A1* | 7/2014 | Rouse | G06Q 10/06 700/291 |
| 2014/0222241 A1* | 8/2014 | Ols | F24F 11/70 700/299 |
| 2014/0236708 A1 | 8/2014 | Wolff et al. | |
| 2014/0278108 A1* | 9/2014 | Kerrigan | G01W 1/02 702/3 |
| 2014/0278145 A1 | 9/2014 | Angeli et al. | |
| 2014/0278165 A1* | 9/2014 | Wenzel | G06Q 50/08 702/183 |
| 2014/0278203 A1* | 9/2014 | Lange | G01K 17/20 702/136 |
| 2014/0289000 A1 | 9/2014 | Hutchings et al. | |
| 2014/0297238 A1 | 10/2014 | Parthasarathy et al. | |
| 2014/0365017 A1 | 12/2014 | Hanna et al. | |
| 2015/0019034 A1* | 1/2015 | Gonatas | H02S 10/00 700/291 |
| 2015/0057820 A1* | 2/2015 | Kefayati | G06Q 50/06 700/291 |
| 2015/0088576 A1* | 3/2015 | Steven | G05F 1/66 705/7.22 |
| 2015/0094968 A1 | 4/2015 | Jia et al. | |
| 2015/0112497 A1 | 4/2015 | Steven et al. | |
| 2015/0134251 A1* | 5/2015 | Bixel | G01W 1/12 700/287 |
| 2015/0177415 A1* | 6/2015 | Bing | G01W 1/10 702/3 |
| 2015/0188415 A1* | 7/2015 | Abido | G06N 3/043 307/103 |
| 2015/0269664 A1* | 9/2015 | Davidson | G06Q 40/00 705/35 |
| 2015/0278968 A1* | 10/2015 | Steven | G06Q 50/06 705/7.35 |
| 2015/0323423 A1* | 11/2015 | Alsaleem | F24F 11/30 62/127 |
| 2015/0326015 A1 | 11/2015 | Steven et al. | |
| 2015/0330923 A1* | 11/2015 | Smullin | G01K 17/20 702/136 |
| 2015/0332294 A1* | 11/2015 | Albert | G06Q 30/0202 705/7.31 |
| 2015/0339762 A1 | 11/2015 | Deal et al. | |
| 2015/0355017 A1 | 12/2015 | Clarke et al. | |
| 2016/0049606 A1* | 2/2016 | Bartoli | H10K 30/87 136/256 |
| 2016/0072287 A1* | 3/2016 | Jia | H02J 3/0073 700/295 |
| 2016/0140283 A1* | 5/2016 | Morse | G06Q 50/06 716/135 |
| 2016/0187911 A1* | 6/2016 | Carty | G05B 15/02 700/276 |
| 2016/0223503 A1 | 8/2016 | Abehassera et al. | |
| 2016/0226253 A1* | 8/2016 | Abido | H02J 3/381 |
| 2016/0266594 A1* | 9/2016 | Kauffman | G06Q 50/06 |
| 2016/0305678 A1 | 10/2016 | Pavlovski et al. | |
| 2016/0306906 A1* | 10/2016 | McBrearty | H02J 3/381 |
| 2016/0348936 A1* | 12/2016 | Johnson, Jr. | G05B 15/02 |
| 2016/0379175 A1 | 12/2016 | Bhattacharya et al. | |
| 2017/0104451 A1* | 4/2017 | Gostein | H02S 50/10 |

(56) References Cited

U.S. PATENT DOCUMENTS

2017/0299446 A1* 10/2017 Lange ............... G01K 17/20
2018/0010818 A1* 1/2018 Maruyama ........... F24F 11/30

FOREIGN PATENT DOCUMENTS

| JP | 4799838 | 10/2011 |
|---|---|---|
| WO | 2007124059 | 1/2007 |
| WO | 2007142693 | 12/2007 |
| WO | 2013181408 | 12/2013 |
| WO | 2014081967 | 5/2014 |
| WO | 2016164718 | 10/2016 |

OTHER PUBLICATIONS

"2001 ASHRAE Handbook," "Chapter 29 Nonresidential cooling and heating load calculation procedures," 2001, ASHRAE, 41 pages (Year: 2001).*
Jeffrey D. Spitler, "Load calculation applications manual (I-P)", 2014, second edition, chapter "Fundamentals of the radiant time series method," ASHRAE, 31 pages (Year: 2014).*
Thomas Huld, "Estimating Solar Radiation and Photovoltaic System Performance," The PVGIS Approach, 2011 (printed Dec. 13, 2017).
Anderson et al., "Modelling The Heat Dynamics of a Building Using Stochastic Differential Equations," Energy and Building, vol. 31, 2000, pp. 13-24.
Brinkman et al., "Toward a Solar-Powered Grid." IEEE Power & Energy, vol. 9, No. 3, May/Jun. 2011.
California ISO. Summary of Preliminary Results of 33% Renewable Integration Study—2010 CPUC LTPP. Docket No. R. 10-05-006, May 10, 2011.
Ellis et al., "Model Makers." IEEE Power & Energy, vol. 9, No. 3, May/Jun. 2011.
Danny H.W. Li et al., "Analysis of solar heat gain factors using sky clearness index and energy implications." Energy Conversions and Management, Aug. 2000.
Hoff et al., "Quantifying PV Power Output Variability." Solar Energy 84 (2010) 1782-1793, Oct. 2010.
Hoff et al., "PV Power Output Variability: Calculation of Correlation Coefficients Using Satellite Insolation Data." American Solar Energy Society Annual Conference Proceedings, Raleigh, NC, May 18, 2011.
Kuszamaul et al., "Lanai High-Density Irradiance Sensor Network for Characterizing Solar Resource Variability of MW-Scale PV System." 35th Photovoltaic Specialists Conference, Honolulu, HI. Jun. 20-25, 2010.
Serban C. "Estimating Clear Sky Solar Global Radiation Using Clearness Index, for Brasov Urban Area". Proceedings of the 3rd International Conference on Maritime and Naval Science and Engineering. ISSN: 1792-4707, ISBN: 978-960-474-222-6.
Mills et al., "Dark Shadows." IEEE Power & Energy, vol. 9, No. 3, May/Jun. 2011.
Mills et al., "Implications of Wide-Area Geographic Diversity for Sort-Term Variability of Solar Power." Lawrence Berkeley National Laboratory Technical Report LBNL-3884E. Sep. 2010.
Perez et al., "Parameterization of site-specific short-term irradiance variability." Solar Energy, 85 (2011) 1343-1345, Nov. 2010.
Perez et al., "Short-term irradiance variability correlation as a function of distance." Solar Energy, Mar. 2011.
Philip, J., "The Probability Distribution of the Distance Between Two Random Points in a Box." www.math.kth.se/~johanph/habc.pdf. Dec. 2007.
Stein, J., "Simulation of 1-Minute Power Output from Utility-Scale Photovoltaic Generation Systems." American Solar Energy Society Annual Conference Proceedings, Raleigh, NC, May 18, 2011.
Solar Anywhere, 2011. Web-Based Service that Provides Hourly, Satellite-Derived Solar Irradiance Data Forecasted 7 days Ahead and Archival Data back to Jan. 1, 1998. www.SolarAnywhere.com.
Stokes et al., "The atmospheric radiance measurement (ARM) program: programmatic background and design of the cloud and radiation test bed." Bulletin of American Meteorological Society vol. 75, No. 7, pp. 1201-1221, Jul. 1994.
Hoff et al., "Modeling PV Fleet Output Variability," Solar Energy, May 2010.
Olopade et al., "Solar Radiation Characteristics and the performance of Photovoltaic (PV) Modules in a Tropical Station." Journal Sci. Res. Dev. vol. 11, 100-109, 2008/2009.
Li et al., "Analysis of solar heat gain factors using sky clearness index and energy implications." 2000.
Shahab Poshtkouhi et al., "A General Approach for Quantifying the Benefit of Distributed Power Electronics for Fine Grained MPPT in Photovoltaic Applications Using 3-D Modeling," Nov. 20, 2012, IEE Transactions on Poweer Electronics, vol. 27, No. 11, p. 4656-4666.
Pathomthat Chiradeja et al., "An Approaching to Quantify the Technical Benefits of Distributed Generation," Dec. 2004, IEEE Transactions on Energy Conversation, vol. 19, No. 4, p. 764-773.
Mudathir Funsho Akorede et al., "Distributed Energy Resources and Benefits to the Environment," 2010, Renewable and Sustainable Energy Reviews 14, p. 724-734.
V.H. Mendez, et al., "Impact of Distributed Generation on Distribution Investment Deferral," 2006, Electrical Power and Energy Systems 28, p. 244-252.
Francisco M. Gonzalez-Longatt et al., "Impact of Distributed Generation Over Power Losses on Distribution System," Oct. 2007, Electrical Power Quality and Utilization, 9th International Conference.
M. Begovic et al., "Impact of Renewable Distributed Generation on Power Systems," 2001, Proceedings of the 34th Hawaii International Conference on System Sciences, p. 1-10.
M. Thomson et al., "Impact of Widespread Photovoltaics Generation on Distribution Systems," Mar. 2007, IET Renew. Power Gener., vol. 1, No. 1 p. 33-40.
Varun et al., "LCA of Renewable Energy for Electricity Generation Systems—A Review," 2009, Renewable and Sustainable Energy Reviews 13, p. 1067-1073.
Andreas Schroeder, "Modeling Storage and Demand Management in Power Distribution Grids," 2011, Applied Energy 88, p. 4700-4712.
Daniel S. Shugar, "Photovoltaics in the Utility Distribution System: The Evaluation of System and Distributed Benefits," 1990, Pacific Gas and Electric Company Department of Research and Development, p. 836-843.
Nguyen et al., "Estimating Potential Photovoltaic Yield With r.sun and the Open Source Geographical Resources Analysis Support System," Mar. 17, 2010, pp. 831-843.
Pless et al., "Procedure for Measuring and Reporting the Performance of Photovoltaic Systems in Buildings," 62 pages, Oct. 2005.
Emery et al., "Solar Cell Efficiency Measurements," Solar Cells, 17 (1986) 253-274.
Santamouris, "Energy Performance of Residential Buildings," James & James/Earchscan, Sterling, VA 2005.
Al-Homoud, "Computer-Aided Building Energy Analysis Techniques," Building & Environment 36 (2001) pp. 421-433.
Gruber, Mattias, Anders Truschel, and Jan-Olof Dalenback. "CO2 sensors for occupancy estimations: Potential in building automation applications." Energy and Buildings 84 (2014): 548-556. (Year: 2014).
Hanninen, Otto, et al. "Combining CO2 data from ventilation phases improves estimation of air exchange rates." Proceedings of Healthy Buildings Conference, Brisbane. 2012. (Year: 2012).
Kapalo, Peter, et al. "Determine a methodology for calculating the needed fresh air." Environmental Engineering. Proceedings of the International Conference on Environmental Engineering. ICEE. vol. 9. Vilnius Gediminas Technical University, Department of Construction Economics & Property, 2014. (Year: 2014).
Wang, Shengwei, and Xinqiao Jin. "CO2-based occupancy detection for on-line outdoor air flow control." Indoor and Built Environment 7.3 (1998): 165-181. (Year: 1998).
Grot, Richard A., et al. Measurement methods for evaluation of thermal integrity of building envelopes. No. PB-83-18017 4; NBSIR-

(56) References Cited

OTHER PUBLICATIONS 82-2605. National Bureau of Standards, Washington, DC (USA). Center for Building Technology, 1982. (Year: 1982).

Claude-Alain, Roulet, and Flavia Foradini. "Simple and cheap air change rate measurement using CO2 concentration decays." International Journal of Ventilation 1.1 (2002): 39-44. (Year: 2002).

Ng, Lisa Chen, and Jin Wen. "Estimating building airflow using CO2 measurements from a distributed sensor network." HVAC&R Research 17.3 (2011): 344-365. (Year: 2011).

Shuqing Cui et al.,"CO2 tracer gas concentration decay method for measuring air change rate," Nov. 18, 2014, Building and Environment, vol. 84, pp. 162-169; (Year: 2014).

Robert C. Sondregger et al., "In-situ measurements of residential energy performance using electric co-heating," 1980, Lawrence Berkeley Laboratory, 26 pages (Year: 1980).

Yu-Pei Ke , "Using carbon dioxide measurements to determine occupancy for ventilation controls," 1997, https://www.aivc.org/sites/ default/files/airbase_10515.pdf, pp. 1-9 (Year: 1997).

T. Leephakpreeda et al., "Occupancy-based control of indoor air ventilation: a theoretical and experimental study," 2001, ScienceAsia, vol. 27, pp. 279-284 (Year: 2001).

Cali, Davide, et al. "CO2 based occupancy detection algorithm: Experimental analysis and validation for office and residential buildings." Building and Environment 86 (2015): 39-49. (Year: 2015).

Judkoff et al., "Side-by-Side Thermal Tests of Modular Offices: A Validation Study of the STEM Method", Dec. 2000, NREUTP-550-23940 (Year: 2000).

Bauwens et al., "State-of-the-art on the co-heating test methodology", Jan. 22, 2014, Webinar: "How to determine the real performances of buildings? Building characterisation by co-heating", URL: dynastee(dot)info/webinar-presentations-how-to-determine-the-real-performances-of-buildings/ (Year: 2014).

Andrews, John W., Richard F. Krajewski, and John J. Strasser. Electric co-heating in the ASHRAE standard method oftest for thermal distribution efficiency: Test results on two New York State homes. No. BNL-62346; CONF-960254-1. Brookhaven National Lab.(BN L), Upton, NY (United States), 1995. (Year: 1995).

Balcomb, J. D., et al. "Short-term energy monitoring for commercial buildings." Proceedings of the 1994 ACEEE Summer Study on Energy Efficiency in Buildings. 1994 (Year: 1994).

Bauwens, Geert, and Staf Roels. "Co-heating test: A state-of-the-art." Energy and Buildings 82 (2014): 163-172. (Year: 2014).

Carrillo, Antonio, Fernando Dominguez, and Jose M. Cejudo. "Calibration of an EnergyPlus simulation model by the STEM-PSTAR method." Eleventh International IBPSA Conference, Glasgow, Scotland. 2009. (Year: 2009).

Jack, "Building Diagnostics: Practical Measurement of the Fabric Thermal Performance of Houses", Jul. 2015, PhD Dissertation, Loughborough University, United Kingdom (Year: 2015).

Johnston, David, et al. "Whole house heat loss test method (Coheating)." Leeds Metropolitan University: Leeds, UK (2013). (Year: 2013).

Judkoff, R., et al. Buildings in a Test Tube: Validation of the Short-Term Energy Monitoring (STEM) Method (Preprint). No. Nrel/ CP-550-29805. National Renewable Energy Lab.(NREL), Golden, CO (United States), 2001. (Year: 2001).

NHBC Foundation, "Review of co-heating test Methodologies", Nov. 2013, URL: www(dot)nhbcfoundation(dot)org/wp-content/uploads/2016/05/NF54-Review-of-co-heating-test-methodologies(dot)pdf (Year: 2013).

Siviour, J. "Experimental thermal calibration of houses." Rapid Thermal Calibration of Houses; Everett, R., Ed.; Technical Report ERG 55 (1981). (Year: 1981).

Modera, M. P. "Electric Co-Heating: A Method for Evaluating Seasonal Heating Efficiencies and Heat Loss Rates in Dwellings." (1979). (Year: 1979).

Sonderegger, Robert C., Paul E. Condon, and Mark P. Madera. In-situ measurements of residential energy performance using electric co-heating. No. LBL-10117; CONF-800206-4. California Univ., Berkeley (USA). Lawrence Berkeley Lab., 1980. (Year: 1980).

Stoecklein, A., et al. "The household energy end-use project: measurement approach and sample application of the New Zealand household energy model." Conference Paper. No. 87. 2001. (Year: 2001).

Subbarao, K., et al. Short-Term Energy Monitoring (STEM): Application of the PSTAR method to a residence in Fredericksburg, Virginia. No. SERI/TR-254-3356. Solar Energy Research Inst., Golden, CO (USA), 1988. (Year: 1988).

J. Galvao, S. Leitao, S. Malheiro and T. Gaio, "Model of decentralized energy on improving the efficiency in building services," Proceedings of the 2011 3rd International Youth Conference on Energetics (IYCE), Leiria, Portugal, 2011, pp. 1-8. (Year: 2011).

Dong, Bing, and Khee Poh Lam. "A real-time model predictive control for building heating and cooling systems based on the occupancy behavior pattern detection and local weather forecasting." Building Simulation. vol. 7. No. 1. Springer Berlin Heidelberg, 2014. (Year: 2014).

Parsons, Peter. "Determining infiltration rates and predicting building occupancy using CO2 concentration curves." Journal of Energy 2014 (2014). (Year: 2014).

J. Kleissl & Y. Agarwal, "Cyber-Physical Energy Systems: Focus on Smart Buildings," Design Automation Conference, Anaheim, CA, 2010, pp. 749-754, doi: 10.1145/1837274.1837464. (2010).

Fine_1980(Analysis of Heat Transfer in Building Thermal Insulation, Oak Ridge National Laboratory ORNL/TM-7481) (Year: 1980).

Chapter2_1985 (Rates of Change and the Chain Rule, Springer-Verlag) (Year: 1985).

E.S. Mustafina et al. "Problems of Small Heat Power Stations and Ways to Solve Them," Proceedings. The 8th Russian-Korean International Symposium on Science and Technology, 2004. KORUS 2004. Tomsk, Russia, 2004. pp. 267-270. vol. 1, doi:10.1109/KORUS. 2004. 1555341. (Year 2004).

Di Yuhui, Di Yulin, Wang Yonghui and Wen Li, "Application and Analusis of Water Source Heat Pump System in Residential Buildings," 2011 International Symposium on Water Resource and Environmental Protection, 2011, pp. 2425-2428, doi: 10.1109/ISWREP. 2011.5893758. (Year: 2011).

Clito Afonso, "Tracer gas technichue for measurement of air infiltration and natural ventilation: case studies amd new devices for measurement of mechamocal air ventilation in ducts." 2013, International Journal of Low-Carbon Technologies 2015, Issue 10, pp. 188-204 (Year: 2013).

Isaac Turiel et al., "Occupant-generated CO2 as an indicator of ventilation rate," 1980, Lawrence Berkley Laboratory, 26 pages (Year: 1980).

Andrew K. Persily, "Tracer gas techniques for studying building air exchange," 1988, National Bureau of Standards, 44 pages (Year: 1988).

Detlef Laussmann et al., "Air change measurements using tracer gasses,""2011, In book: Chemistry, Emission Control, Radioactive Pollution and Indoor Air Quality, 42 pages (Year: 2011)".

Cheng, Pok Lun, and Xiaofeng Li. "Air change rate measurements using tracer gas carbon dioxide from dry ice." International Journal of Ventilation 13.3 (2014): 235-246. See the abstract, § 1, § 2.1 and §§ 2.3-2.5 ; and §§ 4.1-4.1.3 (Year: 2014).

Zhang, Yue, Xiaofeng Li, and Pok L. Cheng. "Optimal window opening based on natural ventilation measurements." (2015). 36th AIVC Conference"Effective ventilation in high performance buildings", Madrid, Spain, Sep. 23-24, 2015. See the abstract,§§ 2.1-2.6 (Year: 2015).

Chamie, G., et al. "Household ventilation and tuberculosis transmission in Kampala, Uganda." The International journal of tuberculosis and lung disease 17.6 (2013): 764-770. See the abstract and the section "Methods" (Year: 2013).

ASTM, "Standard Test Method for Determining Air Change in a Single Zone by Means of a Tracer Gas Dilution", Designation: E 741'-00 (Reapproved 2006)—see§§ 1,4-6, 8, 13-14 (Year: 2006).

(56) References Cited

OTHER PUBLICATIONS

Stuart, Ralph, Ellen Sweet, and Aaron Batchelder. "Assessing general ventilation effectiveness in the laboratory." Journal of Chemical Health & Safety 22.2 (2015): 2-7. (Year: 2015).

* cited by examiner

80

| Season | Outdoor Temp. (°F) | Indoor Temp. (°F) | Occupants (People) | Electric (kW) | Solar (kW/m$^2$) | NG Heat (therms) | Elec. Heat (kW) |
|---|---|---|---|---|---|---|---|
| '08-'09 | 50.2 | 61.0 | 5 | 0.905 | 0.133 | 0.069 | 0.000 |
| '09-'10 | 49.1 | 61.0 | 5 | 0.973 | 0.115 | 0.066 | 0.000 |
| '10-'11 | 49.2 | 61.0 | 4 | 0.792 | 0.117 | 0.059 | 0.000 |
| '11-'12 | 48.7 | 61.0 | 4 | 0.845 | 0.144 | 0.068 | 0.000 |
| '12-'13 | 50.4 | 61.0 | 3 | 0.724 | 0.141 | 0.070 | 0.000 |
| '13-'14 | 51.5 | 61.0 | 3 | 0.533 | 0.154 | 0.065 | 0.000 |
| '14-'15 | 55.5 | 66.4 | 2 | 0.391 | 0.120 | 0.000 | 0.418 |

90

| Season | Occupants | Electric | Solar | Aux. Heating | Total |
|---|---|---|---|---|---|
| '08-'09 | 116 | 286 | 105 | 378 | 886 |
| '09-'10 | 105 | 279 | 82 | 327 | 793 |
| '10-'11 | 85 | 229 | 85 | 296 | 695 |
| '11-'12 | 82 | 235 | 100 | 331 | 748 |
| '12-'13 | 71 | 234 | 114 | 391 | 810 |
| '13-'14 | 79 | 192 | 138 | 406 | 815 |
| '14-'15 | 46 | 123 | 94 | 131 | 393 |

140

| Test | Desired Parameter | Time to Perform Test | HVAC Status | Electric Heater Status | Require Constant Indoor Temp. | Record Electric Consumption | Record HVAC Status |
|---|---|---|---|---|---|---|---|
| Thermal Conductivity | $UA^{Total}$ | Night | Off | On | Yes | Yes | No |
| Thermal Mass | M | Night | Off | Off | No | Yes | No |
| Effective Window Area | W | Day | Off | Off | No | Yes | No |
| HVAC Efficiency | $\eta^{HVAC}$ | Night | On | Off | No | Yes | Yes |

| Start Time | Data | | | | | Include in Test? | | |
|---|---|---|---|---|---|---|---|---|
| | Outdoor (Measured) | Indoor (Measured) | Solar (VDI) | Consumption (kW) | Occupancy | UATotal | Mass | W |
| 1/29 9:00 PM | 50.5 | 68.3 | 0 | 0.84 | 2 | 0 | 0 | 0 |
| 1/29 10:00 PM | 49.1 | 67.6 | 0 | 0.12 | 2 | 0 | 1 | 0 |
| 1/29 11:00 PM | 47.9 | 67.0 | 0 | 0.12 | 2 | 0 | 1 | 0 |
| 1/30 12:00 AM | 46.8 | 66.5 | 0 | 0.10 | 2 | 0 | 1 | 0 |
| 1/30 1:00 AM | 45.8 | 66.1 | 0 | 0.11 | 2 | 0 | 1 | 0 |
| 1/30 2:00 AM | 44.6 | 65.6 | 0 | 0.29 | 2 | 0 | 1 | 0 |
| 1/30 3:00 AM | 43.7 | 65.2 | 0 | 0.11 | 2 | 0 | 1 | 0 |
| 1/30 4:00 AM | 43.1 | 64.7 | 0 | 0.12 | 2 | 0 | 1 | 0 |
| 1/30 5:00 AM | 42.3 | 64.3 | 0 | 0.10 | 2 | 0 | 1 | 0 |
| 1/30 6:00 AM | 41.5 | 63.8 | 0 | 1.02 | 2 | 0 | 1 | 0 |
| 1/30 7:00 AM | 41.0 | 64.3 | 0 | 2.48 | 2 | 0 | 0 | 0 |
| 1/30 8:00 AM | 42.2 | 64.8 | 200 | 2.04 | 2 | 0 | 0 | 0 |
| 1/30 9:00 AM | 46.6 | 64.5 | 472 | 0.40 | 2 | 0 | 0 | 1 |
| 1/30 10:00 AM | 51.5 | 64.2 | 650 | 0.45 | 2 | 0 | 0 | 1 |
| 1/30 11:00 AM | 54.6 | 64.7 | 761 | 0.62 | 2 | 0 | 0 | 1 |
| 1/30 12:00 PM | 58.5 | 65.4 | 817 | 0.29 | 2 | 0 | 0 | 1 |
| 1/30 1:00 PM | 59.8 | 65.9 | 809 | 0.25 | 2 | 0 | 0 | 1 |
| 1/30 2:00 PM | 60.8 | 66.4 | 744 | 0.25 | 2 | 0 | 0 | 1 |
| 1/30 3:00 PM | 60.8 | 66.7 | 613 | 0.24 | 2 | 0 | 0 | 1 |
| 1/30 4:00 PM | 60.8 | 66.9 | 415 | 0.37 | 2 | 0 | 0 | 1 |
| 1/30 5:00 PM | 60.1 | 67.0 | 143 | 0.95 | 2 | 0 | 0 | 0 |
| 1/30 6:00 PM | 56.7 | 67.2 | 0 | 1.33 | 2 | 0 | 0 | 0 |
| 1/30 7:00 PM | 53.8 | 67.1 | 0 | 1.41 | 2 | 1 | 0 | 0 |
| 1/30 8:00 PM | 53.1 | 67.2 | 0 | 1.49 | 2 | 1 | 0 | 0 |
| 1/30 9:00 PM | 53.1 | 67.2 | 0 | 1.50 | 2 | 1 | 0 | 0 |
| 1/30 10:00 PM | 53.1 | 67.1 | 0 | 1.45 | 2 | 1 | 0 | 0 |
| 1/30 11:00 PM | 53.1 | 66.9 | 0 | 1.35 | 3 | 1 | 0 | 0 |
| 1/31 12:00 AM | 53.1 | 66.6 | 0 | 1.34 | 3 | 1 | 0 | 0 |
| 1/31 1:00 AM | 53.1 | 66.5 | 0 | 1.35 | 3 | 1 | 0 | 0 |
| 1/31 2:00 AM | 53.1 | 66.5 | 0 | 1.48 | 3 | 1 | 0 | 0 |
| 1/31 3:00 AM | 53.1 | 66.7 | 0 | 1.99 | 3 | 1 | 0 | 0 |
| 1/31 4:00 AM | 53.1 | 67.0 | 0 | 1.99 | 3 | 1 | 0 | 0 |
| 1/31 5:00 AM | 53.1 | 67.1 | 0 | 1.57 | 3 | 1 | 0 | 0 |
| 1/31 6:00 AM | 54.1 | 66.9 | 0 | 1.20 | 3 | 0 | 0 | 0 |

| Parameter Estimation | UATotal Test | Mass Test | Window Test |
|---|---|---|---|
| Test Start Time | 1/30 7:00PM | 1/29 10:00PM | 1/30 9:00AM |
| Test End Time | 1/31 6:00AM | 1/30 7:00AM | 1/30 5:00PM |
| Number of Hours | 11 | 9 | 8 |
| Starting Indoor Temperature (°F) | 67.1 | 67.6 | 64.5 |
| Ending Indoor Temperature (°F) | 67.1 | 63.8 | 66.9 |
| Average Indoor Temperature (°F) | 66.9 | 65.7 | 65.6 |
| Average Outdoor Temperature (°F) | 53.2 | 45.0 | 56.7 |
| Avg. Solar (kW/m^2) | 0.00 | 0.00 | 0.66 |
| Avg. Power Consumption (kW) | 1.54 | 0.23 | 0.36 |
| Avg. Occupancy (people) | 2.6 | 2.0 | 2.0 |
| Indoor/Outdoor Delta T (°F) | 13.75 | 20.67 | 8.92 |
| Indoor Finish/Start Delta T (°F) | 0.0 | -3.8 | 2.5 |
|  |  |  |  |
|  | UATotal (Btu/h-°F) | Mass (Btu/°F) | w (m$^2$) |
| Results | 429 | 18,080 | 3.40 |

Fig. 21.

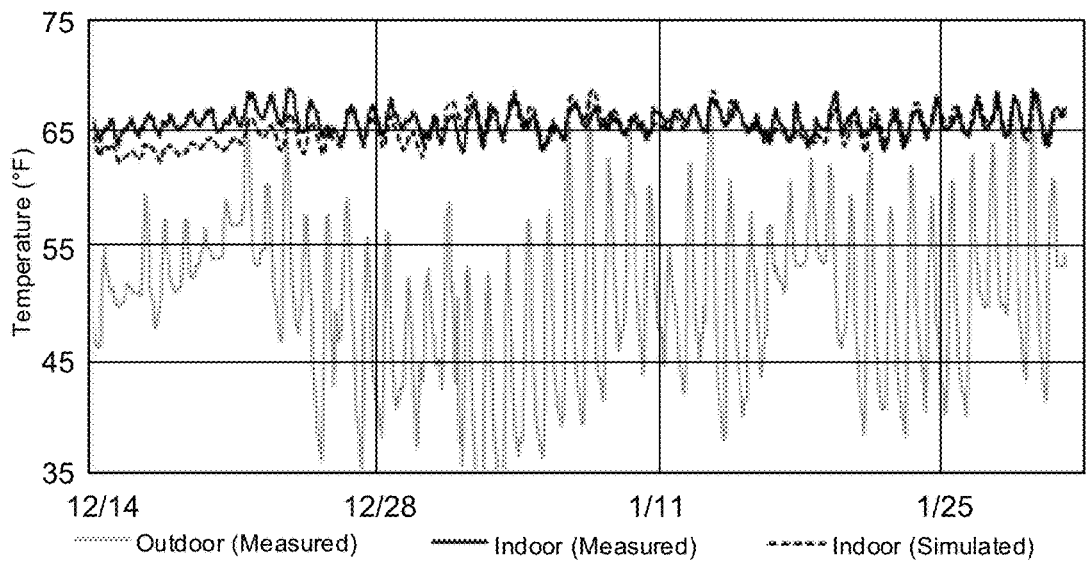

SYSTEM AND METHOD FOR ESTIMATING PERIODIC FUEL CONSUMPTION FOR COOLING OF A BUILDING WITH THE AID OF A DIGITAL COMPUTER

CROSS-REFERENCE TO RELATED APPLICATION

This patent application is a continuation of U.S. Pat. No. 10,332,021, issued Jun. 25, 2019, which is a continuation-in-part of U.S. Pat. No. 10,467,355, issued Nov. 5, 2019, which is a continuation of U.S. Pat. No. 10,339,231 issued Jul. 2, 2019, the priority dates of which are claimed and the disclosures of which are incorporated by reference.

FIELD

This application relates in general to energy conservation and, in particular, to a system and method for estimating indoor temperature time series data of a building with the aid of a digital computer.

BACKGROUND

Concern has been growing in recent times over energy consumption in the United States and abroad. The cost of energy has steadily risen as power utilities try to cope with continually growing demand, increasing fuel prices, and stricter regulatory mandates. Power utilities must also maintain existing infrastructure, while simultaneously finding ways to add more generation capacity to meet future needs, both of which add to the cost of energy. Moreover, burgeoning energy consumption continues to impact the environment and deplete natural resources.

A major portion of the rising cost of energy is borne by consumers, who, despite the need, remain poorly-equipped to identify the most cost effective ways to lower their energy consumption. No-cost behavioral changes, such as adjusting thermostat settings and turning off unused appliances, and low-cost physical improvements, such as switching to energy-efficient light bulbs, may be insufficient to offset increases in monthly utility bills, particularly as seasonal space heating and air conditioning (AC) together consume the most energy in the average home. As a result, appreciable decreases in energy consumption can usually only be achieved by investing in upgrades to a building's heating or cooling envelope or "shell." However, identifying and comparing those improvements to a building's shell that will yield an acceptable return on investment in terms of costs versus energy savings requires determining building-specific parameters, especially the building's thermal conductivity ($UA^{Total}$).

Heating, ventilating, and air conditioning (HVAC) energy costs are tied to a building's thermal conductivity $UA^{Total}$. A poorly insulated home or a building with significant sealing problems will require more HVAC usage to maintain a desired interior temperature than would a comparably-sized but well-insulated and sealed structure. Reducing HVAC energy costs is not as simple as choosing a thermostat setting that causes an HVAC system to run for less time or less often. Rather, HVAC system efficiency, duration of heating or cooling seasons, differences between indoor and outdoor temperatures, and other factors combined with thermal conductivity $UA^{Total}$ can weigh into overall energy consumption.

Conventionally, an on-site energy audit is performed to determine a building's thermal conductivity $UA^{Total}$. A typical energy audit involves measuring the dimensions of walls, windows, doors, and other physical characteristics; approximating R-values of insulation for thermal resistance; estimating infiltration using a blower door test; and detecting air leakage using a thermal camera, after which a numerical model is run to solve for thermal conductivity. The $UA^{Total}$ result is combined with the duration of the heating or cooling season, as applicable, over the period of inquiry and adjusted for HVAC system efficiency, plus any solar (or other non-utility supplied) power savings fraction. The audit report is often presented in the form of a checklist of corrective measures that may be taken to improve the building's shell and HVAC system, and thereby lower overall energy consumption. As an involved process, an energy audit can be costly, time-consuming, and invasive for building owners and occupants. Further, as a numerical result derived from a theoretical model, an energy audit carries an inherent potential for inaccuracy strongly influenced by physical mismeasurements, lack of measurements, data assumptions, and so forth. As well, the degree of improvement and savings attributable to various possible improvements is not necessarily quantified due to the wide range of variables.

Therefore, a need remains for a practical model for determining actual and potential energy consumption for the heating and cooling of a building.

A further need remains for an approach to quantifying improvements in energy consumption and cost savings resulting from building shell upgrades.

SUMMARY

Fuel consumption for building heating and cooling can be calculated through two practical approaches that characterize a building's thermal efficiency through empirically-measured values and readily-obtainable energy consumption data, such as available in utility bills, thereby avoiding intrusive and time-consuming analysis with specialized testing equipment. While the discussion is herein centered on building heating requirements, the same principles can be applied to an analysis of building cooling requirements. The first approach can be used to calculate annual or periodic fuel requirements. The approach requires evaluating typical monthly utility billing data and approximations of heating (or cooling) losses and gains.

The second approach can be used to calculate hourly (or interval) fuel requirements. The approach includes empirically deriving three building-specific parameters: thermal mass, thermal conductivity, and effective window area. HVAC system power rating and conversion and delivery efficiency are also parametrized. The parameters are estimated using short duration tests that last at most several days. The parameters and estimated HVAC system efficiency are used to simulate a time series of indoor building temperature. In addition, the second hourly (or interval) approach can be used to verify or explain the results from the first annual (or periodic) approach. For instance, time series results can be calculated using the second approach over the span of an entire year and compared to results determined through the first approach. Other uses of the two approaches and forms of comparison are possible.

The empirically derived building-specific parameters can be formulaically applied to determine seasonal fuel consumption and indoor temperatures pertaining to the heating season, the summer or year round. To generalize the approach as set forth for winter, the term used to represent furnace rating is replaced with HVAC system rating. As total heat change is based on the building's thermal mass, heat change is relabeled as thermal mass gain (or loss). This change creates a heat balance equation that is composed of heat gain (loss) from six sources, three of which contribute to heat gain only. No modifications are required for applying the empirical tests to summer since an attic's thermal conductivity cancels out and the attic's effective window area is directly combined with the existing effective window area. Moreover, since these tests are empirically based, the tests already account for the additional heat gain associated with the elevated attic temperature and other surface temperatures.

Furthermore, the net savings in fuel, cost and carbon emissions (environmental) provided by an investment in an electric energy efficiency can be determined. The net effect that a proposed electric energy efficiency investment has in reductions in the fuel consumed for a building's heating and cooling can be weighed by taking into account the efficiencies of electricity generation as supplied to a building and of the building's cooling and heating systems, fuel costs, and carbon emissions.

One embodiment provides a system and method estimating indoor temperature time series data of a building with the aid of a digital computer. Thermal conductivity, thermal mass, effective window area, and HVAC system efficiency of a building are found with involvement of a computer through empirical testing of the building over a monitored time frame. A difference between indoor and outdoor temperatures of the building during the monitored time frame are recorded with involvement of the computer. A time period for each interval in a time series is defined. An average occupancy, internal electricity consumption, solar resource, HVAC system rating, and HVAC system status as applicable to the building are retrieved over the monitored time frame. The time series, including temperature data based on the building's indoor temperature, thermal mass, thermal conductivity, temperature difference, occupancy, internal electricity consumption, effective window area, solar resource, and the rating, efficiency and status of the HVAC system, is built.

A further embodiment provides a system and method for estimating periodic fuel consumption for cooling of a building with the aid of a digital computer. Thermal conductivity, thermal mass, effective window area, and HVAC system efficiency of a building are found with involvement of a computer through empirical testing of the building over a monitored time frame. A difference between indoor and outdoor temperatures of the building is recorded with involvement of the computer during the monitored time frame. A time span over which to estimate is defined with the computer. An average occupancy, average internal electricity consumption, average solar resource, HVAC system rating, and HVAC system status as applicable to the building over the monitored time frame is retrieved with the computer. The periodic fuel consumption for cooling over the modeled time span is estimated based on the building's thermal conductivity, temperature difference, number of time periods comprised in the modeled time span, average occupancy, average internal electricity consumption, effective window area, and average solar resource internal electricity consumption internal electricity consumption.

A further embodiment provides a system and method for estimating seasonal net fuel savings with the aid of a digital computer. Efficiencies of electricity generation as supplied to a building and of the building's cooling and heating systems are obtained with a computer. A cooling season duration and a heating season duration that together comprise seasonal changes affecting the building are defined with the computer. A net fuel savings afforded by an electric energy efficiency is evaluated as a function of a reduction in electricity consumption afforded by the electric energy efficiency times an inverse of the electricity generation efficiency less an inverse of the heating system efficiency based on the heating season duration plus an inverse of the cooling system efficiency based on the cooling season duration.

A further embodiment provides a system and method for estimating seasonal net cost savings with the aid of a digital computer. Efficiencies of electricity generation as supplied to a building and of the building's cooling and heating systems are obtained with a computer. Prices of electricity and natural gas are obtained with the computer. A cooling season duration and a heating season duration that together comprise seasonal changes affecting the building are defined with the computer. A net cost savings afforded by an electric energy efficiency is evaluated as a function of a reduction in electricity consumption afforded by the electric energy efficiency times the electricity price plus an inverse of the cooling system efficiency based on the cooling season duration less the natural gas price over the heating system efficiency based on the heating season duration.

A further embodiment provides a system and method for estimating seasonal net carbon emissions savings with the aid of a digital computer. Efficiencies of electricity generation as supplied to a building and of the building's cooling and heating systems are obtained with a computer. Carbon emissions of electricity and natural gas consumption are obtained with the computer. A cooling season duration and a heating season duration that together comprise seasonal changes affecting the building are defined with the computer. A net carbon emissions savings afforded by an electric energy efficiency is evaluated as a function of a reduction in electricity consumption afforded by the electric energy efficiency times the electricity consumption carbon emissions plus an inverse of the cooling system efficiency based on the cooling season duration less the natural gas consumption carbon emissions over the heating system efficiency based on the heating season duration.

The foregoing approaches, annual (or periodic) and hourly (or interval) improve upon and compliment the standard energy audit-style methodology of estimating heating (and cooling) fuel consumption in several ways. First, per the first approach, the equation to calculate annual fuel consumption and its derivatives is simplified over the fully-parameterized form of the equation used in energy audit analysis, yet without loss of accuracy. Second, both approaches require parameters that can be obtained empirically, rather than from a detailed energy audit that requires specialized testing equipment and prescribed test conditions. Third, per the second approach, a time series of indoor temperature and fuel consumption data can be accurately generated. The resulting fuel consumption data can then be used by economic analysis tools using prices that are allowed to vary over time to quantify economic impact.

Moreover, the economic value of heating (and cooling) energy savings associated with any building shell improvement in any building has been shown to be independent of building type, age, occupancy, efficiency level, usage type, amount of internal electric gains, or amount solar gains, provided that fuel has been consumed at some point for auxiliary heating. The only information required to calculate savings includes the number of hours that define the winter season; average indoor temperature; average outdoor temperature; the building's HVAC system efficiency (or coefficient of performance for heat pump systems); the area of the existing portion of the building to be upgraded; the R-value of the new and existing materials; and the average price of energy, that is, heating fuel.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 19 is a table showing, by way of example, test data.

FIG. 20 is a table showing, by way of example, the statistics performed on the data in the table of FIG. 19 required to calculate the three test parameters.

FIG. 21 is a graph showing, by way of example, hourly indoor (measured and simulated) and outdoor (measured) temperatures.

DETAILED DESCRIPTION

Figure 1:
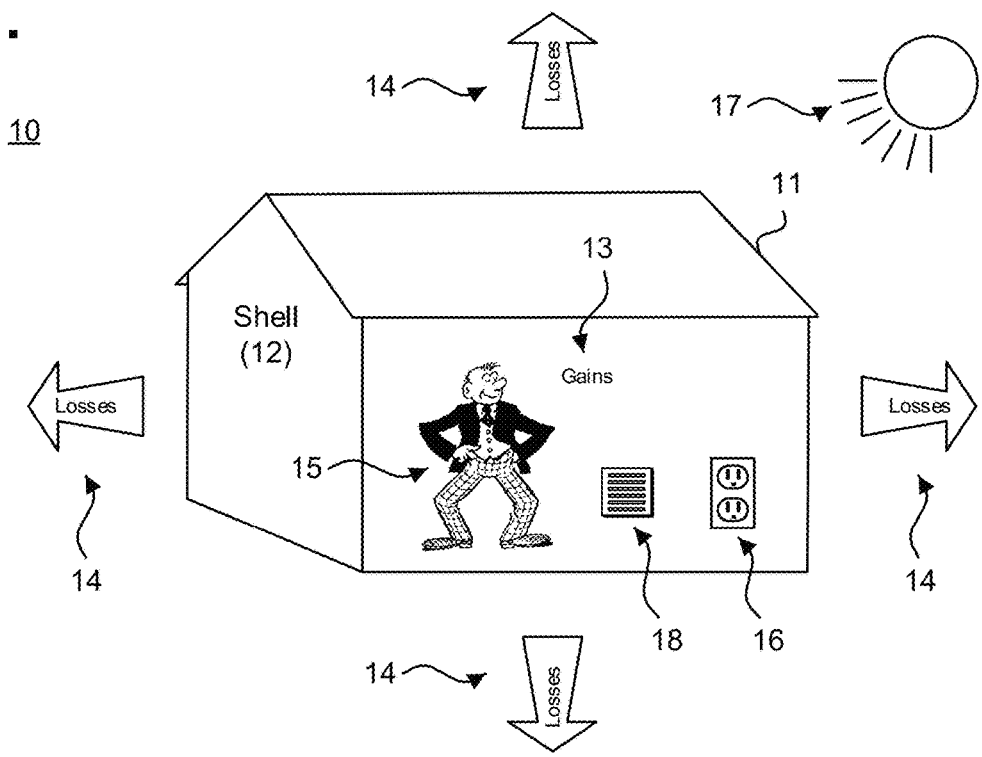
FIG. 1 is a functional block diagram showing heating losses and gains relative to a structure.

Conventional Energy Audit-Style Approach Conventionally, estimating periodic HVAC energy consumption and therefore fuel costs includes analytically determining a building's thermal conductivity ($UA^{Total}$) based on results obtained through an on-site energy audit. For instance, J. Randolf and G. Masters, *Energy for Sustainability: Technology, Planning, Policy*, pp. 247, 248, 279 (2008), present a typical approach to modeling heating energy consumption for a building, as summarized by Equations 6.23, 6.27, and 7.5. The combination of these equations states that annual heating fuel consumption $Q^{Fuel}$ equals the product of $UA^{Total}$, 24 hours per day, and the number of heating degree days (HDD) associated with a particular balance point temperature $T^{Balance\ Point}$, as adjusted for the solar savings fraction (SSF) divided by HVAC system efficiency ($\eta^{HVAC}$):

$$Q^{Fuel} = (UA^{Total})(24 * HDD^{T^{Balance\ Point}})(1 - SSF)\left(\frac{1}{\eta^{HVAC}}\right) \quad (1)$$

such that:

$$T^{Balance\ Point} = T^{Set\ Point} - \frac{\text{Internal Gains}}{UA^{Total}} \quad (2)$$

and $$\eta^{HVAC} = \eta^{Furnace}\eta^{Distribution} \quad (3)$$

where $T^{Set\ Point}$ represents the temperature setting of the thermostat, Internal Gains represents the heating gains experienced within the building as a function of heat generated by internal sources and auxiliary heating, as further discussed infra, $\eta^{Furnace}$ represents the efficiency of the furnace or heat source proper, and $\eta^{Distribution}$ represents the efficiency of the duct work and heat distribution system. For clarity, $HDD^{T^{Balance\ Point}}$ will be abbreviated to $HDD^{Balance\ Point\ Temp}$.

A cursory inspection of Equation (1) implies that annual fuel consumption is linearly related to a building's thermal conductivity. This implication further suggests that calculating fuel savings associated with building envelope or shell improvements is straightforward. In practice, however, such calculations are not straightforward because Equation (1) was formulated with the goal of determining the fuel required to satisfy heating energy needs. As such, there are several additional factors that the equation must take into consideration.

First, Equation (1) needs to reflect the fuel that is required only when indoor temperature exceeds outdoor temperature. This need led to the heating degree day (HDD) approach (or could be applied on a shorter time interval basis of less than one day) of calculating the difference between the average daily (or hourly) indoor and outdoor temperatures and retaining only the positive values. This approach complicates Equation (1) because the results of a non-linear term must be summed, that is, the maximum of the difference between average indoor and outdoor temperatures and zero. Non-linear equations complicate integration, that is, the continuous version of summation.

Second, Equation (1) includes the term Balance Point temperature ($T^{Balance\ Point}$). The goal of including the term $T^{Balance\ Point}$ was to recognize that the internal heating gains of the building effectively lowered the number of degrees of temperature that auxiliary heating needed to supply relative to the temperature setting of the thermostat $T^{Set\ Point}$. A balance point temperature $T^{Balance\ Point}$ of 65° F. was initially selected under the assumption that 65° F. approximately accounted for the internal gains. As buildings became more efficient, however, an adjustment to the balance point temperature $T^{Balance\ Point}$ was needed based on the building's thermal conductivity ($UA^{Total}$) and internal gains. This further complicated Equation (1) because the equation became indirectly dependent on (and inversely related to) $UA^{Total}$ through $T^{Balance\ Point}$.

Third, Equation (1) addresses fuel consumption by auxiliary heating sources. As a result, Equation (1) must be adjusted to account for solar gains. This adjustment was accomplished using the Solar Savings Fraction (SSF). The SSF is based on the Load Collector Ratio (see Eq. 7.4 in Randolf and Masters, p. 278, cited supra, for information about the LCR). The LCR, however, is also a function of $UA^{Total}$. As a result, the SSF is a function of $UA^{Total}$ in a complicated, non-closed form solution manner. Thus, the SSF further complicates calculating the fuel savings associated with building shell improvements because the SSF is indirectly dependent on $UA^{Total}$.

As a result, these direct and indirect dependencies significantly complicate calculating a change in annual fuel consumption based on a change in thermal conductivity. The difficulty is made evident by taking the derivative of Equation (1) with respect to a change in thermal conductivity. The chain and product rules from calculus need to be employed since $HDD^{Balance\ Point\ Temp}$ and SSF are indirectly dependent on $UA^{Total}$:

$$\frac{dQ^{Fuel}}{dUA^{Total}} = \left\{(UA^{Total})\left[(HDD^{Balance\ Point\ Temp})\left(-\frac{dSSF}{dLCR}\frac{dLCR}{dUA^{Total}}\right) + \left(\frac{dHDD^{Balance\ Point\ Temp}}{dT^{Balance\ Point}}\frac{dT^{Balance\ Point}}{dUA^{Total}}\right)(1-SSF)\right] + (HDD^{Balance\ Point\ Temp})(1-SSF)\right\}\left(\frac{24}{\eta^{HVAC}}\right) \quad (4)$$

The result is Equation (4), which is an equation that is difficult to solve due to the number and variety of unknown inputs that are required.

To add even further complexity to the problem of solving Equation (4), conventionally, $UA^{Total}$ is determined analytically by performing a detailed energy audit of a building. An energy audit involves measuring physical dimensions of walls, windows, doors, and other building parts; approximating R-values for thermal resistance; estimating infiltration using a blower door test; and detecting air leakage. A numerical model is then run to perform the calculations necessary to estimate thermal conductivity. Such an energy audit can be costly, time consuming, and invasive for building owners and occupants. Moreover, as a calculated result, the value estimated for $UA^{Total}$ carries the potential for inaccuracies, as the model is strongly influenced by physical mismeasurements or omissions, data assumptions, and so forth.

Empirically-Based Approaches to Modeling Heating Fuel Consumption

Building heating (and cooling) fuel consumption can be calculated through two approaches, annual (or periodic) and hourly (or interval) to thermally characterize a building without intrusive and time-consuming tests. The first approach, as further described infra beginning with reference to FIG. 1, requires typical monthly utility billing data and approximations of heating (or cooling) losses and gains. The second approach, as further described infra beginning with reference to FIG. 11, involves empirically deriving three building-specific parameters, thermal mass, thermal conductivity, and effective window area, plus HVAC system efficiency using short duration tests that last at most several days. The parameters are then used to simulate a time series of indoor building temperature and of fuel consumption. While the discussion herein is centered on building heating requirements, the same principles can be applied to an analysis of building cooling requirements. In addition, conversion factors for occupant heating gains (250 Btu of heat per person per hour), heating gains from internal electricity consumption (3,412 Btu per kWh), solar resource heating gains (3,412 Btu per kWh), and fuel pricing $$\left(\frac{Price^{NG}}{10^5}\right)$$

if in units of $ per therm and $$\frac{Price^{Electrity}}{3,412}$$

if in units of $ per kWh) are used by way of example; other conversion factors or expressions are possible.

First Approach: Annual (or Periodic) Fuel Consumption

Figure 11:
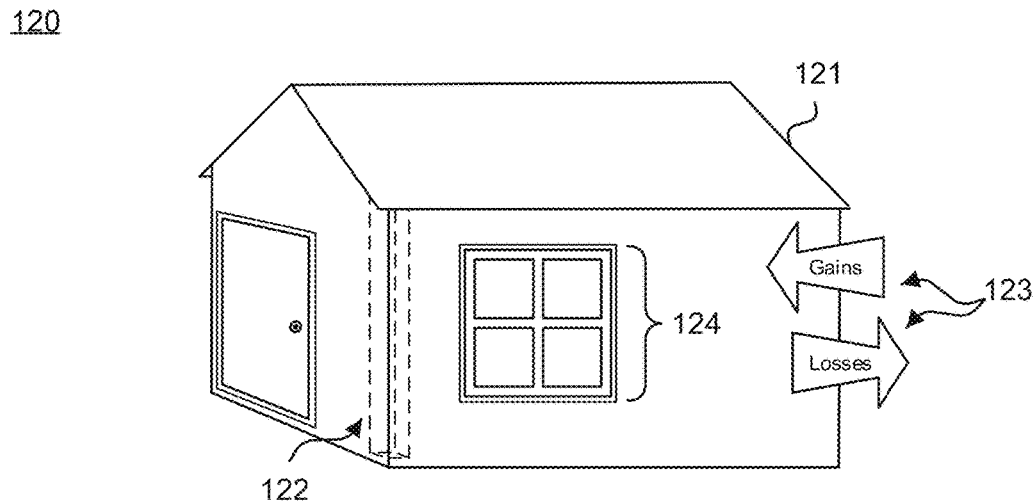
FIG. 11 is a functional block diagram showing heating losses and gains relative to a structure.

Fundamentally, thermal conductivity is the property of a material, here, a structure, to conduct heat. FIG. 11 is a functional block diagram 10 showing heating losses and gains relative to a structure 11. Inefficiencies in the shell 12 (or envelope) of a structure 11 can result in losses in interior heating 14, whereas gains 13 in heating generally originate either from sources within (or internal to) the structure 11, including heating gains from occupants 15, gains from operation of electric devices 16, and solar gains 17, or from auxiliary heating sources 18 that are specifically intended to provide heat to the structure's interior.

In this first approach, the concepts of balance point temperatures and solar savings fractions, per Equation (1), are eliminated. Instead, balance point temperatures and solar savings fractions are replaced with the single concept of balance point thermal conductivity. This substitution is made by separately allocating the total thermal conductivity of a building ($UA^{Total}$) to thermal conductivity for internal heating gains ($UA^{Balance\ Point}$), including occupancy, heat produced by operation of certain electric devices, and solar gains, and thermal conductivity for auxiliary heating ($UA^{Auxiliary\ Heating}$). The end result is Equation (34), further discussed in detail infra, which eliminates the indirect and non-linear parameter relationships in Equation (1) to $UA^{Total}$.

Figure 2:
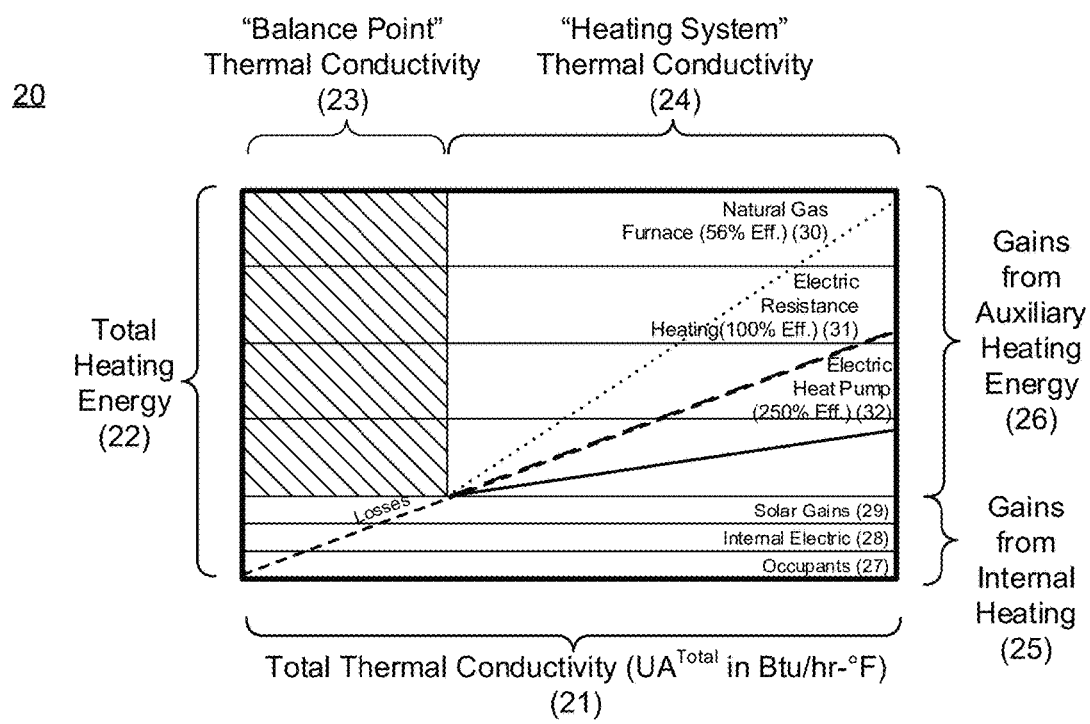
FIG. 2 is a graph showing, by way of example, balance point thermal conductivity.

The conceptual relationships embodied in Equation (34) can be described with the assistance of a diagram. FIG. 2 is a graph 20 showing, by way of example, balance point thermal conductivity $UA^{Balance\ Point}$, that is, the thermal conductivity for internal heating gains. The x-axis 21 represents total thermal conductivity, $UA^{Total}$, of a building (in units of Btu/hr-° F.). The y-axis 22 represents total heating energy consumed to heat the building. Total thermal conductivity 21 (along the x-axis) is divided into "balance point" thermal conductivity ($UA^{Balance\ Point}$) 23 and "heating system" (or auxiliary heating) thermal conductivity ($UA^{Auxiliary\ Heating}$) 24. "Balance point" thermal conductivity 23 characterizes heating losses, which can occur, for example, due to the escape of heat through the building envelope to the outside and by the infiltration of cold air through the building envelope into the building's interior that are compensated for by internal gains. "Heating system" thermal conductivity 24 characterizes heating gains, which reflects the heating delivered to the building's interior above the balance point temperature $T^{Balance\ Point}$, generally as determined by the setting of the auxiliary heating source's thermostat or other control point.

In this approach, total heating energy 22 (along the y-axis) is divided into gains from internal heating 25 and gains from auxiliary heating energy 25. Internal heating gains are broken down into heating gains from occupants 27, gains from operation of electric devices 28 in the building, and solar gains 29. Sources of auxiliary heating energy include, for instance, natural gas furnace 30 (here, with a 56% efficiency), electric resistance heating 31 (here, with a 100% efficiency), and electric heat pump 32 (here, with a 250% efficiency). Other sources of heating losses and gains are possible.

Figure 3:
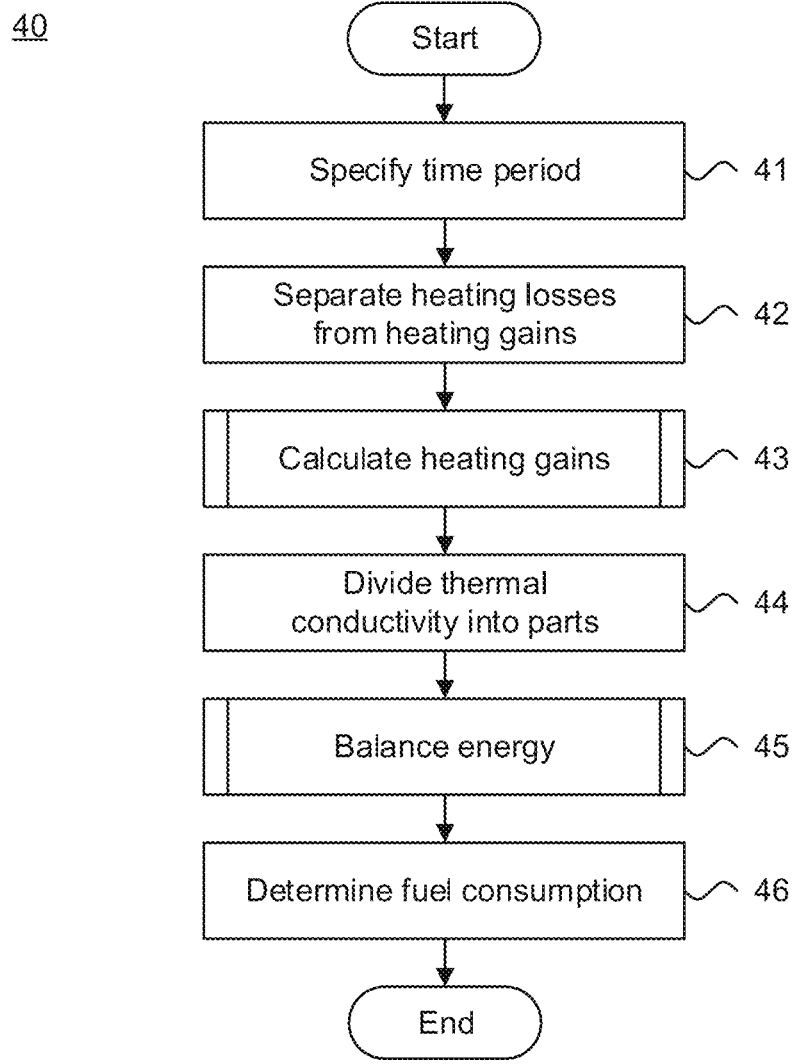
FIG. 3 is a flow diagram showing a computer-implemented method for modeling periodic building heating energy consumption in accordance with one embodiment.

The first approach provides an estimate of fuel consumption over a year or other period of inquiry based on the separation of thermal conductivity into internal heating gains and auxiliary heating. FIG. 3 is a flow diagram showing a computer-implemented method 40 for modeling periodic building heating energy consumption in accordance with one embodiment. Execution of the software can be performed with the assistance of a computer system, such as further described infra with reference to FIG. 23, as a series of process or method modules or steps.

In the first part of the approach (steps 41-43), heating losses and heating gains are separately analyzed. In the second part of the approach (steps 44-46), the portion of the heating gains that need to be provided by fuel, that is, through the consumption of energy for generating heating using auxiliary heating 18 (shown in FIG. 1), is determined to yield a value for annual (or periodic) fuel consumption. Each of the steps will now be described in detail.

Specify Time Period

Heating requirements are concentrated during the winter months, so as an initial step, the time period of inquiry is specified (step 41). The heating degree day approach (HDD) in Equation (1) requires examining all of the days of the year and including only those days where outdoor temperatures are less than a certain balance point temperature. However, this approach specifies the time period of inquiry as the winter season and considers all of the days (or all of the hours, or other time units) during the winter season. Other periods of inquiry are also possible, such as a five- or ten-year time frame, as well as shorter time periods, such as one- or two-month intervals.

Separate Heating Losses from Heating Gains

Heating losses are considered separately from heating gains (step 42). The rationale for drawing this distinction will now be discussed.

Heating Losses

For the sake of discussion herein, those regions located mainly in the lower latitudes, where outdoor temperatures remain fairly moderate year round, will be ignored and focus placed instead on those regions that experience seasonal shifts of weather and climate. Under this assumption, a heating degree day (HDD) approach specifies that outdoor temperature must be less than indoor temperature. No such limitation is applied in this present approach. Heating losses are negative if outdoor temperature exceeds indoor temperature, which indicates that the building will gain heat during these times. Since the time period has been limited to only the winter season, there will likely to be a limited number of days when that situation could occur and, in those limited times, the building will benefit by positive heating gain. (Note that an adjustment would be required if the building took advantage of the benefit of higher outdoor temperatures by circulating outdoor air inside when this condition occurs. This adjustment could be made by treating the condition as an additional source of heating gain.)

As a result, fuel consumption for heating losses $Q^{Losses}$ over the winter season equals the product of the building's total thermal conductivity $UA^{Total}$ and the difference between the indoor $T^{Indoor}$ and outdoor temperature $T^{Outdoor}$, summed over all of the hours of the winter season:

$$Q^{Losses} = \sum_{t_{Start}}^{t_{End}} (UA^{Total})(T_t^{Indoor} - T_t^{Outdoor}) \quad (5)$$

where Start and End respectively represent the first and last hours of the winter (heating) season.

Equation (5) can be simplified by solving the summation. Thus, total heating losses $Q^{Losses}$ equal the product of thermal conductivity $UA^{Total}$ and the difference between average indoor temperature $\bar{T}^{Indoor}$ and average outdoor temperature $\bar{T}^{Outdoor}$ over the winter season and the number of hours H in the season over which the average is calculated:

$$Q^{Losses} = (UA^{Total})(\bar{T}^{Indoor} - \bar{T}^{Outdoor})(H) \quad (6)$$

Heating Gains

Figure 4:
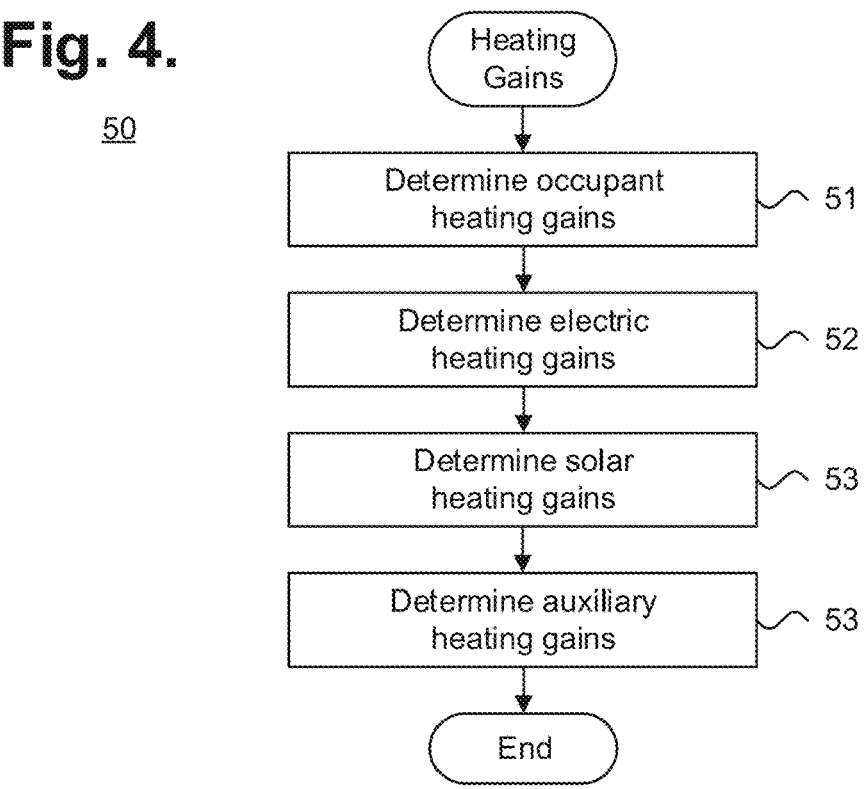
FIG. 4 is a flow diagram showing a routine for determining heating gains for use in the method of FIG. 3.

Heating gains are calculated for two broad categories (step 43) based on the source of heating, internal heating gains $Q^{Gains-Internal}$ and auxiliary heating gains $Q^{Gains-Auxiliary\ Heating}$, as further described infra with reference to FIG. 4. Internal heating gains can be subdivided into heating gained from occupants $Q^{Gains-Occupants}$, heating gained from the operation of electric devices $Q^{Gains-Electric}$ and heating gained from solar heating $Q^{Gains-Solar}$. Other sources of internal heating gains are possible. The total amount of heating gained $Q^{Gains}$ from these two categories of heating sources equals:

$$Q^{Gains} = Q^{Gains-Internal} + Q^{Gains-Auxiliary\ Heating} \quad (7)$$

where $$Q^{Gains-Internal} = Q^{Gains-Occupants} + Q^{Gains-Electric} + Q^{Gains-Solar} \quad (8)$$

Calculate Heating Gains

Equation (8) states that internal heating gains $Q^{Gains\text{-}Internal}$ include heating gains from Occupant, Electric, and Solar heating sources. FIG. 4 is a flow diagram showing a routine 50 for determining heating gains for use in the method 40 of FIG. 3 Each of these heating gain sources will now be discussed.

Occupant Heating Gains

People occupying a building generate heat. Occupant heating gains $Q^{Gains\text{-}Occupants}$ (step 51) equal the product of the heat produced per person, the average number of people in a building over the time period, and the number of hours (H) (or other time units) in that time period. Let $\overline{P}$ represent the average number of people. For instance, using a conversion factor of 250 Btu of heat per person per hour, heating gains from the occupants $Q^{Gains\text{-}Occupants}$ equal:

$$Q^{Gains\text{-}Occupants} = 250(\overline{P})(H) \qquad (9)$$

Other conversion factors or expressions are possible.

Electric Heating Gains

The operation of electric devices that deliver all heat that is generated into the interior of the building, for instance, lights, refrigerators, and the like, contribute to internal heating gain. Electric heating gains $Q^{Gains\text{-}Electric}$ (step 52) equal the amount of electricity used in the building that is converted to heat over the time period.

Care needs to be taken to ensure that the measured electricity consumption corresponds to the indoor usage. Two adjustments may be required. First, many electric utilities measure net electricity consumption. The energy produced by any photovoltaic (PV) system needs to be added back to net energy consumption (Net) to result in gross consumption if the building has a net-metered PV system. This amount can be estimated using time- and location-correlated solar resource data, as well as specific information about the orientation and other characteristics of the photovoltaic system, such as can be provided by the Solar Anywhere SystemCheck service (http://www.SolarAnywhere_com), a Web-based service operated by Clean Power Research, L.L.C., Napa, CA, with the approach described, for instance, in commonly-assigned U.S. Pat. No. 10,719,636, issued Jul. 21, 2020, the disclosure of which is incorporated by reference, or measured directly.

Second, some uses of electricity may not contribute heat to the interior of the building and need be factored out as external electric heating gains (External). These uses include electricity used for electric vehicle charging, electric dryers (assuming that most of the hot exhaust air is vented outside of the building, as typically required by building code), outdoor pool pumps, and electric water heating using either direct heating or heat pump technologies (assuming that most of the hot water goes down the drain and outside the building—a large body of standing hot water, such as a bathtub filled with hot water, can be considered transient and not likely to appreciably increase the temperature indoors over the long run).

For instance, using a conversion factor from kWh to Btu of 3,412 Btu per kWh (since $Q^{Gains\text{-}Electric}$ is in units of Btu), internal electric gains $Q^{Gains\text{-}Electric}$ equal:

$$Q^{Gains\text{-}Electric} = (\overline{Net + PV - External})(H)\left(\frac{3,412 \text{ Btu}}{\text{kWh}}\right) \qquad (10)$$

where Net represents net energy consumption, PV represents any energy produced by a PV system, External represents heating gains attributable to electric sources that do not contribute heat to the interior of a building. Other conversion factors or expressions are possible. The average delivered electricity $\overline{Net + PV - External}$ equals the total over the time period divided by the number of hours (H) in that time period.

$$\overline{Net + PV - External} = \frac{Net + PV - External}{H} \qquad (11)$$

Solar Heating Gains

Solar energy that enters through windows, doors, and other openings in a building as sunlight will heat the interior. Solar heating gains $Q^{Gains\text{-}Solar}$ (step 53) equal the amount of heat delivered to a building from the sun. In the northern hemisphere, $Q^{Gains\text{-}Solar}$ can be estimated based on the south-facing window area (m²) times the solar heating gain coefficient (SHGC) times a shading factor; together, these terms are represented by the effective window area (W). Solar heating gains $Q^{Gains\text{-}Solar}$ equal the product of W, the average direct vertical irradiance (DVI) available on a south-facing surface (Solar, as represented by DVI in kW/m²), and the number of hours (H) in the time period. For instance, using a conversion factor from kWh to Btu of 3,412 Btu per kWh (since $Q^{Gains\text{-}Solar}$ is in units of Btu while average solar is in kW/m²), solar heating gains $Q^{Gains\text{-}Solar}$ equal:

$$Q^{Gains\text{-}Solar} = (\overline{Solar})(W)(H)\left(\frac{3,412 \text{ Btu}}{\text{kWh}}\right) \qquad (12)$$

Other conversion factors or expressions are possible.

Note that for reference purposes, the SHGC for one particular high quality window designed for solar gains, the Andersen High-Performance Low-E4 PassiveSun Glass window product, manufactured by Andersen Corporation, Bayport, MN, is 0.54; many windows have SHGCs that are between 0.20 to 0.25.

Auxiliary Heating Gains

The internal sources of heating gain share the common characteristic of not being operated for the sole purpose of heating a building, yet nevertheless making some measurable contribution to the heat to the interior of a building. The fourth type of heating gain, auxiliary heating gains $Q^{Gains\text{-}Auxiliary\ Heating}$ consumes fuel specifically to provide heat to the building's interior and, as a result, must include conversion efficiency. The gains from auxiliary heating gains $Q^{Gains\text{-}Auxiliary\ Heating}$ (step 53) equal the product of the average hourly fuel consumed $\overline{Q}^{Fuel}$ times the hours (H) in the period times HVAC system efficiency $\eta^{HVAC}$.

$$Q^{Gains\text{-}Auxiliary\ Heating} = (\overline{Q}^{Fuel})(H)(\eta^{HVAC}) \qquad (13)$$

Equation (13) can be stated in a more general form that can be applied to both heating and cooling seasons by adding a binary multiplier, HeatOrCool. The binary multiplier HeatOrCool equals 1 when the heating system is in operation and equals −1 when the cooling system is in operation. This more general form will be used in a subsequent section.

$$Q^{Gains(Losses)\text{-}HVAC} = (HeatOrCool)(\overline{Q}^{Fuel})(H)(\eta^{HVAC}) \qquad (14)$$

Divide Thermal Conductivity into Parts

Consider the situation when the heating system is in operation. The HeatingOrCooling term in Equation (14) equals 1 in the heating season. As illustrated in FIG. 3, a building's thermal conductivity $UA^{Total}$, rather than being treated as a single value, can be conceptually divided into two parts (step 44), with a portion of $UA^{Total}$ allocated to "balance point thermal conductivity" ($UA^{Balance\ Point}$) and a portion to "auxiliary heating thermal conductivity" ($UA^{Auxiliary\ Heating}$), such as pictorially described supra with reference to FIG. 2. $UA^{Balance\ Point}$ corresponds to the heating losses that a building can sustain using only internal heating gains $Q^{Gains-Internal}$. This value is related to the concept that a building can sustain a specified balance point temperature in light of internal gains. However, instead of having a balance point temperature, some portion of the building $UA^{Balance\ Point}$ is considered to be thermally sustainable given heating gains from internal heating sources ($Q^{Gains-Internal}$). As the rest of the heating losses must be made up by auxiliary heating gains, the remaining portion of the building $UA^{Auxiliary\ Heating}$ is considered to be thermally sustainable given heating gains from auxiliary heating sources ($Q^{Gains-Auxiliary\ Heating}$). The amount of auxiliary heating gained is determined by the setting of the auxiliary heating source's thermostat or other control point. Thus, $UA^{Total}$ can be expressed as:

$$UA^{Total} = UA^{Balance\ Point} + UA^{Auxiliary\ Heating} \quad (15)$$

where $$UA^{Balance\ Point} = UA^{Occupants} + UA^{Electric} + UA^{Solar} \quad (16)$$

such that $UA^{Occupants}$, $UA^{Electric}$, and $UA^{solar}$ respectively represent the thermal conductivity of internal heating sources, specifically, occupants, electric and solar.

In Equation (15), total thermal conductivity $UA^{Total}$ is fixed at a certain value for a building and is independent of weather conditions; $UA^{Total}$ depends upon the building's efficiency. The component parts of Equation (15), balance point thermal conductivity $UA^{Balance\ Point}$ and auxiliary heating thermal conductivity $UA^{Auxiliary\ Heating}$, however, are allowed to vary with weather conditions. For example, when the weather is warm, there may be no auxiliary heating in use and all of the thermal conductivity will be allocated to the balance point thermal conductivity $UA^{Balance\ Point}$ component.

Fuel consumption for heating losses $Q^{Losses}$ can be determined by substituting Equation (15) into Equation (6):

$$Q^{Losses} = (UA^{Balance\ Point} + UA^{Auxiliary\ Heating})(T^{Indoor} - T^{Outdoor})(H) \quad (17)$$

Balance Energy

Figure 5:
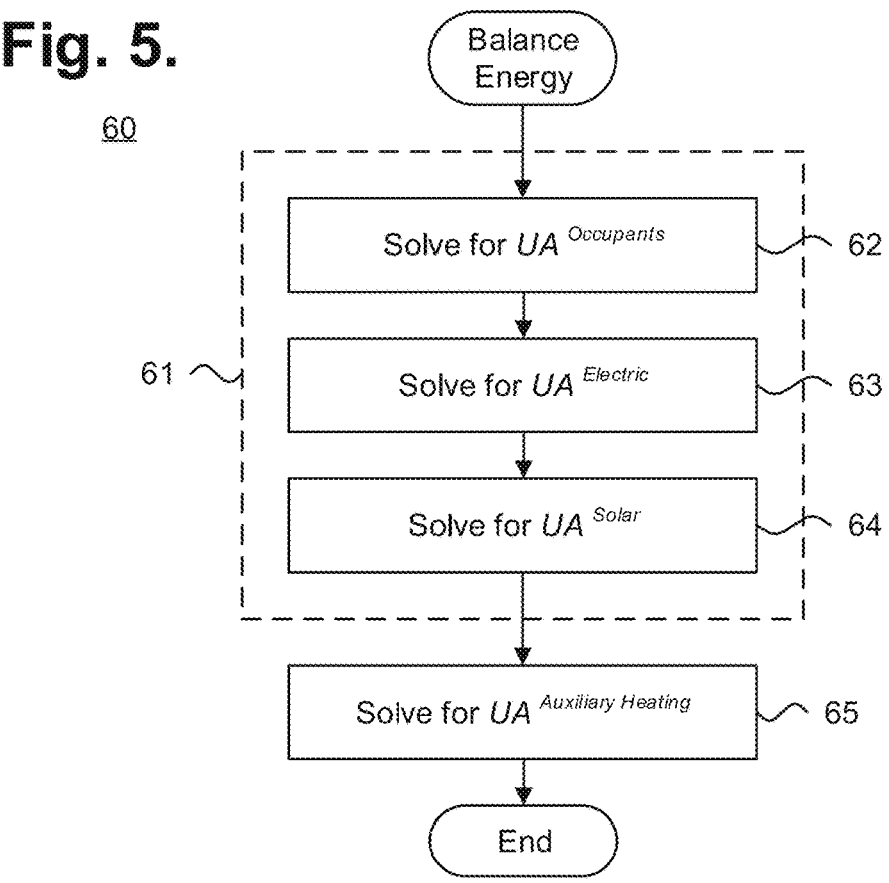
FIG. 5 is a flow diagram showing a routine for balancing energy for use in the method of FIG. 3.

Heating gains must equal heating losses for the system to balance (step 45), as further described infra with reference to FIG. 5. Heating energy balance is represented by setting Equation (7) equal to Equation (17):

$$Q^{Gains-Internal} + Q^{Gains-Auxiliary\ Heating} = \quad (18)$$
$$(UA^{Balance\ Point} + UA^{Auxiliary\ Heating})(T^{Indoor} - T^{Outdoor})(H)$$

The result can then be divided by $(T^{Indoor} - T^{Outdoor})(H)$, assuming that this term is non-zero:

$$UA^{Balance\ Point} + UA^{Auxiliary\ Heating} = \quad (19)$$
$$\frac{Q^{Gains-Internal} + Q^{Gains-Auxiliary\ Heating}}{(T^{Indoor} - T^{Outdoor})(H)}$$

Equation (19) expresses energy balance as a combination of both $UA^{Balance\ Point}$ and $UA^{Auxiliary\ Heating}$. FIG. 5 is a flow diagram showing a routine 60 for balancing energy for use in the method 40 of FIG. 3. Equation (19) can be further constrained by requiring that the corresponding terms on each side of the equation match, which will divide Equation (19) into a set of two equations:

$$UA^{Balance\ Point} = \frac{Q^{Gains-Internal}}{(T^{Indoor} - T^{Outdoor})(H)} \quad (20)$$

$$UA^{Auxiliary\ Heating} = \frac{Q^{Gains-Auxiliary\ Heating}}{(T^{Indoor} - T^{Outdoor})(H)} \quad (21)$$

The $UA^{Balance\ Point}$ should always be a positive value. Equation (20) accomplishes this goal in the heating season. An additional term, HeatOrCool is required for the cooling season that equals 1 in the heating season and −1 in the cooling season.

$$UA^{Balance\ Point} = \frac{(HeatOrCool)(Q^{Gains-Internal})}{(T^{Indoor} - T^{Outdoor})(H)} \quad (22)$$

HeatOrCool and its inverse are the same. Thus, internal gains equals:

$$Q^{Gains-Internal} = (HeatOrCool)(UA^{Balance\ Point})$$
$$(T^{Indoor} - T^{Outdoor})(H) \quad (23)$$

Components of $UA^{Balance\ Point}$

For clarity, $UA^{Balance\ Point}$ can be divided into three component values (step 61) by substituting Equation (8) into Equation (20):

$$UA^{Balance\ Point} = \frac{Q^{Gains-Occupants} + Q^{Gains-Electric} + Q^{Gains-Solar}}{(T^{Indoor} - T^{Outdoor})(H)} \quad (24)$$

Since $UA^{Balance\ Point}$ equals the sum of three component values (as specified in Equation (16)), Equation (24) can be mathematically limited by dividing Equation (24) into three equations:

$$UA^{Occupants} = \frac{Q^{Gains-Occupants}}{(T^{Indoor} - T^{Outdoor})(H)} \quad (25)$$

$$UA^{Electric} = \frac{Q^{Gains-Electric}}{(T^{Indoor} - T^{Outdoor})(H)} \quad (26)$$

$$UA^{Solar} = \frac{Q^{Gains-Solar}}{(T^{Indoor} - T^{Outdoor})(H)} \quad (27)$$

Solutions for Components of $UA^{Balance\ Point}$ and $UA^{Auxiliary\ Heating}$

The preceding equations can be combined to present a set of results with solutions provided for the four thermal conductivity components as follows. First, the portion of the balance point thermal conductivity associated with occupants $UA^{Occupants}$ (step 62) is calculated by substituting Equation (9) into Equation (25). Next, the portion of the balance point thermal conductivity $UA^{Electric}$ associated with internal electricity consumption (step 63) is calculated by substituting Equation (10) into Equation (26). Internal electricity consumption is the amount of electricity consumed internally in the building and excludes electricity consumed for HVAC operation, pool pump operation, electric water heating, electric vehicle charging, and so on, since these sources of electricity consumption result in heat or work being used external to the inside of the building. The portion of the balance point thermal conductivity $UA^{Solar}$ associated with solar gains (step 64) is then calculated by substituting Equation (12) into Equation (27). Finally, thermal conductivity $UA^{Auxiliary\ Heating}$ associated with auxiliary heating (step 64) is calculated by substituting Equation (13) into Equation (21).

$$UA^{Occupants} = \frac{250(\overline{P})}{(\overline{T}^{Indoor} - \overline{T}^{Outdoor})} \quad (28)$$

$$UA^{Electric} = \frac{(\overline{Net + PV} - \overline{External})}{(\overline{T}^{Indoor} - \overline{T}^{Outdoor})}\left(\frac{3{,}412\ Btu}{kWh}\right) \quad (29)$$

$$UA^{Solar} = \frac{(\overline{Solar})(W)}{(\overline{T}^{Indoor} - \overline{T}^{Outdoor})}\left(\frac{3{,}412\ Btu}{kWh}\right) \quad (30)$$

$$UA^{Auxiliary\ Heating} = \frac{\overline{Q}^{Fuel}\eta^{HVAC}}{(\overline{T}^{Indoor} - \overline{T}^{Outdoor})} \quad (31)$$

Determine Fuel Consumption

Referring back to FIG. 3, Equation (31) can used to derive a solution to annual (or periodic) heating fuel consumption. First, Equation (15) is solved for $UA^{Auxiliary\ Heating}$:

$$UA^{Auxiliary\ Heating} = UA^{Total} - UA^{Balance\ Point} \quad (32)$$

Equation (32) is then substituted into Equation (31):

$$UA^{Total} - UA^{Balance\ Point} = \frac{\overline{Q}^{Fuel}\eta^{HVAC}}{(\overline{T}^{Indoor} - \overline{T}^{Outdoor})} \quad (33)$$

Finally, solving Equation (33) for fuel and multiplying by the number of hours (H) in (or duration of) the time period yields:

$$\boxed{Q^{Fuel} = \frac{(UA^{Total} - UA^{Balance\ Point})(\overline{T}^{Indoor} - \overline{T}^{Outdoor})(H)}{\eta^{HVAC}}} \quad (34)$$

Equation (34) is valid during the heating season and applies where $UA^{Total} \geq UA^{Balance\ Point}$. Otherwise, fuel consumption is 0.

Using Equation (34), annual (or periodic) heating fuel consumption $Q^{Fuel}$ can be determined (step 46). The building's thermal conductivity $UA^{Total}$, if already available through, for instance, the results of an energy audit, is obtained. Otherwise, $UA^{Total}$ can be determined by solving Equations (28) through (31) using historical fuel consumption data, such as shown, by way of example, in the table of FIG. 7, or by solving Equation (52), as further described infra. $UA^{Total}$ can also be empirically determined with the approach described, for instance, in commonly-assigned U.S. Pat. No. 10,024,733, issued Jul. 17, 2018, the disclosure of which is incorporated by reference. Other ways to determine $UA^{Total}$ are possible. $UA^{Balance\ Point}$ can be determined by solving Equation (24). The remaining values, average indoor temperature $\overline{T}^{Indoor}$ and average outdoor temperature $\overline{T}^{Outdoor}$ HVAC system efficiency $\eta^{HVAC}$, can respectively be obtained from historical weather data and manufacturer specifications.

Practical Considerations

Equation (34) is empowering. Annual heating fuel consumption $Q^{Fuel}$ can be readily determined without encountering the complications of Equation (1), which is an equation that is difficult to solve due to the number and variety of unknown inputs that are required. The implications of Equation (34) in consumer decision-making, a general discussion, and sample applications of Equation (34) will now be covered.

Change in Fuel Requirements Associated with Decisions Available to Consumers

Figures 6, 7:
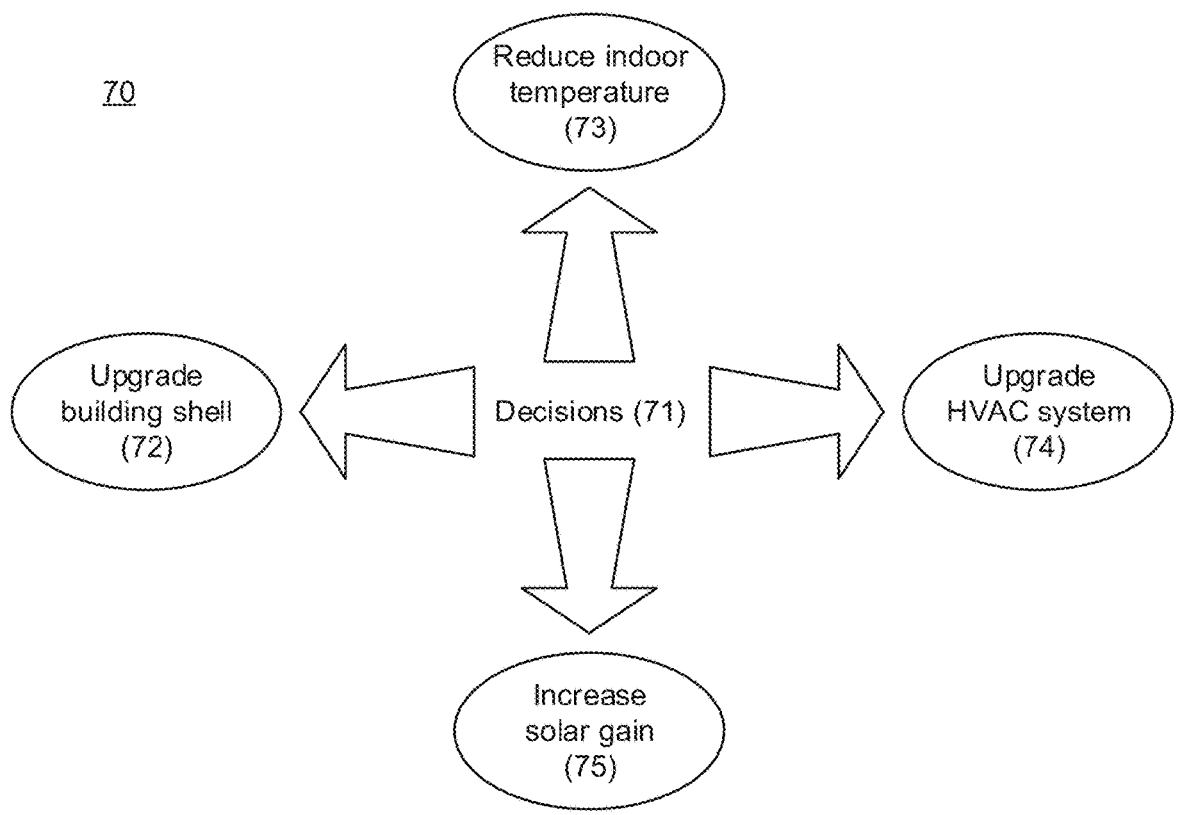
FIG. 6 is a process flow diagram showing, by way of example, consumer heating energy consumption-related decision points.
FIG. 7 is a table showing, by way of example, data used to calculate thermal conductivity.

Consumers have four decisions available to them that affects their energy consumption for heating. FIG. 6 is a process flow diagram showing, by way of example, consumer heating energy consumption-related decision points. These decisions 71 include:

1. Change the thermal conductivity $UA^{Total}$ by upgrading the building shell to be more thermally efficient (process 72).
2. Reduce or change the average indoor temperature by reducing the thermostat manually, programmatically, or through a "learning" thermostat (process 73).
3. Upgrade the HVAC system to increase efficiency (process 74).
4. Increase the solar gain by increasing the effective window area (process 75).

Other decisions are possible. Here, these four specific options can be evaluated supra by simply taking the derivative of Equation (34) with respect to a variable of interest. The result for each case is valid where $UA^{Total} \geq UA^{Balance\ Point}$. Otherwise, fuel consumption is 0.

Changes associated with other internal gains, such as increasing occupancy, increasing internal electric gains, or increasing solar heating gains, could be calculated using a similar approach.

Change in Thermal Conductivity

A change in thermal conductivity $UA^{Total}$ can affect a change in fuel requirements. The derivative of Equation (34) is taken with respect to thermal conductivity, which equals the average indoor minus outdoor temperatures times the number of hours divided by HVAC system efficiency. Note that initial thermal efficiency is irrelevant in the equation. The effect of a change in thermal conductivity $UA^{Total}$ (process 72) can be evaluated by solving:

$$\frac{dQ^{Fuel}}{dUA^{Total}} = \frac{(\overline{T}^{Indoor} - \overline{T}^{Outdoor})(H)}{\eta^{HVAC}} \quad (35)$$

Change in Average Indoor Temperature

A change in average indoor temperature can also affect a change in fuel requirements. The derivative of Equation (34) is taken with respect to the average indoor temperature. Since $UA^{Balance\ Point}$ is also a function of average indoor temperature, application of the product rule is required. After simplifying, the effect of a change in average indoor temperature (process 73) can be evaluated by solving:

$$\frac{dQ^{Fuel}}{d\overline{T}^{Indoor}} = (UA^{Total})\left(\frac{H}{\eta^{HVAC}}\right) \quad (36)$$

Change in HVAC System Efficiency

As well, a change in HVAC system efficiency can affect a change in fuel requirements. The derivative of Equation (34) is taken with respect to HVAC system efficiency, which equals current fuel consumption divided by HVAC system efficiency. Note that this term is not linear with efficiency and thus is valid for small values of efficiency changes. The effect of a change in fuel requirements relative to the change in HVAC system efficiency (process 74) can be evaluated by solving:

$$\frac{dQ^{Fuel}}{d\eta^{HVAC}} = -Q^{Fuel}\left(\frac{1}{\eta^{HVAC}}\right) \quad (37)$$

Change in Solar Gains

An increase in solar gains can be accomplished by increasing the effective area of south-facing windows. Effective area can be increased by trimming trees blocking windows, removing screens, cleaning windows, replacing windows with ones that have higher SHGCs, installing additional windows, or taking similar actions. In this case, the variable of interest is the effective window area W. The total gain per square meter of additional effective window area equals the available resource (kWh/m²) divided by HVAC system efficiency, converted to Btus. The derivative of Equation (34) is taken with respect to effective window area. The effect of an increase in solar gains (process 74) can be evaluated by solving:

$$\frac{dQ^{Fuel}}{dW} = -\left[\frac{(\overline{Solar})(H)}{\eta^{HVAC}}\right]\left(\frac{3,412 \text{ Btu}}{\text{kWh}}\right) \quad (38)$$

Discussion

Both Equations (1) and (34) provide ways to calculate fuel consumption requirements. The two equations differ in several key ways:

1. $UA^{Total}$ only occurs in one place in Equation (34), whereas Equation (1) has multiple indirect and non-linear dependencies to $UA^{Total}$.
2. $UA^{Total}$ is divided into two parts in Equation (34), while there is only one occurrence of $UA^{Total}$ in Equation (1).
3. The concept of balance point thermal conductivity in Equation (34) replaces the concept of balance point temperature in Equation (1).
4. Heat from occupants, electricity consumption, and solar gains are grouped together in Equation (34) as internal heating gains, while these values are treated separately in Equation (1).

Second, Equations (28) through (31) provide empirical methods to determine both the point at which a building has no auxiliary heating requirements and the current thermal conductivity. Equation (1) typically requires a full detailed energy audit to obtain the data required to derive thermal conductivity. In contrast, Equations (25) through (28), as applied through the first approach, can substantially reduce the scope of an energy audit.

Third, both Equation (4) and Equation (35) provide ways to calculate a change in fuel requirements relative to a change in thermal conductivity. However, these two equations differ in several key ways:

1. Equation (4) is complex, while Equation (35) is simple.
2. Equation (4) depends upon current building thermal conductivity, balance point temperature, solar savings fraction, auxiliary heating efficiency, and a variety of other derivatives. Equation (35) only requires the auxiliary heating efficiency in terms of building-specific information.

Equation (35) implies that, as long as some fuel is required for auxiliary heating, a reasonable assumption, a change in fuel requirements will only depend upon average indoor temperature (as approximated by thermostat setting), average outdoor temperature, the number of hours (or other time units) in the (heating) season, and HVAC system efficiency. Consequently, any building shell (or envelope) investment can be treated as an independent investment. Importantly, Equation (35) does not require specific knowledge about building construction, age, occupancy, solar gains, internal electric gains, or the overall thermal conductivity of the building. Only the characteristics of the portion of the building that is being replaced, the efficiency of the HVAC system, the indoor temperature (as reflected by the thermostat setting), the outdoor temperature (based on location), and the length of the winter season are required; knowledge about the rest of the building is not required. This simplification is a powerful and useful result.

Fourth, Equation (36) provides an approach to assessing the impact of a change in indoor temperature, and thus the effect of making a change in thermostat setting. Note that Equation (31) only depends upon the overall efficiency of the building, that is, the building's total thermal conductivity $UA^{Total}$, the length of the winter season (in number of hours or other time units), and the HVAC system efficiency; Equation (31) does not depend upon either the indoor or outdoor temperature.

Equation (31) is useful in assessing claims that are made by HVAC management devices, such as the Nest thermostat device, manufactured by Nest Labs, Inc., Palo Alto, CA, or the Lyric thermostat device, manufactured by Honeywell Int'l Inc., Morristown, NJ, or other so-called "smart" thermostat devices. The fundamental idea behind these types of HVAC management devices is to learn behavioral patterns, so that consumers can effectively lower (or raise) their average indoor temperatures in the winter (or summer) months without affecting their personal comfort. Here, Equation (31) could be used to estimate the value of heating and cooling savings, as well as to verify the consumer behaviors implied by the new temperature settings.

Balance Point Temperature

Before leaving this section, balance point temperature should briefly be discussed. The formulation in this first approach does not involve balance point temperature as an input. A balance point temperature, however, can be calculated to equal the point at which there is no fuel consumption, such that there are no gains associated with auxiliary heating ($Q^{Gains-Auxiliary\ Heating}$ equals 0) and the auxiliary heating thermal conductivity ($UA^{Auxiliary\ Heating}$ in Equation (31)) is zero. Inserting these assumptions into Equation (19) and labeling $T^{Outdoor}$ as $T^{Balance\ Point}$ yields:

$$Q^{Gains\text{-}Internal} = UA^{Total}(T^{Indoor} - T^{Balance\ Point})(H) \quad (39)$$

Equation (39) simplifies to:

$$T^{Balance\ Point} = T^{Indoor} - \frac{\overline{Q}^{Gains-Internal}}{UA^{Total}} \quad (40)$$

-continued where $$\overline{Q}^{Gains-Internal} = \frac{Q^{Gains-Internal}}{H}$$

Equation (40) is identical to Equation (2), except that average values are used for indoor temperature $\overline{T}^{Indoor}$ balance point temperature $\overline{T}^{Balance\ Point}$, and fuel consumption for internal heating gains $\overline{Q}^{Gains-Internal}$, and that heating gains from occupancy ($Q^{Gains-Occupants}$), electric ($Q^{Gains-Electric}$), and solar ($Q^{Gains-Solar}$) are all included as part of internal heating gains ($Q^{Gains-Internal}$).

Application: Change in Thermal Conductivity Associated with One Investment

An approach to calculating a new value for total thermal conductivity $\widehat{UA}^{Total}$ after a series of M changes (or investments) are made to a building is described in commonly-assigned U.S. Pat. No. 10,719,789, issued Jul. 21, 2020, the disclosure of which is incorporated, by reference. The approach is summarized therein in Equation (41), which provides:

$$\widehat{UA}^{Total} = UA^{Total} + \sum_{j=1}^{M}(U^j - \hat{U}^j)A^j + \rho c(n - \hat{n})V \quad (41)$$

where a caret symbol (^) denotes a new value, infiltration losses are based on the density of air (φ, specific heat of air (c), number of air changes per hour (n), and volume of air per air change (V). In addition, $U^j$ and $\hat{U}^j$ respectively represent the existing and proposed U-values of surface j, and $A^j$ represents the surface area of surface j. The volume of the building V can be approximated by multiplying building square footage by average ceiling height. The equation, with a slight restatement, equals:

$$\widehat{UA}^{Total} = UA^{Total} + \Delta UA^{Total} \quad (42)$$

and $$\Delta UA^{Total} = \sum_{j=1}^{M}(U^j - \hat{U}^j)A^j + \rho c(n - \hat{n})V. \quad (43)$$

If there is only one investment, the m superscripts can be dropped and the change in thermal conductivity $UA^{Total}$ equals the area (A) times the difference of the inverse of the old and new R-values R and $\hat{R}$:

$$\Delta UA^{Total} = A(U - \hat{U}) = A\left(\frac{1}{R} - \frac{1}{\hat{R}}\right). \quad (44)$$

Fuel Savings

The fuel savings associated with a change in thermal conductivity $UA^{Total}$ for a single investment equals Equation (44) times (35):

$$\Delta Q^{Fuel} = \Delta UA^{Total}\frac{dQ^{Fuel}}{dUA^{Total}} = A\left(\frac{1}{R} - \frac{1}{\hat{R}}\right)\frac{(\overline{T}^{Indoor} - \overline{T}^{Outdoor})(H)}{\eta^{HVAC}} \quad (45)$$

where $\Delta Q^{Fuel}$ signifies the change in fuel consumption.

Economic Value

The economic value of the fuel savings (Annual Savings) equals the fuel savings times the average fuel price (Price) for the building in question:

$$\text{Annual Savings} = A\left(\frac{1}{R} - \frac{1}{\hat{R}}\right)\frac{(\overline{T}^{Indoor} - \overline{T}^{Outdoor})(H)}{\eta^{HVAC}}(\text{Price}) \quad (46)$$

where $$\text{Price} = \begin{cases} \dfrac{\text{Price}^{NG}}{10^5} & \text{if price has units of \$ per therm} \\ \dfrac{\text{Price}^{Electrity}}{3,412} & \text{if price has units of \$ per kWh} \end{cases}$$

where $\text{Price}^{NG}$ represents the price of natural gas and $\text{Price}^{Electrity}$ represents the price of electricity. Other pricing amounts, pricing conversion factors, or pricing expressions are possible.

Example

Consider an example. A consumer in Napa, CA wants to calculate the annual savings associating with replacing a 20 ft² single-pane window that has an R-value of 1 with a high efficiency window that has an R-value of 4. The average temperature in Napa over the 183-day winter period (4,392 hours) from October 1 to Mar. 31 is 50° F. The consumer sets his thermostat at 68° F., has a 60 percent efficient natural gas heating system, and pays $1 per therm for natural gas. How much money will the consumer save per year by making this change?

Putting this information into Equation (46) suggests that he will save $20 per year:

$$\text{Annual Savings} = 20\left(\frac{1}{1} - \frac{1}{4}\right)\frac{(68-50)(4,392)}{0.6}\left(\frac{1}{10^5}\right) = \$20 \quad (47)$$

Application: Validate Building Shell Improvements Savings

Many energy efficiency programs operated by power utilities grapple with the issue of measurement and evaluation (M&E), particularly with respect to determining whether savings have occurred after building shell improvements were made. Equations (28) through (31) can be applied to help address this issue. These equations can be used to calculate a building's total thermal conductivity $UA^{Total}$. This result provides an empirical approach to validating the benefits of building shell investments using measured data.

Equations (28) through (31) require the following inputs:
1) Weather:
   a) Average outdoor temperature (° F.).
   b) Average indoor temperature (° F.).
   c) Average direct solar resource on a vertical, south-facing surface.
2) Fuel and energy:
   a) Average gross indoor electricity consumption.
   b) Average natural gas fuel consumption for space heating.
   c) Average electric fuel consumption for space heating.
3) Other inputs:
   a) Average number of occupants.
   b) Effective window area.
   c) HVAC system efficiency.

Weather data can be determined as follows. Indoor temperature can be assumed based on the setting of the thermostat (assuming that the thermostat's setting remained constant throughout the time period), or measured and recorded using a device that takes hourly or periodic indoor temperature measurements, such as a Nest thermostat device or a Lyric thermostat device, cited supra, or other so-called "smart" thermostat devices. Outdoor temperature and solar resource data can be obtained from a service, such as Solar Anywhere SystemCheck, cited supra, or the National Weather Service. Other sources of weather data are possible.

Fuel and energy data can be determined as follows. Monthly utility billing records provide natural gas consumption and net electricity data. Gross indoor electricity consumption can be calculated by adding PV production, whether simulated using, for instance, the Solar Anywhere SystemCheck service, cited supra, or measured directly, and subtracting out external electricity consumption, that is, electricity consumption for electric devices that do not deliver all heat that is generated into the interior of the building. External electricity consumption includes electric vehicle (EV) charging and electric water heating. Other types of external electricity consumption are possible. Natural gas consumption for heating purposes can be estimated by subtracting non-space heating consumption, which can be estimated, for instance, by examining summer time consumption using an approach described in commonly-assigned U.S. Pat. No. 10,789,396, issued Sep. 29, 2020, the disclosure of which is incorporated by reference. Other sources of fuel and energy data are possible.

Finally, the other inputs can be determined as follows. The average number of occupants can be estimated by the building owner or occupant. Effective window area can be estimated by multiplying actual south-facing window area times solar heat gain coefficient (estimated or based on empirical tests, as further described infra), and HVAC system efficiency can be estimated (by multiplying reported furnace rating times either estimated or actual duct system efficiency), or can be based on empirical tests, as further described infra. Other sources of data for the other inputs are possible.

Consider an example. FIG. 7 is a table 80 showing, by way of example, data used to calculate thermal conductivity. The data inputs are for a sample house in Napa, CA based on the winter period of October 1 to March 31 for six winter seasons, plus results for a seventh winter season after many building shell investments were made. (Note the building improvements facilitated a substantial increase in the average indoor temperature by preventing a major drop in temperature during night-time and non-occupied hours.) South-facing windows had an effective area of 10 m² and the solar heat gain coefficient is estimated to be 0.25 for an effective window area of 2.5 m². The measured HVAC system efficiency of 59 percent was based on a reported furnace efficiency of 80 percent and an energy audit-based duct efficiency of 74 percent.

Figures 8, 9:
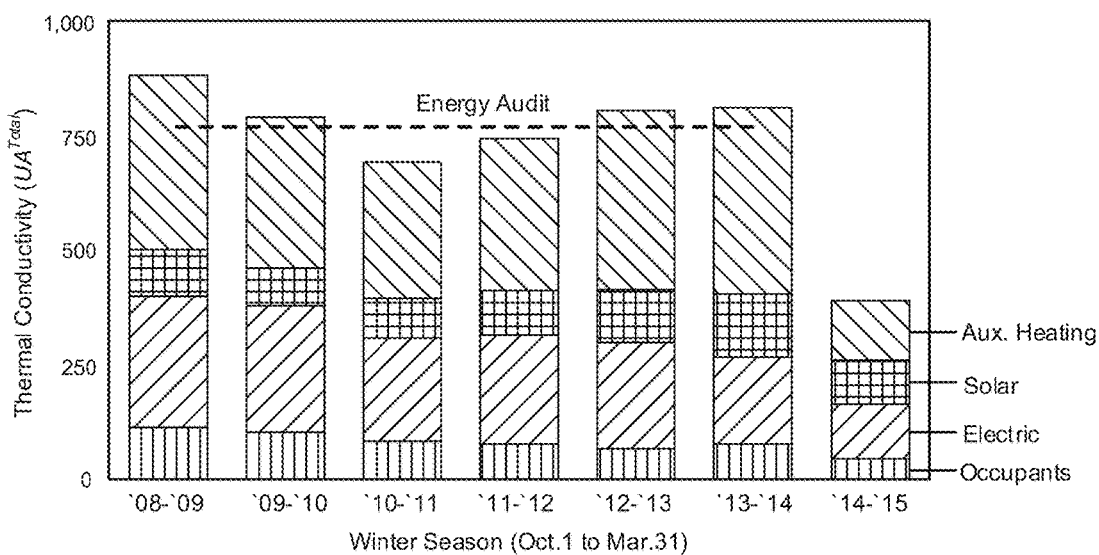
FIG. 8 is a table showing, by way of example, thermal conductivity results for each season using the data in the table of FIG. 7 as inputs into Equations (28) through (31).
FIG. 9 is a graph showing, by way of example, a plot of the thermal conductivity results in the table of FIG. 8.

FIG. 8 is a table 90 showing, by way of example, thermal conductivity results for each season using the data in the table 80 of FIG. 7 as inputs into Equations (28) through (31). Thermal conductivity is in units of Btu/h-° F. FIG. 9 is a graph 100 showing, by way of example, a plot of the thermal conductivity results in the table 90 of FIG. 8. The x-axis represents winter seasons for successive years, each winter season running from October 1 to March 31. The y-axis represents thermal conductivity. The results from a detailed energy audit, performed in early 2014, are superimposed on the graph. The energy audit determined that the house had a thermal conductivity of 773 Btu/h-° F. The average result estimated for the first six seasons was 791 Btu/h-° F. A major amount of building shell work was performed after the 2013-2014 winter season, and the results show a 50-percent reduction in heating energy consumption in the 2014-2015 winter season.

Application: Evaluate Investment Alternatives

Figure 10:
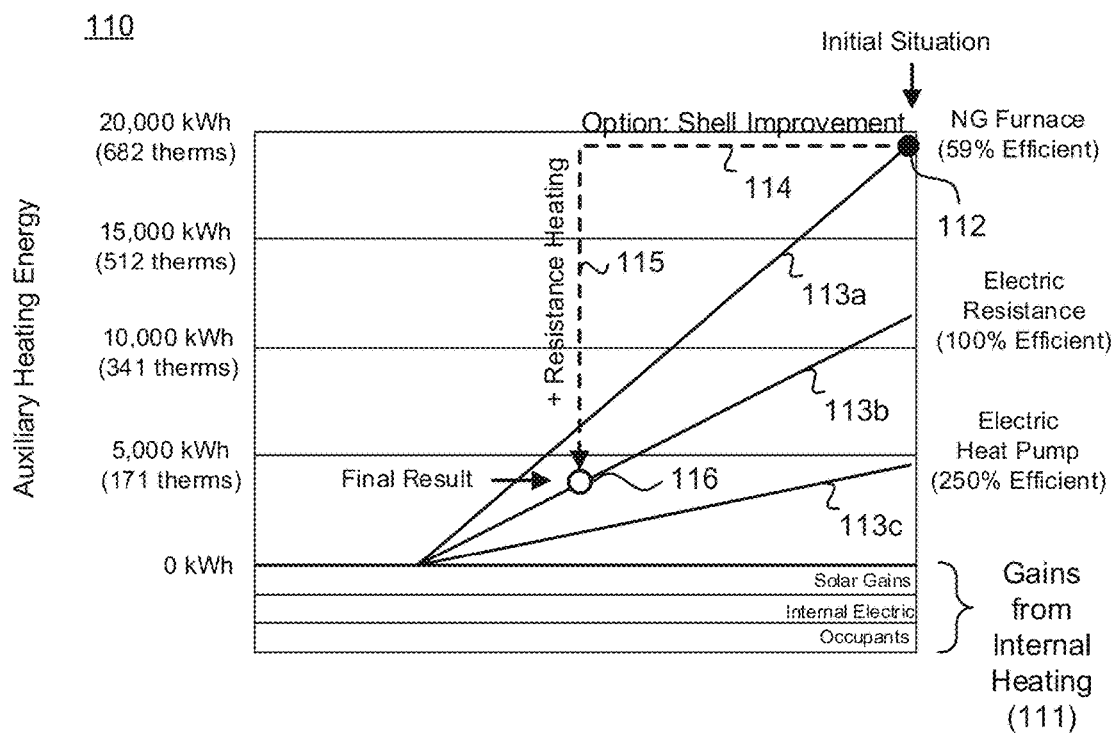
FIG. 10 is a graph showing, by way of example, an auxiliary heating energy analysis and energy consumption investment options.

The results of this work can be used to evaluate potential investment alternatives. FIG. 10 is a graph 110 showing, by way of example, an auxiliary heating energy analysis and energy consumption investment options. The x-axis represents total thermal conductivity, $UA^{Total}$ in units of Btu/hr-° F. The y-axis represents total heating energy. The graph presents the analysis of the Napa, CA building from the earlier example, supra, using the equations previously discussed. The three lowest horizontal bands correspond to the heat provided through internal gains 111, including occupants, heat produced by operating electric devices, and solar heating. The solid circle 112 represents the initial situation with respect to heating energy consumption. The diagonal lines 113a, 113b, 113c represent three alternative heating system efficiencies versus thermal conductivity (shown in the graph as building losses). The horizontal dashed line 114 represents an option to improve the building shell and the vertical dashed line 115 represents an option to switch to electric resistance heating. The plain circle 116 represents the final situation with respect to heating energy consumption.

Other energy consumption investment options (not depicted) are possible. These options include switching to an electric heat pump, increasing solar gain through window replacement or tree trimming (this option would increase the height of the area in the graph labeled "Solar Gains"), or lowering the thermostat setting. These options can be compared using the approach described with reference to Equations (25) through (28) to compare the options in terms of their costs and savings, which will help the homeowner to make a wiser investment.

Second Approach: Time Series Fuel Consumption

The previous section presented an annual fuel consumption model. This section presents a detailed time series model. This section also compares results from the two methods and provides an example of how to apply the on-site empirical tests.

Building-Specific Parameters

The building temperature model used in this second approach requires three building parameters: (1) thermal mass; (2) thermal conductivity; and (3) effective window area. FIG. 11 is a functional block diagram showing thermal mass, thermal conductivity, and effective window area relative to a structure 121. By way of introduction, these parameters will now be discussed.

Thermal Mass (M)

The heat capacity of an object equals the ratio of the amount of heat energy transferred to the object and the resulting change in the object's temperature. Heat capacity is also known as "thermal capacitance" or "thermal mass" (122) when used in reference to a building. Thermal mass Q is a property of the mass of a building that enables the building to store heat, thereby providing "inertia" against temperature fluctuations. A building gains thermal mass through the use of building materials with high specific heat capacity and high density, such as concrete, brick, and stone.

The heat capacity is assumed to be constant when the temperature range is sufficiently small. Mathematically, this relationship can be expressed as:

$$Q_{\Delta t} = M(T_{t+\Delta t}^{Indoor} - T_t^{Indoor}) \quad (48)$$

where M equals the thermal mass of the building and temperature units T are in °F. Q is typically expressed in Btu or Joules. In that case, M has units of Btu/°F. Q can also be divided by 1 kWh/3,412 Btu to convert to units of kWh/°F.

Thermal Conductivity ($UA^{Total}$)

The building's thermal conductivity $UA^{Total}$ (123) is the amount of heat that the building gains or losses as a result of conduction and infiltration. Thermal conductivity $UA^{Total}$ was discussed supra with reference to the first approach for modeling annual heating fuel consumption.

Effective Window Area (W)

The effective window area (in units of m²) (124), also discussed in detail supra, specifies how much of an available solar resource is absorbed by the building. Effective window area is the dominant means of solar gain in a typical building during the winter and includes the effect of physical shading, window orientation, and the window's solar heat gain coefficient. In the northern hemisphere, the effective window area is multiplied by the available average direct irradiance on a vertical, south-facing surface (kW/m²), times the amount of time (II) to result in the kWh obtained from the windows.

Energy Gain or Loss

The amount of heat transferred to or extracted from a building (Q) over a time period of Δt is based on a number of factors, including:

1) Loss (or gain if outdoor temperature exceeds indoor temperature) due to conduction and infiltration and the differential between the indoor and outdoor temperatures.
2) Gain, when the HVAC system is in the heating mode, or loss, when the HVAC system is in the cooling mode.
3) Gain associated with:
   a) Occupancy and heat given off by people.
   b) Heat produced by consuming electricity inside the building.
   c) Solar radiation.

Mathematically, Q can be expressed as:

$$Q_{\Delta T} = \left[ \overbrace{UA^{Total}(\overline{T}^{Outdoor} - \overline{T}^{Indoor})}^{\text{Envelope Gain or Loss}} + \overbrace{(250)\overline{P}}^{\text{Occupancy Gain}} + \overbrace{\overline{Electric}\left(\frac{3{,}412 \text{ Btu}}{1 \text{ kWh}}\right)}^{\text{Internal Electric Gain}} + \overbrace{\overline{WSolar}\left(\frac{3{,}412 \text{ Btu}}{1 \text{ kWh}}\right)}^{\text{Solar Gain}} + \overbrace{(HeatOrCool)R^{HVAC}\eta^{HVAC}\overline{Status}}^{\text{HVAC Gain or Loss}} \right]\Delta t \quad (49)$$

where:

Except as noted otherwise, the bars over the variable names represent the average value over Δt hours, that is, the duration of the applicable empirical test. For instance, $\overline{T}^{Outdoor}$ represents the average outdoor temperature between the time interval of t and t+Δt.

$UA^{Total}$ is the thermal conductivity (in units of Btu/hour-°F.).

W is the effective window area (in units of m²).

Occupancy Gain is based on the average number of people ($\overline{P}$) in the building during the applicable empirical test (and the heat produced by those people). The average person is assumed to produce 250 Btu/hour.

Internal Electric Gain is based on heat produced by indoor electricity consumption ($\overline{Electric}$), as averaged over the applicable empirical test, but excludes electricity for purposes that do not produce heat inside the building, for instance, electric hot water heating where the hot water is discarded down the drain, or where there is no heat produced inside the building, such as is the case with EV charging.

Solar Gain is based on the average available normalized solar irradiance ($\overline{Solar}$) during the applicable empirical test (with units of kW/m²). This value is the irradiance on a vertical surface to estimate solar received on windows; global horizontal irradiance (GHI) can be used as a proxy for this number when W is allowed to change on a monthly basis.

HVAC Gain or Loss is based on whether the HVAC is in heating or cooling mode (GainOrLoss is 1 for heating and −1 for cooling), the rating of the HVAC system (R in Btu), HVAC system efficiency ($\eta^{HVAC}$ including both conversion and delivery system efficiency), average operation status ($\overline{Status}$) during the empirical test, a time series value that is either off (0 percent) or on (100 percent), Other conversion factors or expressions are possible.

Energy Balance

Equation (48) reflects the change in energy over a time period and equals the product of the temperature change and the building's thermal mass. Equation (49) reflects the net gain in energy over a time period associated with the various component sources. Equation (48) can be set to equal Equation (49), since the results of both equations equal the same quantity and have the same units (Btu). Thus, the total heat change of a building will equal the sum of the individual heat gain/loss components:

$$\overbrace{M(T_{t+\Delta t}^{Indoor} - T_t^{Indoor})}^{\text{Total Heat Change}} = \left[ \overbrace{UA^{Total}(\overline{T}^{Outdoor} - \overline{T}^{Indoor})}^{\text{Envelop Gain or Loss}} + \overbrace{(250)\overline{P}}^{\text{Occupancy Gain}} + \overbrace{\overline{Electric}\left(\frac{3{,}412 \text{ Btu}}{1 \text{ kWh}}\right)}^{\text{Internal Electric Gain}} + \overbrace{\overline{WSolar}\left(\frac{3{,}412 \text{ Btu}}{1 \text{ kWh}}\right)}^{\text{Solar Gain}} + \overbrace{(HeatOrCool)R^{HVAC}\eta^{HVAC}\overline{Status}}^{\text{HVAC Gain or Loss}} \right]\Delta t \quad (50)$$

Figures 12, 13:
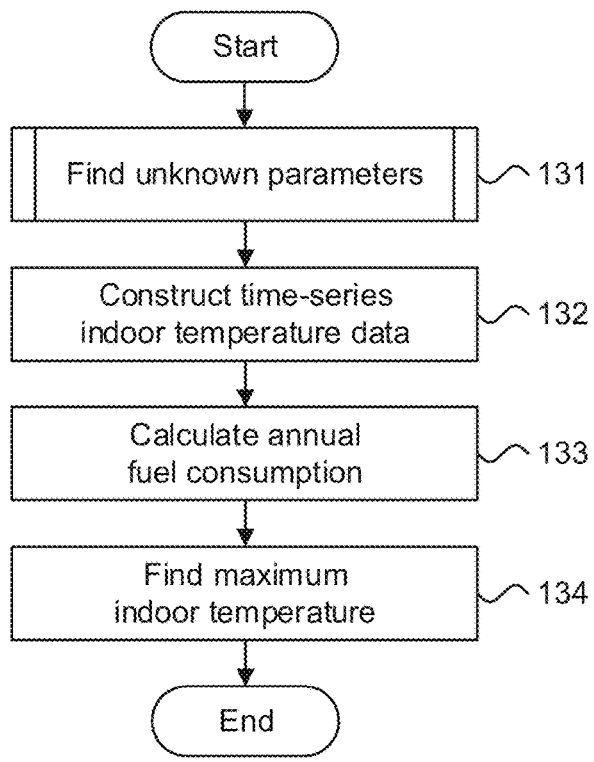
FIG. 12 is a flow diagram showing a computer-implemented method for modeling interval building heating energy consumption in accordance with a further embodiment.
FIG. 13 is a table showing the characteristics of empirical tests used to solve for the four unknown parameters in Equation (50).

Equation (50) can be used for several purposes. FIG. 12 is a flow diagram showing a computer-implemented method 130 for modeling interval building heating energy consumption in accordance with a further embodiment. Execution of the software can be performed with the assistance of a computer system, such as further described infra with reference to FIG. 23, as a series of process or method modules or steps.

As a single equation, Equation (50) is potentially very useful, despite having five unknown parameters. In this second approach, the unknown parameters are solved by performing a series of short duration empirical tests (step 131), as further described infra with reference to FIG. 14. Once the values of the unknown parameters are found, a time series of indoor temperature data can be constructed (step 132), which will then allow annual fuel consumption to be calculated (step 133) and maximum indoor temperature to be found (step 134). The short duration tests will first be discussed.

Empirically Determine Building- and Equipment-Specific Parameters Using Short Duration Tests A series of tests can be used to iteratively solve Equation (50) to obtain the values of the unknown parameters by ensuring that the portions of Equation (50) with the unknown parameters are equal to zero. These tests are assumed to be performed when the HVAC is in heating mode for purposes of illustration. Other assumptions are possible.

FIG. 13 is a table 140 showing the characteristics of empirical tests used to solve for the five unknown parameters in Equation (50). The empirical test characteristics are used in a series of sequentially-performed short duration tests; each test builds on the findings of earlier tests to replace unknown parameters with found values.

Figure 14:
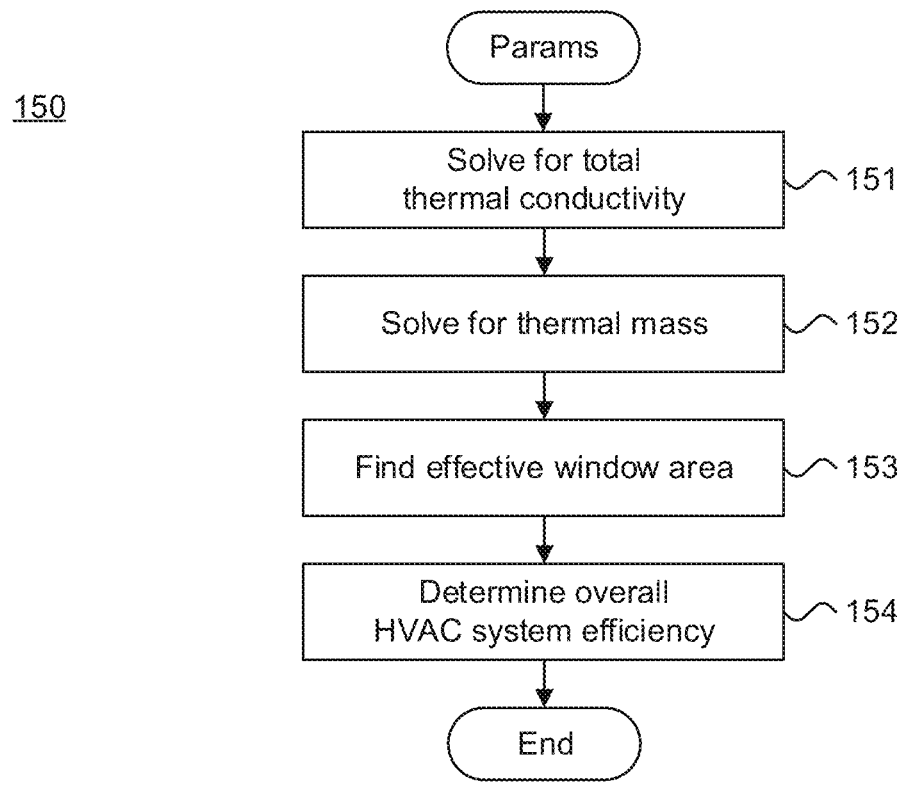
FIG. 14 is a flow diagram showing a routine for empirically determining building- and equipment-specific parameters using short duration tests for use in the method of FIG. 12.

The empirical tests require the use of several components, including a control for turning an HVAC system ON or OFF, depending upon the test; an electric controllable interior heat source; a monitor to measure the indoor temperature during the test; a monitor to measure the outdoor temperature during the test; and a computer or other computational device to assemble the test results and finding thermal conductivity, thermal mass, effective window area, and HVAC system efficiency of a building based on the findings. The components can be separate units, or could be consolidated within one or more combined units. For instance, a computer equipped with temperature probes could both monitor, record and evaluate temperature findings. FIG. 14 is a flow diagram showing a routine 150 for empirically determining building- and equipment-specific parameters using short duration tests for use in the method 130 of FIG. 12. The approach is to run a serialized series of empirical tests. The first test solves for the building's total thermal conductivity ($UA^{Total}$) (step 151). The second test uses the empirically-derived value for $UA^{Total}$ to solve for the building's thermal mass (M) (step 152). The third test uses both of these results, thermal conductivity and thermal mass, to find the building's effective window area (W) (step 153). Finally, the fourth test uses the previous three test results to determine the overall HVAC system efficiency (step 145). Consider how to perform each of these tests.

Test 1: Building Thermal Conductivity ($UA^{Total}$)

The first step is to find the building's total thermal conductivity ($UA^{Total}$) (step 151). Referring back to the table in FIG. 13, this short-duration test occurs at night (to avoid any solar gain) with the HVAC system off (to avoid any gain from the HVAC system), and by having the indoor temperature the same at the beginning and the ending of the test by operating an electric controllable interior heat source, such as portable electric space heaters that operate at 100% efficiency, so that there is no change in the building temperature's at the beginning and at the ending of the test. Thus, the interior heart source must have sufficient heating capacity to maintain the building's temperature state. Ideally, the indoor temperature would also remain constant to avoid any potential concerns with thermal time lags.

These assumptions are input into Equation (50):

$$M(0) = \left[ UA^{Total}(\overline{T}^{Outdoor} - \overline{T}^{Indoor}) + (250)\overline{P} + \right. \quad (51)$$

-continued $$\left. \overline{Electric}\left(\frac{3{,}412 \text{ Btu}}{1 \text{ kWh}}\right) + W(0)\left(\frac{3{,}412 \text{ Btu}}{1 \text{ kWh}}\right) + (1)R^{HVAC}\eta^{HVAC}(0) \right]\Delta t$$

The portions of Equation (51) that contain four of the five unknown parameters now reduce to zero. The result can be solved for $UA^{Total}$:

$$UA^{Total} = \frac{\left[(250)\overline{P} + \overline{Electric}\left(\frac{3{,}412 \text{ Btu}}{1 \text{ kWh}}\right)\right]}{(\overline{T}^{Indoor} - \overline{T}^{Outdoor})} \quad (52)$$

where $\overline{T}^{Indoor}$ represents the average indoor temperature during the empirical test, $\overline{T}^{Outdoor}$ represents the average outdoor temperature during the empirical test, $\overline{P}$ represents the average number of occupants during the empirical test, and $\overline{Electric}$ represents average indoor electricity consumption during the empirical test.

Equation (52) implies that the building's thermal conductivity can be determined from this test based on average number of occupants, average power consumption, average indoor temperature, and average outdoor temperature.

Test 2: Building Thermal Mass (M)

The second step is to find the building's thermal mass (M) (step 152). This step is accomplished by constructing a test that guarantees M is specifically non-zero since $UA^{Total}$ is known based on the results of the first test. This second test is also run at night, so that there is no solar gain, which also guarantees that the starting and the ending indoor temperatures are not the same, that is, $T_{t+\Delta t}^{Indoor} \neq T_t^{Indoor}$, respectively at the outset and conclusion of the test by not operating the HVAC system. These assumptions are input into Equation (50) and solving yields a solution for M:

$$M = \left[\frac{UA^{Total}(\overline{T}^{Outdoor} - \overline{T}^{Indoor}) + (250)\overline{P} + \overline{Electric}\left(\frac{3{,}412 \text{ Btu}}{1 \text{ kWh}}\right)}{(\overline{T}_{t+\Delta t}^{Indoor} - \overline{T}_t^{Indoor})}\right]\Delta t \quad (53)$$

where $UA^{Total}$ represents the thermal conductivity, $\overline{T}^{Indoor}$ represents the average indoor temperature during the empirical test, $\overline{T}^{Outdoor}$ represents the average outdoor temperature during the empirical test, $\overline{P}$ represents the average number of occupants during the empirical test, $\overline{Electric}$ represents average indoor electricity consumption during the empirical test, t represents the time at the beginning of the empirical test, $\Delta t$ represents the duration of the empirical test, $T_{t+\Delta t}^{Indoor}$ represents the ending indoor temperature, $T_t^{Indoor}$ represents the starting indoor temperature, and $T_{t+\Delta t}^{Indoor} \neq T_t^{Indoor}$.

Test 3: Building Effective Window Area (W)

The third step to find the building's effective window area (W) (step 153) requires constructing a test that guarantees that solar gain is non-zero. This test is performed during the day with the HVAC system turned off. Solving for W yields:

$$W = \left\{ \left[\frac{M(T_{t+\Delta t}^{Indoor} - T_t^{Indoor})}{3{,}412\Delta t}\right] - \right. \quad (54)$$

$$\left. \frac{UA^{Total}(\overline{T}^{Outdoor} - \overline{T}^{Indoor})}{3{,}412} - \frac{(250)\overline{P}}{3{,}412} - \overline{Electric} \right\}\left[\frac{1}{\overline{Solar}}\right]$$

where M represents the thermal mass, t represents the time at the beginning of the empirical test, Δt represents the duration of the empirical test, $T_{t+\Delta t}^{Indoor}$ represents the ending indoor temperature, and $T_t^{Indoor}$ represents the starting indoor temperature, $UA^{Total}$ represents the thermal conductivity, $\overline{T^{Indoor}}$ represents the average indoor temperature, $\overline{T^{Outdoor}}$ represents the average outdoor temperature, $\overline{P}$ represents the average number of occupants during the empirical test, $\overline{Electric}$ represents average electricity consumption during the empirical test, and $\overline{Solar}$ represents the average solar energy produced during the empirical test.

Test 4: HVAC System Efficiency ($\eta^{Furnace}\eta^{Delivery}$)

The fourth step determines the HVAC system efficiency (step 154). Total HVAC system efficiency is the product of the furnace efficiency and the efficiency of the delivery system, that is, the duct work and heat distribution system. While these two terms are often solved separately, the product of the two terms is most relevant to building temperature modeling. This test is best performed at night, so as to eliminate solar gain. Thus:

$$\eta^{HVAC} = \left[\frac{M(T_{t+\Delta t}^{Indoor} - T_t^{Indoor})}{\Delta t} - UA^{Total}(\overline{T^{Outdoor}} - \overline{T^{Indoor}}) - (250)\overline{P} - \overline{Electric}\left(\frac{3,412 \text{ Btu}}{1 \text{ kWh}}\right)\right]\left[\frac{1}{(1)R^{HVAC}\overline{Status}}\right] \quad (55)$$

where M represents the thermal mass, t represents the time at the beginning of the empirical test, Δt represents the duration of the empirical test, $T_{t+\Delta t}^{Indoor}$ represents the ending indoor temperature, and $T_t^{Indoor}$ represents the starting indoor temperature, $UA^{Total}$ represents the thermal conductivity, $\overline{T^{Indoor}}$ represents the average indoor temperature, $\overline{T^{Outdoor}}$ represents the average outdoor temperature, $\overline{P}$ represents the average number of occupants during the empirical test, $\overline{Electric}$ represents average electricity consumption during the empirical test, $\overline{Status}$ represents the average furnace operation status, and $R^{Furnace}$ represents the rating of the furnace.

Note that HVAC duct efficiency can be determined without performing a duct leakage test if the generation efficiency of the furnace is known. This observation usefully provides an empirical method to measure duct efficiency without having to perform a duct leakage test.

Time Series Indoor Temperature Data

The previous subsection described how to perform a series of empirical short duration tests to determine the unknown parameters in Equation (50). Commonly-assigned U.S. patent application Ser. No. 14/531,933, cited supra, describes how a building's $UA^{Total}$ can be combined with historical fuel consumption data to estimate the benefit of improvements to a building. While useful, estimating the benefit requires measured time series fuel consumption and HVAC system efficiency data. Equation (50), though, can be used to perform the same analysis without the need for historical fuel consumption data.

Referring back to FIG. 12, Equation (50) can be used to construct time series indoor temperature data (step 132) by making an approximation. Let the time period (Δt) be short (an hour or less), so that the average values are approximately equal to the value at the beginning of the time period, that is, assume $\overline{T^{Outdoor}} \approx T_t^{Outdoor}$. The average values in Equation (50) can be replaced with time-specific subscripted values and solved to yield the final indoor temperature.

$$T_{t+\Delta t}^{Indoor} = T_t^{Indoor} + \left[ \frac{1}{M}\right]\left[UA^{Total}(T_t^{Outdoor} - T_t^{Indoor}) + (250)P_t + Electric_t\left(\frac{3,412 \text{ Btu}}{1 \text{ kWh}}\right) + W Solar_t\left(\frac{3,412 \text{ Btu}}{1 \text{ kWh}}\right) + (HeatOrCool)R^{HVAC}\eta^{HVAC}Status_t\right]\Delta t \quad (56)$$

Once $T_{t+\Delta t}^{Indoor}$ is known, Equation (56) can be used to solve for $T_{t+2\Delta t}^{Indoor}$ and so on.

Importantly, Equation (56) can be used to iteratively construct indoor building temperature time series data with no specific information about the building's construction, age, configuration, number of stories, and so forth. Equation (56) only requires general weather datasets (outdoor temperature and irradiance) and building-specific parameters. The control variable in Equation (56) is the fuel required to deliver the auxiliary heat at time t, as represented in the Status variable, that is, at each time increment, a decision is made whether to run the HVAC system.

Seasonal Fuel Consumption

Equation (50) can also be used to calculate seasonal fuel consumption (step 133) by letting Δt equal the number of hours (H) in the entire season, either heating or cooling (and not the duration of the applicable empirical test), rather than making Δt very short (such as an hour, as used in an applicable empirical test). The indoor temperature at the start and the end of the season can be assumed to be the same or, alternatively, the total heat change term on the left side of the equation can be assumed to be very small and set equal to zero. Rearranging Equation (50) provides:

$$(HeatOrCool)R^{HVAC}\eta^{HVAC}\overline{Status}(H) = -\left[UA^{Total}(\overline{T^{Outdoor}} - \overline{T^{Indoor}})\right] \quad (57)$$

$$(H) - \left[(250)\overline{P} + \overline{Electric}\left(\frac{3,412 \text{ Btu}}{1 \text{ kWh}}\right) + \overline{WSolar}\left(\frac{3,412 \text{ Btu}}{1 \text{ kWh}}\right)\right](H)$$

Total seasonal fuel consumption based on Equation (50) can be shown to be identical to fuel consumption calculated using the annual method based on Equation (34). First, Equation (57), which is a rearrangement of Equation (50), can be simplified. Multiplying Equation (57) by HeatOrCool results in (HeatOrCool)² on the left hand side, which equals 1 for both heating and cooling seasons, and can thus be dropped from the equation. In addition, the sign on the first term on the right hand side of Equation (57) ([$UA^{Total}$($\overline{T^{Outdoor}} - \overline{T^{Indoor}}$)](H)) can be changed by reversing the order of the temperatures. Per Equation (8), the second term on the right hand side of the equation $$\left(\left[(250)\overline{P} + \overline{Electric}\left(\frac{3,412 \text{ Btu}}{1 \text{ kWh}}\right) + \overline{WSolar}\left(\frac{3,412 \text{ Btu}}{1 \text{ kWh}}\right)\right](H)\right)$$

equals internal gains ($Q^{Gains\text{-}Internal}$), which can be substituted into Equation (57). Finally, dividing the equation by HVAC efficiency $\eta^{HVAC}$ yields:

$$R^{HVAC}\overline{Status}(H) = [(HeatOrCool)(UA^{Total})(\overline{T}^{Indoor} - \overline{T}^{Outdoor})(H) - \\ (HeatOrCool)Q^{Gains\text{-}Internal}]\left(\frac{1}{\eta^{HVAC}}\right) \quad (58)$$

Next, substituting Equation (23) into Equation (58):

$$R^{HVAC}\overline{Status}(H) = [(HeatOrCool)(UA^{Total})(\overline{T}^{Indoor} - \overline{T}^{Outdoor})(H) - \\ (HeatOrCool)(HeatOrCool)(UA^{Balance\,Point}) \\ (\overline{T}^{Indoor} - \overline{T}^{Outdoor})(H)]\left(\frac{1}{\eta^{HVAC}}\right) \quad (59)$$

Once again, HeatOrCool² equals 1 for both heating and cooling seasons and thus is dropped. Equation (59) simplifies as:

$$R^{HVAC}\overline{Status}(H) = \frac{[HeatOrCool(UA^{Total}) - (UA^{Balance\,Point})](\overline{T}^{Indoor} - \overline{T}^{Outdoor})(H)}{\eta^{HVAC}} \quad (60)$$

Consider the heating season when HeatOrCool equals 1. Equation (60) simplifies as follows.

$$Q^{Fuel} = \frac{(UA^{Total} - UA^{Balance\,Point})(\overline{T}^{Indoor} - \overline{T}^{Outdoor})(H)}{\eta^{HVAC}} \quad (61)$$

Equation (61) illustrates total seasonal fuel consumption based on Equation (50) is identical to fuel consumption calculated using the annual method based on Equation (34).

Consider the cooling season when HeatOrCool equals −1. Multiply Equation (61) by the first part of the right hand side by −1 and reverse the temperatures, substitute −1 for HeatOrCool, and simplify:

$$Q^{Fuel} = \frac{(UA^{Total} + UA^{Balance\,Point})(\overline{T}^{Outdoor} - \overline{T}^{Indoor})(H)}{\eta^{HVAC}} \quad (62)$$

A comparison of Equations (61) and (62) shows that a leverage effect occurs that depends upon whether the season is for heating or cooling. Fuel requirements are decreased in the heating season because internal gains cover a portion of building losses (Equation (61)). Fuel requirements are increased in the cooling season because cooling needs to be provided for both the building's temperature gains and the internal gains (Equation (62)).

Maximum Indoor Temperature Allowing consumers to limit the maximum indoor temperature to some value can be useful from a personal physical comfort perspective. The limit of maximum indoor temperature (step 134) can be obtained by taking the minimum of $T_{t+\Delta t}^{Indoor}$ and $T^{Indoor\text{-}Max}$, the maximum indoor temperature recorded for the building during the heating season. There can be some divergence between the annual and detailed time series methods when the thermal mass of the building is unable to absorb excess heat, which can then be used at a later time. Equation (56) becomes Equation (63) when the minimum is applied.

$$T_{t+\Delta t}^{Indoor} = \\ \text{Min}\left\{T^{Indoor\text{-}Max}, T_t^{Indoor} + \left[\frac{1}{M}\right]\left[UA^{Total}(T_t^{Outdoor} - T_t^{Indoor}) + (250)P_t + \\ Electric_t\left(\frac{3{,}412\text{ Btu}}{1\text{ kWh}}\right) + WSolar_t\left(\frac{3{,}412\text{ Btu}}{1\text{ kWh}}\right) + \\ (HeatOrCool)R^{HVAC}\eta^{HVAC}Status_t\right]\Delta t\right\} \quad (63)$$

Net Fuel Savings, Net Cost Savings and Net Environmental Savings

Equation (58), which is a simplification of Equation (57), can be used to calculate net savings in fuel, cost, and carbon emissions (environmental). Net savings are crucial, albeit frequently overlooked, factors to consider when contemplating or evaluating changes to electric energy efficiency investments and renewable distributed power generation. Envelope gains or losses on the right hand side of Equation (58) are represented by the first group of terms, (HeatOrCool)($UA^{Total}$)($\overline{T}^{Indoor} - \overline{T}^{Outdoor}$)(H). Envelope gains occur in the summer when average indoor temperature is less average outdoor temperature ($\overline{T}^{Indoor} < \overline{T}^{Outdoor}$), while envelope losses occur in the winter when average indoor temperature exceeds average outdoor temperature ($\overline{T}^{Indoor} > \overline{T}^{Outdoor}$). Internal gains are represented by the second group of terms in the equation, (HeatOrCool)$Q^{Gains\text{-}Internal}$, and include heat from occupants, internal electric, and solar. Thus, Equation (58) can be annotated as:

$$\underbrace{(HeatOrCool)(UA^{Total})(\overline{T}^{Indoor} - \overline{T}^{Outdoor})(H)}_{\text{Envelope Gains (Losses)}} - \\ \underbrace{Q^{Fuel}}_{\text{HVAC Fuel}} = \frac{(HeatOrCool)\overbrace{(Q^{Internal\,Gains})}^{\substack{\text{Occupancy,}\\\text{Internal Electric}\\\text{and Solar Gains}}}}{\eta^{HVAC}} \quad (64)$$

where $HeatOrCool = \begin{cases} 1 \text{ for Heating Season} \\ -1 \text{ for Cooling Season} \end{cases}$.

As an initial step, envelope gains can be multiplied by the binary term HeatOrCool to produce a term that will be a positive number across both seasons. More specifically, average indoor temperature is assumed to be less than the average outdoor temperature in the summer, so that the difference between the two temperatures will generally be a negative number. The resulting term for envelope gains becomes a positive number when multiplied by the binary term HeatOrCool for summer, −1. Average outdoor temperature is assumed to be less than the average indoor temperature in the winter, so envelope gains will generally be a positive number. Internal gains are also multiplied by the binary term HeatOrCool, but for a different reason. Internal gains in the winter reduce the need for auxiliary heating because these types of heat gains, heating gained from occupants $Q^{Gains\text{-}Occupants}$, heating gained from the operation of electric devices $Q^{Gains\text{-}Electric}$, and heating gained from solar heating $Q^{Gains\text{-}Solar}$, provide some of the heating to the structure. Internal gains in the summer increase the need for auxiliary cooling, that is, the cooling system needs to provide enough cooling for both the envelope gains and the internal gains.

Definition of $UA^{Balance\ Point}$

Assume there exists a term called $UA^{Balance\ Point}$ that satisfies the following relationship, where the binary term HeatOrCool is included to keep $UA^{Balance\ Point}$ positive across both seasons, as explained supra:

$$Q^{Internal\ Gains} = (HeatOrCool)(UA^{Balance\ Point})(T^{Indoor} - T^{Outdoor})(H) \quad (65)$$

Solve Equation (65) for $UA^{Balance\ Point}$ by dividing by ($T^{Indoor} - T^{Outdoor}$)(H) and multiplying by HeatOrCool, assuming $T^{Indoor} \neq T^{Outdoor}$ and H≠0. As HeatOrCool² always equals 1, the term $UA^{Balance\ Point}$ can be expressed as:

$$UA^{Balance\ Point} = \frac{(HeatOrCool)(Q^{Internal\ Gains})}{(T^{Indoor} - T^{Outdoor})(H)} \quad (66)$$

Change in Fuel Relative to Change in Internal Gains

Consider the effect of changes in fuel relative to a change in internal gains. Substitute Equation (65) into Equation (64) and simplify:

$$Q^{Fuel} = \frac{[(HeatOrCool)(UA^{Total}) - (UA^{Balance\ Point})]}{\eta^{HVAC}} (T^{Indoor} - T^{Outdoor})(H) \quad (67)$$

Take the derivate of Equation (64) with respect to internal gains:

$$\frac{dQ^{Fuel}}{dQ^{Internal\ Gains}} = -\frac{HeatOrCool}{\eta^{HVAC}} \quad (68)$$

Suppose that an investment in electric energy efficiency directly reduces electricity consumption by the amount $Q^{Energy\ Efficiency}$. Reducing electricity consumption has a direct effect and two indirect effects. The direct effect of reducing electricity consumption is that the fuel required to generate the electricity is reduced. The amount of fuel reduced equals $Q^{Energy\ Efficiency}$ divided by the efficiency of generation ($\eta^{Electricity\ Generation}$). The indirect effects are due to the observation that the reduction in electricity consumption reduces the amount of waste heat in the building. The lost heat needs to be replaced in the heating season and equals $Q^{Energy\ Efficiency}$ times Equation (68) times the fraction of the year that the heating system is in operation. The lost heat reduces the burden on the HVAC system in the cooling season and equals $Q^{Energy\ Efficiency}$ times Equation (68) times the fraction of the year that the cooling system is in operation.

The net fuel savings, taking into account the effect on heating and cooling, is:

Net Fuel Savings =

$$\frac{Q^{Energy\ Efficiency}}{\eta^{Electricity\ Generation}} - \frac{Q^{Energy\ Efficiency}(F)}{\eta^{HVAC-Heating}} + \frac{Q^{Energy\ Efficiency}(1-F)}{\eta^{HVAC-Cooling}} \quad (69)$$

where term F represents the percent of hours that are winter hours and $\eta^{Electricity\ Generation}$, $\eta^{HVAC-Heating}$ and $\eta^{HVAC-Cooling}$ respectively represent efficiencies of electricity generation as supplied to a building and of the efficiencies of the building's HVAC cooling and heating systems. Other units of time could be used in place of hours, so long as consistent with the other terms in the equation. For instance, where applicable, electricity costs are generally expressed in kilowatt hours (kWh), which would need to be converted into an equivalent unit if the term F represents a time unit other than hours. Note also that the term F models the relationship between the respective durations of the heating and cooling seasons that typically seasonally affect a building. Thus, the term F could similarly represent the percentage of hours (or other units of time) that are summer hours. Equation (69) simplifies to:

Net Fuel Savings =

$$Q^{Energy\ Efficiency}\left[\frac{1}{\eta^{Electricity\ Generation}} - \frac{F}{\eta^{HVAC-Heating}} + \frac{(1-F)}{\eta^{HVAC-Cooling}}\right] \quad (70)$$

Next, consider the net economic savings. Assume that space heating uses natural gas and cooling uses electricity. The net economic savings is:

Net Cost Savings =

$$Q^{Energy\ Efficiency}\left[p^{Electricity} - \frac{p^{Natrual\ Gas}(F)}{\eta^{HVAC-Heating}} + \frac{p^{Electricity}(1-F)}{\eta^{HVAC-Cooling}}\right] \quad (71)$$

where $p^{Electricity}$ and $p^{Natural\ Gas}$ respectively represent the prices of electricity and natural gas. Equation (71) simplifies to:

Net Cost Savings =

$$Q^{Energy\ Efficiency}\left\{p^{Electricity}\left[1 + \frac{(1-F)}{\eta^{HVAC-Cooling}}\right] - \frac{p^{Natrual\ Gas}(F)}{\eta^{HVAC-Heating}}\right\} \quad (72)$$

Finally, consider carbon emissions. The net carbon emissions (environmental) savings is:

Net Carbon Savings =

$$Q^{Energy\ Efficiency}\left\{E^{Electricity}\left[1 + \frac{(1-F)}{\eta^{HVAC-Cooling}}\right] - \frac{E^{Natrual\ Gas}(F)}{\eta^{HVAC-Heating}}\right\} \quad (73)$$

Example

By way of illustration, net fuel savings, net cost savings, and net carbon emissions (environmental) savings will be calculated based on the following assumptions for a building that is heated with an HVAC system that uses natural gas to generate heating and electricity to generate cooling:
- 6-month heating and 6-month cooling seasons.
- Electricity generation efficiency is 50%.
- Heating efficiency is 65%.
- Cooling efficiency is 400% (that is, 13.6 SEER).
- Electricity prices is $0.17/kWh.
- Natural gas price is $1/therm (or $0.034/kWh).
- Electricity carbon emissions are 0.73 lbs/kWh Natural gas carbon emissions are 11.7 lbs/therm (or 0.40 lbs/kWh)

First, net fuel savings is determined:

$$\text{Net Fuel Savings} = Q^{Energy\ Efficiency}\left[\frac{1}{0.5} - \frac{0.5}{0.65} + \frac{0.5}{4.00}\right] = Q^{Energy\ Efficiency}(136\%) \quad (74)$$

Direct fuel savings equals 200% of energy efficiency savings since electricity generation is 50% efficient. Net fuel savings, though, equal only 136% of electricity savings, which is about two-thirds of the direct fuel savings and does not even include the net effects of building heating and cooling that could further change net fuel savings.

Next, net cost savings is determined:

$$\text{Net Cost Savings} = Q^{Energy\ Efficiency}\left\{(0.17)\left[1 + \frac{0.5}{4.0}\right] - \frac{(0.034)(0.5)}{0.65}\right\} = \quad (75)$$

$$Q^{Energy\ Efficiency}\ (\$0.165/\text{kWh})$$

Net cost savings are only slightly less than direct cost savings at $0.17/kWh. Finally, net environmental savings is determined:

$$\text{Net Carbon Savings} = \quad (76)$$

$$Q^{Energy\ Efficiency}\left\{0.73\ \frac{\text{lbs}}{\text{kWh}}\left[1 + \frac{0.5}{400}\right] - \frac{\left(0.40\ \frac{\text{lbs}}{\text{kWh}}\right)(0.5)}{0.65}\right\} =$$

$$Q^{Energy\ Efficiency}\left[0.51\ \frac{\text{lbs}}{\text{kWh}}\right]$$

Actual carbon savings equal 0.51 lbs/kWh, rather than 0.73 lbs/kWh, which is only 70 percent of the direct result.

This example illustrates how direct savings may be less impactful when taken in light of net savings. The net savings in fuel, cost and carbon emissions (environmental), as respectively calculated using Equations (71), (72) and (73), enable the full effects that electric energy efficiency investments have on reductions in the fuel consumed for a building's heating and cooling to be weighed. The net savings realized may actually be less than what would seem an intuitive result. For instance, switching from inefficient incandescent light bulbs lowers indoor heat gain during the winter, yet more natural gas needs to be consumed to make up for the indirect heating previously provided by those light bulbs. Similarly, while natural gas is less expensive than electricity, the savings in carbon emissions may not be realized to the same extent. In addition, renewable distributed generation has at times been considered as having the same effect as energy efficiency, which is actually not the case. 1 kWh of PV power generation would need 1.5 kWh of energy efficiency savings to have the same energy or carbon emissions savings result in the case described supra Generalization of Energy Balance Equation Equation (50) provides that the total heat change over a given period of time equals the sum of the heat gain (or loss) due to envelope gains (or losses), occupancy gains, internal electric gains, solar gains, and auxiliary gains. Equation (50) be rearranged so as to create a heat balance equation that is composed of heat gain (loss) from six sources, as shown in Table 1. Three of the sources can contribute to either heat gain or loss, while the remaining three sources can only contribute to heat gain.

$$0 = \left[\overbrace{UA^{Total}(T^{Outdoor} - T^{Indoor})}^{Envelope\ Gain\ (Loss)} + \right. \quad (77)$$

$$\overbrace{(250)\overline{P}}^{Occupancy\ Gain} + \overbrace{Electric\left(\frac{3{,}412\ \text{Btu}}{1\ \text{kWh}}\right)}^{Internal\ Electric\ Gain} + \overbrace{WSolar\left(\frac{3{,}412\ \text{Btu}}{1\ \text{kWh}}\right)}^{Solar\ Gain} +$$

$$\left.\overbrace{\frac{HVAC\ Gain\ (Loss)}{(HeatOrCool)R^{HVAC}\eta^{HVAC}Status}}^{}\Delta t + \overbrace{M(T_t^{Indoor} - T_{t+\Delta t}^{Indoor})}^{Thermal\ Mass\ Gain\ (Loss)}\right.$$

TABLE 1

| Source | Provides Heat Gain | Provides Heat Loss |
|---|---|---|
| Envelope | ✓ | ✓ |
| HVAC | ✓ | ✓ |
| Thermal mass | ✓ | ✓ |
| Occupancy | ✓ | |
| Internal electric | ✓ | |
| Solar | ✓ | |

Existing Model of Envelope Gain or Loss Heat gain (loss) from the envelope gain (or loss) is modeled to be the building's total thermal conductivity $UA^{Total}$ times the difference between the average outdoor and indoor temperatures times the time period $\Delta t$:

$$Q^{Envelope\ Gain(Loss)} = UA^{Total}(T^{Outdoor} - T^{Indoor})\Delta t \quad (78)$$

Equation (78) assumes the differential between outdoor and indoor temperatures is the same for all building surfaces. This assumption means that the sum of the thermal conductivity $UA^{Total}$ for all surfaces times the temperature differential equals the total thermal conductivity times the temperature differential, that is, $\Sigma_{surface}\ UA^{surface}(T^{Outdoor} - T^{Indoor}) = UA^{Total}(T^{Outdoor} - T^{Indoor})$. Thus, the building's envelope gains and losses can be modeled using a single thermal conductivity term $UA^{Total} = \Sigma_{surface} UA^{surface}$.

While this simplifying assumption is acceptable in the winter, the same assumption may be too simplistic for the summer. In particular, attics tend to suffer significant heat buildup during the summer and the surface temperature above the ceiling of a house may be significantly higher than the outdoor ambient temperature. Thus, the temperature differential between the attic and (non-attic space) indoor spaces may actually be greater than the temperature differential between the outdoor and (non-attic space) indoor temperatures. The same observation with respect to the attic applies to other surfaces or portions of a building heated by the sun.

Envelope Gain (Loss) with Different Temperature Differentials

The simplifying assumption can be addressed by first proposing a methodology using only two surfaces, which can then be generalizable to any number of surfaces, that is, made applicable to all solar heated surfaces and not just attics. First, divide the building's thermal conductivity into two parts, one part for the attic and the other part for the rest of the building. The envelope gain (loss) will equal the sum of the attic component plus the rest of the house:

$$Q^{Envelope\ Gain\ (Loss)} = UA^{Attic}(\overline{T}^{Attic} - \overline{T}^{Indoor})\Delta t + (UA^{Total} - UA^{Attic})(\overline{T}^{Outdoor} - \overline{T}^{Indoor})\Delta t \quad (79)$$

Equation (79) can be rearranged as follows:

$$Q^{Envelope\ Gain(Loss)} = [UA^{Total}(\overline{T}^{Outdoor} - \overline{T}^{Indoor}) + UA^{Attic} \overline{\Delta T}^{Attic\ Over\ Outdoor}]\Delta t \quad (80)$$

where $\overline{\Delta T}^{Attic\ Over\ Outdoor} = \overline{T}^{Attic} - \overline{T}^{Outdoor}$.

Effective Window Area Term for Attic

Increased attic temperatures are caused by an increase in solar radiation. Assume that the rise in attic temperature over outdoor temperature is proportional to the available solar radiation (units of kW/m²):

$$\overline{\Delta T}^{Attic\ Over\ Outdoor} = \alpha \overline{Solar}\left(\frac{3{,}412\ \text{Btu}}{1\ \text{kWh}}\right) \quad (81)$$

where the constant α has units of hr-° F.-m²/Btu. Furthermore, express a as a pair of constants, $UA^{Attic}$ in units of Btu/hour-° F., which is assumed to be known, and $W^{Attic}$ in units of m², which needs to be determined:

$$\alpha = \frac{W^{Attic}}{UA^{Attic}} \quad (82)$$

Substitute Equations (82) and (81) into Equation (80). The $UA^{A"}$ terms cancel and the envelope gain (or losses) are similar to the envelope gain (or losses) in Equation (78) with the addition of a new term that incorporates $W^{Attic}$ and the amount of solar radiation:

$$Q^{Envelope\ Gain\ (Loss)} = \left[UA^{Total}(\overline{T}^{Outdoor} - \overline{T}^{Indoor}) + W^{Attic}\overline{Solar}\left(\frac{3{,}412\ \text{Btu}}{1\ \text{kWh}}\right)\right]\Delta t \quad (83)$$

Revised Equation

Substituting the Envelope Gain (Loss) term in Equation (77) with Equation (83) yields:

$$0 = \left[\overbrace{UA^{Total}(\overline{T}^{Outdoor} - \overline{T}^{Indoor}) + W^{Attic}\overline{Solar}\left(\frac{3{,}412\ \text{Btu}}{1\ \text{kWh}}\right)}^{Envelope\ Gain\ (Loss)} + \right.$$
$$\overbrace{(250)\overline{P}}^{Occupancy\ Gain} + \overbrace{\overline{Electric}\left(\frac{3{,}412\ \text{Btu}}{1\ \text{kWh}}\right)}^{Internal\ Electric\ Gain} + \overbrace{W\overline{Solar}\left(\frac{3{,}412\ \text{Btu}}{1\ \text{kWh}}\right)}^{Solar\ Gain} +$$
$$\left.\overbrace{(HeatOrCool)R^{HVAC}\eta^{HVAC}\overline{Status}}^{HVAC\ Gain\ (Loss)}\right]\Delta t + \overbrace{M(T_t^{Indoor} - T_{t+\Delta t}^{Indoor})}^{Thermal\ Mass\ Gain\ (Loss)} \quad (84)$$

Notice that the Envelope Gain (Loss) and Solar Gain terms both have a factor that depends upon the solar resource. The form of the dependence is identical, as both of these terms include an "Effective Window Area" term. Equation (84) can be simplified by collecting like terms, such that:

$$0 = \left[\overbrace{UA^{Total}(\overline{T}^{Outdoor} - \overline{T}^{Indoor})}^{Envelope\ Gain\ (Loss)} + \right. \quad (85)$$
$$\overbrace{(250)\overline{P}}^{Occupancy\ Gain} + \overbrace{\overline{Electric}\left(\frac{3{,}412\ \text{Btu}}{1\ \text{kWh}}\right)}^{Internal\ Electric\ Gain} + \overbrace{\hat{W}\overline{Solar}\left(\frac{3{,}412\ \text{Btu}}{1\ \text{kWh}}\right)}^{Solar\ Gain} +$$
$$\left.\overbrace{(HeatOrCool)R^{HVAC}\eta^{HVAC}\overline{Status}}^{HVAC\ Gain\ (Loss)}\right]\Delta t + \overbrace{M(T_t^{Indoor} - T_{t+\Delta t}^{Indoor})}^{Thermal\ Mass\ Gain\ (Loss)}$$

where $\hat{W} = W + W^{Attic}$.

Discussion

Equation (85) differs from Equation (77) only in that the Effective Window Area W includes the effect of solar heat gain directly through windows and the effect of an increased attic temperature. This observation can be extended to cover heat gain from any other surface, so long as the heat gain is assumed to be proportional to the solar irradiation. Thus, the Effective Window Area W can be interpreted more comprehensively than simply assuming that the effective window area reflects the actual physical window area times a solar heat gain coefficient. Rather, the Effective Window Area W signifies that a certain portion of the solar radiation enters the building through opaque surfaces that can be thought of as having "Effective Window Areas." This situation occurs in portions of a building where the temperature of the surface is greater than the outside temperature, such as in an attic.

Parameter Specification

Implementing Equation (85) requires weather data and building-specific parameters, plus the thermal conductivity of the attic ($UA^{Attic}$) and the effective window area of the attic ($W^{Attic}$), which can both be empirically determined through the short duration tests discussed supra with reference to FIG. 14, or by other means. No modifications are required for these tests since the attic's thermal conductivity cancels out of the equation and the attic's Effective Window Area is directly combined with the existing Effective Window Area. Moreover, since these tests are empirically based, the tests already account for the additional heat gain associated with the elevated attic temperature and other surface temperatures. Thus, when the parameters are empirically based, the previous approach does not need to be modified to be applicable to summer conditions.

Validation

Figure 15:
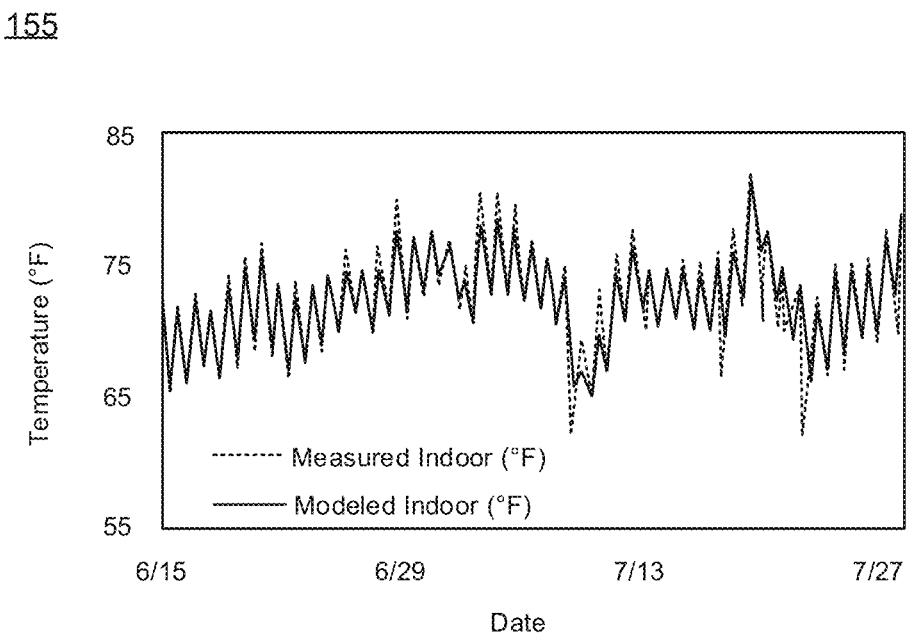
FIG. 15 is a graph showing, by way of example, measured and modeled half-hour indoor temperature from Jun. 15 to Jul. 30, 2015.

Equation (85) was validated using data measured from an inefficient, 125-year old Victorian house located in Napa, CA The house was cooled by two 5-kW AC units. Two temperature monitoring devices were placed upstairs, one monitor was placed downstairs, and one monitor was placed outside. The average indoor temperature was determined by first averaging the two upstairs temperatures and combining the result with the downstairs temperature. Fifteen-minute electricity consumption data was evaluated to determine when the AC units cycled ON and OFF. The parameters of Equation (85) were derived using the approach discussed supra with reference to FIG. 14. Indoor temperature data was then predicted by combining the parameters with half-hour electricity consumption, solar radiation, and outdoor ambient temperature data. FIG. 15 is a graph 155 showing, by way of example, measured and modeled half-hour indoor temperature from Jun. 15 to Jul. 30, 2015. The x-axis is the date. The y-axis is the temperature measured in Fahrenheit. The data depicted in the graph suggests that the modeled indoor temperature fairly reflects the measured temperature with difference between the two temperatures being due to the operation of a whole house fan.

Comparison to Annual Method (First Approach)

Two different approaches to calculating annual fuel consumption are described herein. The first approach, per Equation (34), is a single-line equation that requires six inputs. The second approach, per Equation (63), constructs a time series dataset of indoor temperature and HVAC system status. The second approach considers all of the parameters that are indirectly incorporated into the first approach. The second approach also includes the building's thermal mass and the specified maximum indoor temperature, and requires hourly time series data for the following variables: outdoor temperature, solar resource, internal electricity consumption, and occupancy.

Figure 16:
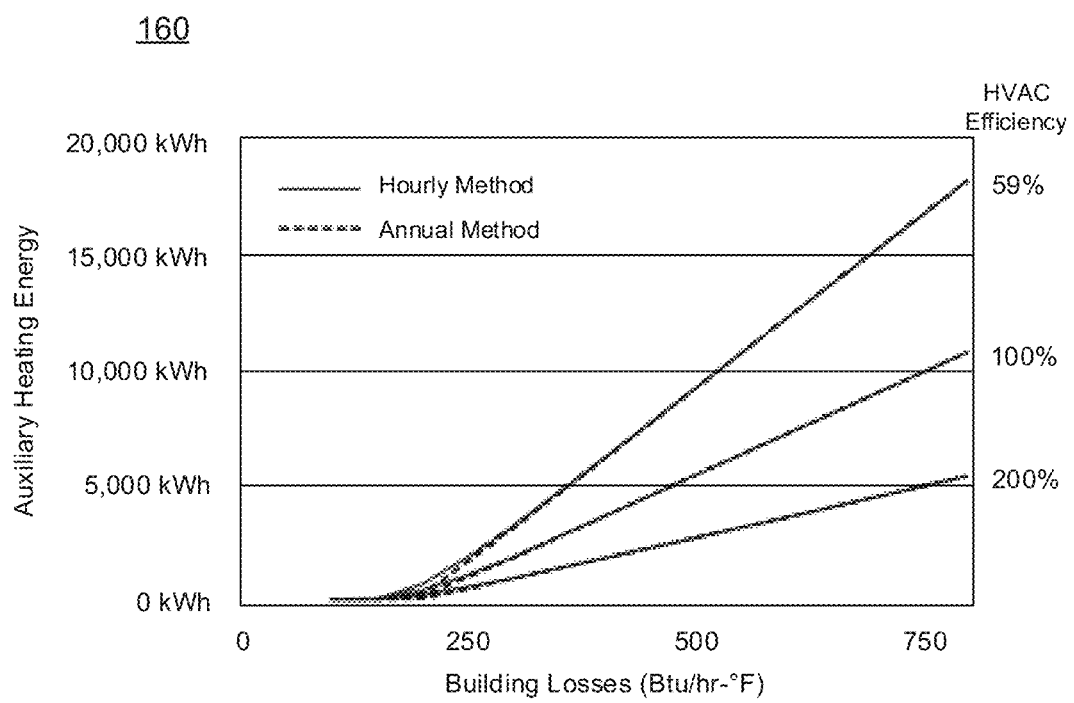
FIG. 16 is a graph showing, by way of example, a comparison of auxiliary heating energy requirements determined by the hourly approach versus the annual approach.

Both approaches were applied to the exemplary case, discussed supra, for the sample house in Napa, CA Thermal mass was 13,648 Btu/° F. and the maximum temperature was set at 72° F. The auxiliary heating energy requirements predicted by the two approaches was then compared. FIG. 16 is a graph 160 showing, by way of example, a comparison of auxiliary heating energy requirements determined by the hourly approach versus the annual approach. The x-axis represents total thermal conductivity, $UA^{Total}$ in units of Btu/hr-° F. They-axis represents total heating energy. FIG. 16 uses the same format as the graph in FIG. 10 by applying a range of scenarios. The red line in the graph corresponds to the results of the hourly method. The dashed black line in the graph corresponds to the annual method. The graph suggests that results are essentially identical, except when the building losses are very low and some of the internal gains are lost due to house overheating, which is prevented in the hourly method, but not in the annual method.

Figure 17:
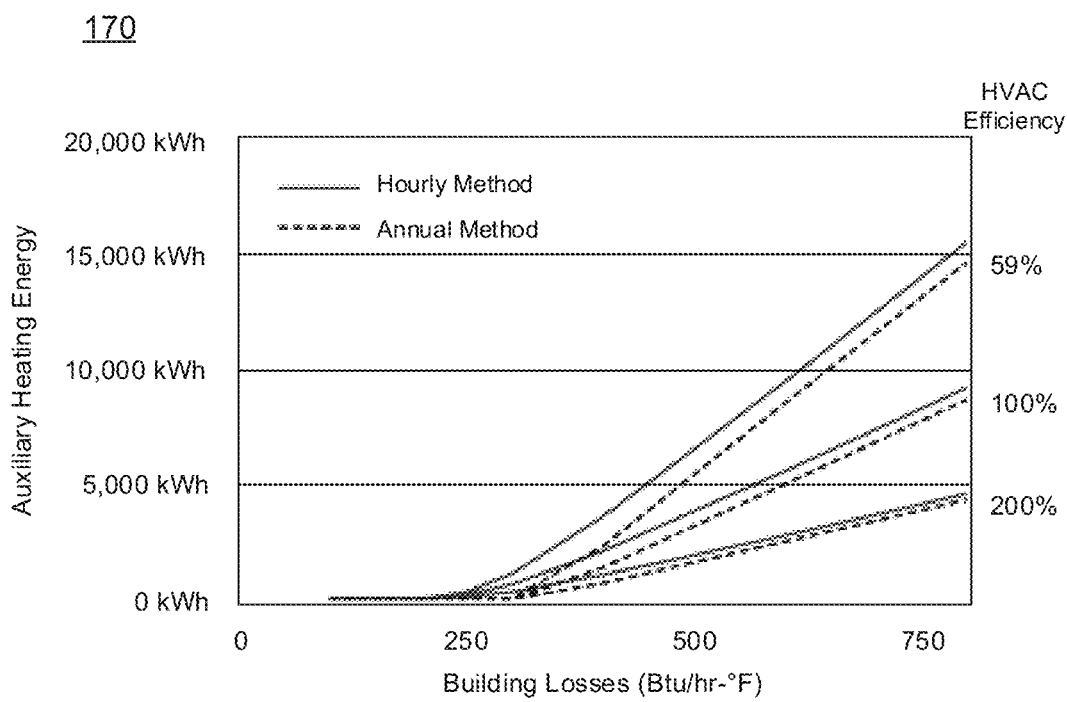
FIG. 17 is a graph showing, by way of example, a comparison of auxiliary heating energy requirements with the allowable indoor temperature limited to 2° F. above desired temperature of 68° F.
Figure 18:
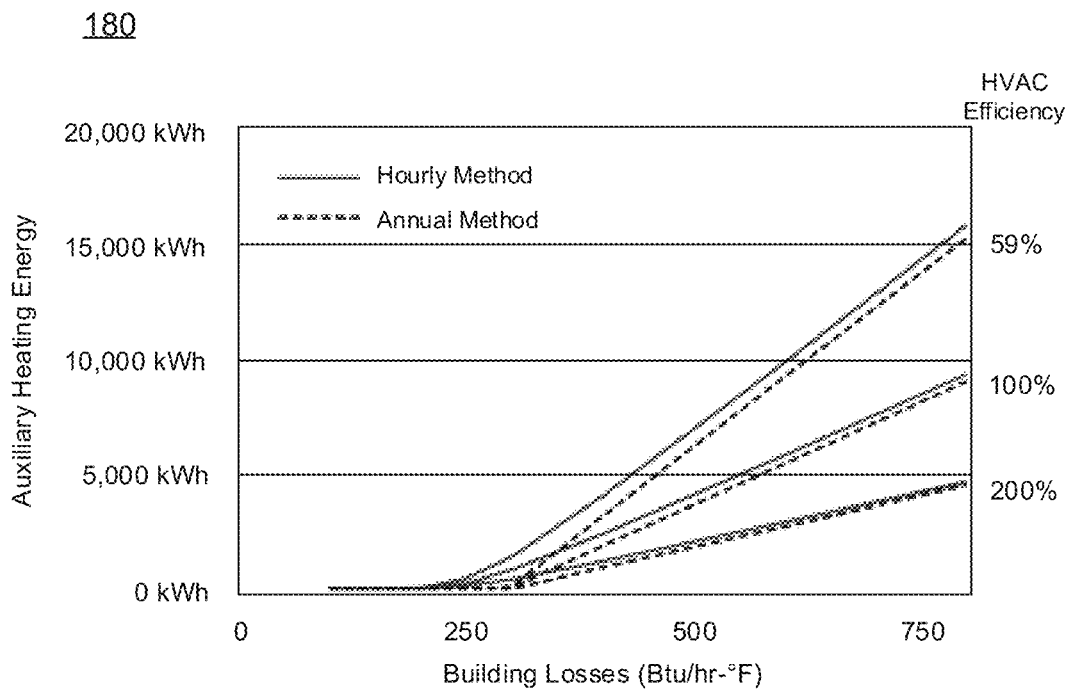
FIG. 18 is a graph showing, by way of example, a comparison of auxiliary heating energy requirements with the size of effective window area tripled from 2.5 m² to 7.5 m².

The analysis was repeated using a range of scenarios with similar results. FIG. 17 is a graph 170 showing, by way of example, a comparison of auxiliary heating energy requirements with the allowable indoor temperature limited to 2° F. above desired temperature of 68° F. Here, the only cases that found any meaningful divergence occurred when the maximum house temperature was very close to the desired indoor temperature. FIG. 18 is a graph 180 showing, by way of example, a comparison of auxiliary heating energy requirements with the size of effective window area tripled from 2.5 m² to 7.5 m². Here, internal gains were large by tripling solar gains and there was insufficient thermal mass to provide storage capacity to retain the gains.

The conclusion is that both approaches yield essentially identical results, except for cases when the house has inadequate thermal mass to retain internal gains (occupancy, electric, and solar).

Example

How to perform the tests described supra using measured data can be illustrated through an example. These tests were performed between 9 PM on Jan. 29, 2015 to 6 AM on Jan. 31, 2015 on a 35 year-old, 3,000 ft² house in Napa, CA This time period was selected to show that all of the tests could be performed in less than a day-and-a-half. In addition, the difference between indoor and outdoor temperatures was not extreme, making for a more challenging situation to accurately perform the tests.

FIG. 19 is a table 190 showing, by way of example, test data. The sub columns listed under "Data" present measured hourly indoor and outdoor temperatures, direct irradiance on a vertical south-facing surface (VDI), electricity consumption that resulted in indoor heat, and average occupancy. Electric space heaters were used to heat the house and the HVAC system was not operated. The first three short-duration tests, described supra, were applied to this data. The specific data used are highlighted in gray. FIG. 20 is a table 200 showing, by way of example, the statistics performed on the data in the table 190 of FIG. 19 required to calculate the three test parameters. $UA^{Total}$ was calculated using the data in the table of FIG. 10 and Equation (52). Thermal Mass (M) was calculated using $UA^{Total}$, the data in the table of FIG. 10, and Equation (53). Effective Window Area (W) was calculated using $UA^{Total}$, M, the data in the table of FIG. 10, and Equation (54).

These test parameters, plus a furnace rating of 100,000 Btu/hour and assumed efficiency of 56%, can be used to generate the end-of-period indoor temperature by substituting them into Equation (56) to yield:

$$T_{t+\Delta t}^{Indoor} = \tag{86}$$
$$T_t^{Indoor} + \left[\frac{1}{18,084}\right]\left[429\left(T_t^{Outdoor} - T_t^{Indoor}\right) + (250)P_t + 3412 \ Electric_t + 11{,}600 \ Solar_t + (1)(100{,}000)(0.56)Status_t\right]\Delta t$$

Figure 22:
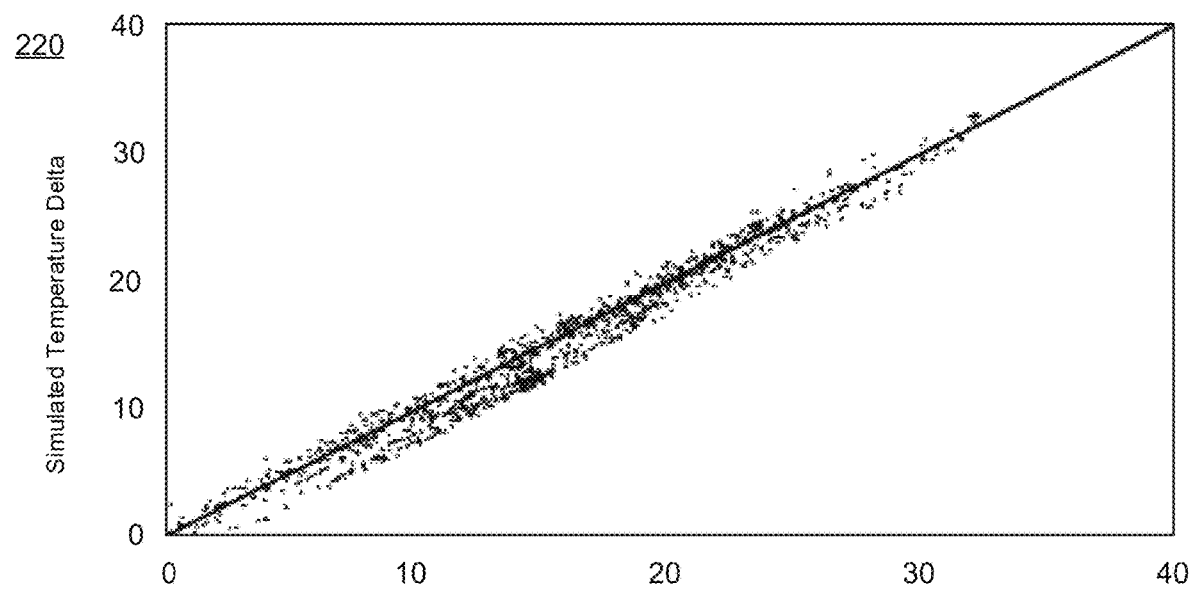
FIG. 22 is a graph showing, by way of example, simulated versus measured hourly temperature delta (indoor minus outdoor).

Indoor temperatures were simulated using Equation (86) and the required measured time series input datasets. Indoor temperature was measured from Dec. 15, 2014 to Jan. 31, 2015 for the test location in Napa, CA The temperatures were measured every minute on the first and second floors of the middle of the house and averaged. FIG. 21 is a graph 210 showing, by way of example, hourly indoor (measured and simulated) and outdoor (measured) temperatures. FIG. 22 is a graph 220 showing, by way of example, simulated versus measured hourly temperature delta (indoor minus outdoor). FIG. 21 and FIG. 22 suggest that the calibrated model is a good representation of actual temperatures.

Energy Consumption Modeling System

Figure 23:
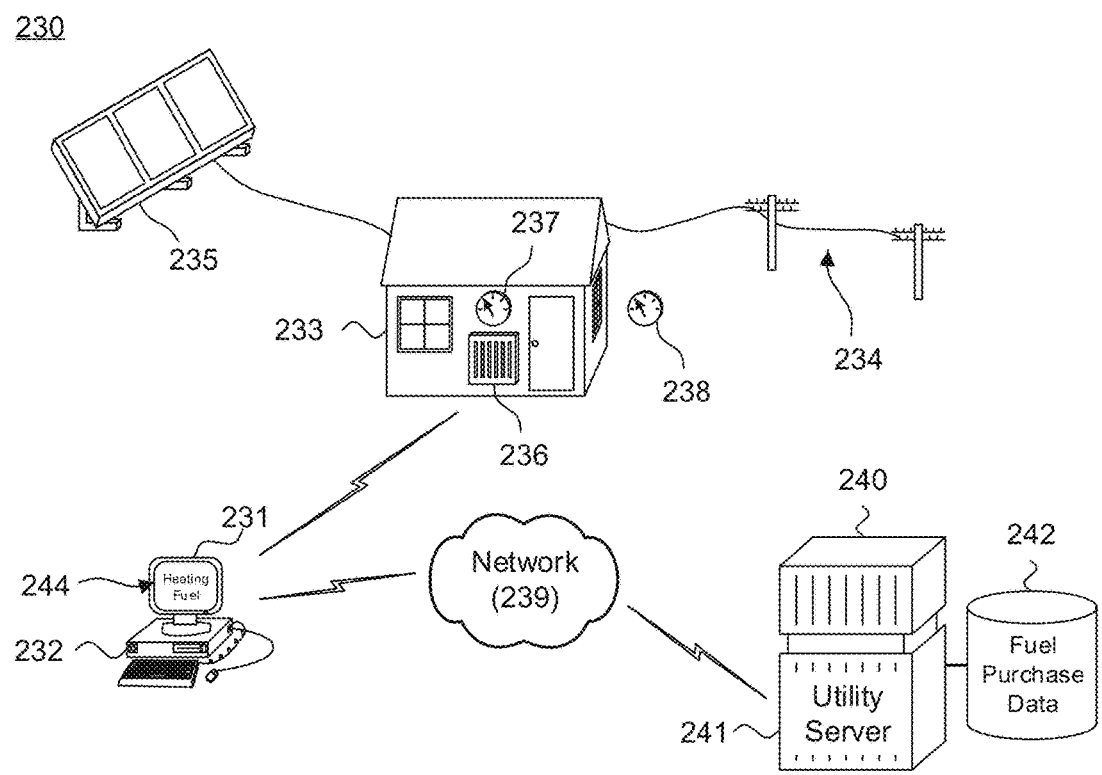
FIG. 23 is a block diagram showing a computer-implemented system for modeling building heating energy consumption in accordance with one embodiment.

Modeling energy consumption for heating (or cooling) on an annual (or periodic) basis, as described supra with reference FIG. 3, and on an hourly (or interval) basis, as described supra beginning with reference to FIG. 12, can be performed with the assistance of a computer, or through the use of hardware tailored to the purpose. FIG. 23 is a block diagram showing a computer-implemented system 230 for modeling building heating energy consumption in accordance with one embodiment. A computer system 231, such as a personal, notebook, or tablet computer, as well as a smartphone or programmable mobile device, can be programmed to execute software programs 232 that operate autonomously or under user control, as provided through user interfacing means, such as a monitor, keyboard, and mouse. The computer system 231 includes hardware components conventionally found in a general purpose programmable computing device, such as a central processing unit, memory, input/output ports, network interface, and non-volatile storage, and execute the software programs 232, as structured into routines, functions, and modules. In addition, other configurations of computational resources, whether provided as a dedicated system or arranged in client-server or peer-to-peer topologies, and including unitary or distributed processing, communications, storage, and user interfacing, are possible.

In one embodiment, to perform the first approach, the computer system 231 needs data on heating losses and heating gains, with the latter separated into internal heating gains (occupant, electric, and solar) and auxiliary heating gains. The computer system 231 may be remotely interfaced with a server 240 operated by a power utility or other utility service provider 241 over a wide area network 239, such as the Internet, from which fuel purchase data 242 can be retrieved. Optionally, the computer system 231 may also monitor electricity 234 and other metered fuel consumption, where the meter is able to externally interface to a remote machine, as well as monitor on-site power generation, such as generated by a photovoltaic system 235. The monitored fuel consumption and power generation data can be used to create the electricity and heating fuel consumption data and historical solar resource and weather data. The computer system 231 then executes a software program 232 to determine annual (or periodic) heating fuel consumption 244 based on the empirical approach described supra with reference to FIG. 3.

In a further embodiment, to assist with the empirical tests performed in the second approach, the computer system 231 can be remotely interfaced to a heating source 236 and a thermometer 237 inside a building 233 that is being analytically evaluated for thermal performance, thermal mass, effective window area, and HVAC system efficiency. In a further embodiment, the computer system 231 also remotely interfaces to a thermometer 238 outside the building 163, or to a remote data source that can provide the outdoor temperature. The computer system 231 can control the heating source 236 and read temperature measurements from the thermometer 237 throughout the short-duration empirical tests. In a further embodiment, a cooling source (not shown) can be used in place of or in addition to the heating source 236. The computer system 231 then executes a software program 232 to determine hourly (or interval) heating fuel consumption 244 based on the empirical approach described supra with reference to FIG. 12.

Applications

The two approaches to estimating energy consumption for heating (or cooling), hourly and annual, provide a powerful set of tools that can be used in various applications. A non-exhaustive list of potential applications will now be discussed. Still other potential applications are possible.

Application to Homeowners Both of the approaches, annual (or periodic) and hourly (or interval), reformulate fundamental building heating (and cooling) analysis in a manner that can divide a building's thermal conductivity into two parts, one part associated with the balance point resulting from internal gains and one part associated with auxiliary heating requirements. These two parts provide that:

Consumers can compare their house to their neighbors' houses on both a total thermal conductivity $UA^{Total}$ basis and on a balance point per square foot basis. These two numbers, total thermal conductivity $UA^{Total}$ and balance point per square foot, can characterize how well their house is doing compared to their neighbors' houses. The comparison could also be performed on a neighborhood- or city-wide basis, or between comparably built houses in a subdivision. Other types of comparisons are possible.

As strongly implied by the empirical analyses discussed supra, heater size can be significantly reduced as the interior temperature of a house approaches its balance point temperature. While useful from a capital cost perspective, a heater that was sized based on this implication may be slow to heat up the house and could require long lead times to anticipate heating needs. Temperature and solar forecasts can be used to operate the heater by application of the two approaches described supra, so as to optimize operation and minimize consumption. For example, if the building owner or occupant knew that the sun was going to start adding a lot of heat to the building in a few hours, he may choose to not have the heater turn on. Alternatively, if the consumer was using a heater with a low power rating, he would know when to turn the heater off to achieve desired preferences.

Application to Building Shell Investment Valuation

The economic value of heating (and cooling) energy savings associated with any building shell improvement in any building has been shown to be independent of building type, age, occupancy, efficiency level, usage type, amount of internal electric gains, or amount solar gains, provided that fuel has been consumed at some point for auxiliary heating. As indicated by Equation (46), the only information required to calculate savings includes the number of hours that define the winter season; average indoor temperature; average outdoor temperature; the building's HVAC system efficiency (or coefficient of performance for heat pump systems); the area of the existing portion of the building to be upgraded; the R-value of the new and existing materials; and the average price of energy, that is, heating fuel. This finding means, for example, that a high efficiency window replacing similar low efficiency windows in two different buildings in the same geographical location for two different customer types, for instance, a residential customer versus an industrial customer, has the same economic value, as long as the HVAC system efficiencies and fuel prices are the same for these two different customers.

This finding vastly simplifies the process of analyzing the value of building shell investments by fundamentally altering how the analysis needs to be performed. Rather than requiring a full energy audit-style analysis of the building to assess any the costs and benefits of a particular energy efficiency investment, only the investment of interest, the building's HVAC system efficiency, and the price and type of fuel being saved are required.

As a result, the analysis of a building shell investment becomes much more like that of an appliance purchase, where the energy savings, for example, equals the consumption of the old refrigerator minus the cost of the new refrigerator, thereby avoiding the costs of a whole house building analysis. Thus, a consumer can readily determine whether an acceptable return on investment will be realized in terms of costs versus likely energy savings. This result could be used in a variety of places:

Direct display of economic impact in ecommerce sites. A Web service that estimates economic value can be made available to Web sites where consumers purchase building shell replacements. The consumer would select the product they are purchasing, for instance, a specific window, and would either specify the product that they are replacing or a typical value can be provided. This information would be submitted to the Web service, which would then return an estimate of savings using the input parameters described supra.

Tools for salespeople at retail and online establishments.

Tools for mobile or door-to-door sales people.

Tools to support energy auditors for immediate economic assessment of audit findings. For example, a picture of a specific portion of a house can be taken and the dollar value of addressing problems can be attached.

Have a document with virtual sticky tabs that show economics of exact value for each portion of the house. The document could be used by energy auditors and other interested parties.

Available to companies interacting with new building purchasers to interactively allow them to understand the effects of different building choices from an economic (and environmental) perspective using a computer program or Internet-based tool.

Enable real estate agents working with customers at the time of a new home purchase to quantify the value of upgrades to the building at the time of purchase.

Tools to simplify the optimization problem because most parts of the problem are separable and simply require a rank ordering of cost-benefit analysis of the various measures and do not require detailed computer models that applied to specific houses.

The time to fix the insulation and ventilation in a homeowner's attic is when during reroofing. This result could be integrated into the roofing quoting tools.

Incorporated into a holistic zero net energy analysis computer program or Web site to take an existing building to zero net consumption.

Integration into tools for architects, builders, designers for new construction or retrofit. Size building features or HVAC system. More windows or less windows will affect HVAC system size.

Application to Thermal Conductivity Analysis

A building's thermal conductivity can be characterized using only measured utility billing data (natural gas and electricity consumption) and assumptions about effective window area, HVAC system efficiency and average indoor building temperature. This test could be used as follows:

Utilities lack direct methods to measure the energy savings associated with building shell improvements. Use this test to provide a method for electric utilities to validate energy efficiency investments for their energy efficiency programs without requiring an on-site visit or the typical detailed energy audit. This method would help to address the measurement and evaluation (M&E) issues currently associated with energy efficiency programs.

HVAC companies could efficiently size HVAC systems based on empirical results, rather than performing Manual J calculations or using rules of thumb. This test could save customers money because Manual J calculations require a detailed energy audit. This test could also save customers capital costs since rules of thumb typically oversize HVAC systems, particularly for residential customers, by a significant margin.

A company could work with utilities (who have energy efficiency goals) and real estate agents (who interact with customers when the home is purchased) to identify and target inefficient homes that could be upgraded at the time between sale and occupancy. This approach greatly reduces the cost of the analysis, and the unoccupied home offers an ideal time to perform upgrades without any inconvenience to the homeowners.

Goals could be set for consumers to reduce a building's heating needs to the point where a new HVAC system is avoided altogether, thus saving the consumer a significant capital cost.

Application to Building Performance Studies

A building's performance can be fully characterized in terms of four parameters using a suite of short-duration (several day) tests. The four parameters include thermal conductivity, that is, heat losses, thermal mass, effective window area, and HVAC system efficiency. An assumption is made about average indoor building temperature. These (or the previous) characterizations could be used as follows:

Utilities could identify potential targets for building shell investments using only utility billing data. Buildings could be identified in a two-step process. First, thermal conductivity can be calculated using only electric and natural gas billing data, making the required assumptions presented supra. Buildings that pass this screen could be the focus of a follow-up, on-site, short-duration test.

The results from this test suite can be used to generate detailed time series fuel consumption data (either natural gas or electricity). This data can be combined with an economic analysis tool, such as the PowerBill service (http://www.cleanpower.com/products/powerbill/), a software service offered by Clean Power Research, L.L.C., Napa, CA, to calculate the economic impacts of the changes using detailed, time-of-use rate structures.

Application to "Smart" Thermostat Users

The results from the short-duration tests, as described supra with reference to FIG. 4, could be combined with measured indoor building temperature data collected using an Internet-accessible thermostat, such as a Nest thermostat device or a Lyric thermostat device, cited supra, or other so-called "smart" thermostat devices, thereby avoiding having to make assumptions about indoor building temperature. The building characterization parameters could then be combined with energy investment alternatives to educate consumers about the energy, economic, and environmental benefits associated with proposed purchases.

While the invention has been particularly shown and described as referenced to the embodiments thereof, those skilled in the art will understand that the foregoing and other changes in form and detail may be made therein without departing from the spirit and scope.

What is claimed is:

1. A system for estimating periodic fuel consumption for cooling of a building with the aid of a digital computer, comprising:
 a non-transitory computer readable storage medium comprising program code;
 a computer interfaced to the storage medium and configured to execute the program code to performs steps to:
 find thermal conductivity of a building and effective window area of the building based on empirical testing of the building over a monitored time frame;
 record a difference between indoor and outdoor temperatures of the building during the monitored time frame;
 define a time span over which to estimate;
 retrieve an average occupancy of the building, average internal electricity consumption in the building, average solar resource of the building as applicable to the building over the monitored time frame; and
 estimate periodic fuel consumption for cooling over the time span based on the building's thermal conductivity, temperature difference, a number of time periods comprised in the time span, average occupancy, average internal electricity consumption, effective window area, and average solar resource in accordance with an equation:

the periodic fuel consumption for cooling =

$$UA^{Total}(T^{Indoor} - T^{Outdoor})(H) - [(C_1)\overline{P} + \overline{Electric}(C_2) + W\overline{Solar}(C_2)](H)$$

where $UA^{Total}$ represents the thermal conductivity, $T^{Indoor}$ represents an average of the indoor temperatures,-

$T^{Outdoor}$ represents an average of the outdoor temperatures, H represents the number of time periods comprised in the time span, $C_1$ represents a conversion factor for occupancy gains, $\overline{P}$ represents the average occupancy, $\overline{Electric}$ represents the average internal electricity consumption, $C_2$ represents a power unit conversion factor, W represents the effective window area, and $\overline{Solar}$ represents the average solar resource as a solar resource produced; and model a change to the periodic fuel consumption based on a proposed change to an envelope of the building comprising receiving an R value of an existing portion of the envelope, receiving an R-value of a proposed replacement for the existing portion of the envelope, determining a change to the thermal conductivity based on replacing the existing portion with the proposed replacement, and modeling a changed periodic fuel consumption in accordance with the equation using the changed thermal conductivity, wherein the proposed change is implemented based on the modeled changed periodic fuel consumption.

$$W = \left\{ \left[ \frac{M(T_{t+\Delta t}^{Indoor} - T_t^{Indoor})}{3,412 \Delta t} \right] - \frac{UA^{Total}(\overline{T}^{Outdoor} - \overline{T}^{Indoor})}{3,412} - \frac{(250)\overline{P}}{3,412} - \overline{Electric} \right\} \left[ \frac{1}{\overline{Solar}} \right]$$

2. A system according to claim 1, further comprising the steps of:
the HVAC system configured to operate in the absence of solar gain into the building during a duration of an empirical test;
the computer further configured to:
observe a change in the indoor temperature between the indoor temperature at the start of the empirical test and the indoor temperature at the end of the empirical test;
determine the indoor temperature as the average indoor temperature of the building over the duration;
determine the outdoor temperature as the average outdoor temperature of the building over the duration;
determine the internal electricity consumption as the average internal electricity consumption over the duration;
determine the average occupancy as observed in the building during the duration;
determine the solar resource produced over the duration; and
determine a status of the HVAC system of the building as observed in the building during the duration; and
find an efficiency of the HVAC system as a function of a thermal mass of the building and the change in the indoor temperature, the thermal conductivity and the temperature difference, the average occupancy, and the average internal electricity consumption, all divided by a rating of the HVAC system and the status of the HVAC system.

3. A system according to claim 2, the computer further configured to:
find the efficiency of the HVAC system $\eta^{HVAC}$ of the building in accordance with:

$$\eta^{HVAC} = \left[ \frac{M(T_{t+\Delta t}^{Indoor} - T_t^{Indoor})}{\Delta t} - UA^{Total}(\overline{T}^{Indoor} - \overline{T}^{Outdoor}) - (C_1)\overline{P} - \overline{Electric}(C_2) \right] \left[ \frac{1}{HeatOrCoolR^{HVAC}\overline{Status}} \right]$$

where M represents the thermal mass, t represents the time at the beginning of the empirical test, $\Delta t$ represents the duration, $T_{t+\Delta t}^{Indoor}$ represents the ending indoor temperature, $T_t^{Indoor}$ represents the starting indoor temperature, $UA^{Total}$ represents the thermal conductivity, $\overline{T}^{Indoor}$ represents the average indoor temperature, $\overline{T}^{Outdoor}$ represents the average outdoor temperature, $C_1$ represents a conversion factor for occupant heating gains, $\overline{P}$ represents the average number of occupants, $\overline{Electric}$ represents average electricity consumption, $C_2$ represents a conversion factor for non-HVAC electric heating gains, $\overline{Status}$ represents an average status of the HVAC system system during the empirical test, HeatOrCool is a binary number that is 1 in the heating season and −1 in the cooling season, and $R^{HVAC}$ represents the rating of the HVAC system.

4. A system according to claim 2, the computer further configured to:
find effective window area W of the building in accordance with:

where M represents the thermal mass, t represents the time at the beginning of the empirical test, $\Delta t$ represents the duration of the empirical test, $T_{t+\Delta t}^{Indoor}$ represents the ending indoor temperature, and $T_t^{Indoor}$ represents the starting indoor temperature, $UA^{Total}$ represents the thermal conductivity, $\overline{T}^{Indoor}$ represents the average indoor temperature, $\overline{T}^{Outdoor}$ represents the average outdoor temperature, $\overline{P}$ represents the average number of occupants during the empirical test, $\overline{Electric}$ represents average electricity consumption during the empirical test, and $\overline{Solar}$ represents the average solar energy produced during the empirical test.

5. A system according to claim 2, the computer further configured to:
find the thermal mass M of the building in accordance with:

$$M = \left[ \frac{UA^{Total}(\overline{T}^{Outdoor} - \overline{T}^{Indoor}) + (250)\overline{P} + \overline{Electric}\left(\frac{3,412 \text{ Btu}}{1 \text{ kWh}}\right)}{(T_{t+\Delta t}^{Indoor} - T_t^{Indoor})} \right] \Delta t$$

where $UA^{Total}$ represents the thermal conductivity, $\overline{T}^{Indoor}$ represents the average indoor temperature during the empirical test, $\overline{T}^{Outdoor}$ represents the average outdoor temperature during the empirical test, $\overline{P}$ represents the average number of occupants during the empirical test, $\overline{Electric}$ represents average indoor electricity consumption during the empirical test, t represents the time at the beginning of the empirical test, $\Delta t$ represents the duration of the empirical test, $T_{t+\Delta t}^{Indoor}$ represents the ending indoor temperature, $T_t^{Indoor}$ represents the starting indoor temperature, and $T_{t+\Delta t}^{Indoor} \neq T_t^{Indoor}$.

6. A system according to claim 2, the computer further configured to:
find the thermal conductivity $UA^{Total}$ of the building in accordance with:

$$UA^{Total} = \frac{\left[(250)\overline{P} + \overline{Electric}\left(\frac{3,412 \text{ Btu}}{1 \text{ kWh}}\right)\right]}{\left(\overline{T}^{Indoor} - \overline{T}^{Outdoor}\right)}$$

where $\overline{T}^{Indoor}$ represents the average indoor temperature during the empirical test, $\overline{T}^{Outdoor}$ represents the average outdoor temperature during the empirical test, $\overline{P}$ represents the average number of occupants during the empirical test, and $\overline{Electric}$ represents average indoor electricity consumption during the empirical test.

7. A system according to claim 1, the computer further configured to remotely interface to a thermometer located outside the building to obtain the outdoor temperatures.

8. A system according to claim 1, the computer further configured to remotely interface to a thermometer inside the building to obtain the indoor temperatures.

9. A method for estimating periodic fuel consumption for cooling of a building with the aid of a digital computer, comprising the steps of:
finding thermal conductivity of a building and effective window area of the building with involvement of a computer through empirical testing of the building over a monitored time frame, the empirical test comprising remotely controlling by the computer at least one of a heating source and a cooling source inside the building;
recording with involvement of the computer a difference between indoor and outdoor temperatures of the building during the monitored time frame;
defining with the computer a time span over which to estimate;
retrieving with the computer an average occupancy of the building, average internal electricity consumption of the building, and average solar resource of the building as applicable to the building over the monitored time frame; and
estimating with the computer the periodic fuel consumption for cooling over the time span based on the building's thermal conductivity, temperature difference, a number of time periods comprised in the time span, average occupancy, average internal electricity consumption, effective window area, and average solar resource in accordance with an equation:

the periodic fuel consumption for cooling =

$$UA^{Total}\left(\overline{T}^{Indoor} - \overline{T}^{Outdoor}\right)(H) - \left[(C_1)\overline{P} + \overline{Electric}(C_2) + W\overline{Solar}(C_2)\right](H)$$

where $UA^{Total}$ represents the thermal conductivity, $\overline{T}^{Indoor}$ represents an average of the indoor temperatures, $\overline{T}^{Outdoor}$ represents an average of the outdoor temperatures, H represents the number of time periods comprised in the time span, $C_1$ represents a conversion factor for occupancy gains, $\overline{P}$ represents the average occupancy, $\overline{Electric}$ represents the average internal electricity consumption, $C_2$ represents a power unit conversion factor, W represents the effective window area, and $\overline{Solar}$ represents the average solar resource as a solar resource produced; and modeling a change to the periodic fuel consumption based on a proposed change to an envelope of the building comprising receiving an R value of an existing portion of the envelope, receiving an R-value of a proposed replacement for the existing portion of the envelope, determining a change to the thermal conductivity based on replacing the existing portion with the proposed replacement, and modeling a changed periodic fuel consumption in accordance with the equation using the changed thermal conductivity, wherein the proposed change is implemented based on the modeled changed periodic fuel consumption.

10. A method according to claim 9, further comprising the steps of:
performing an empirical test over a short duration during which the HVAC system is operated in the absence of solar gain into the building, comprising the steps of:
observing a change in the indoor temperature between the indoor temperature at the start of the empirical test and the indoor temperature at the end of the empirical test;
determining the indoor temperature as the average indoor temperature of the building over the duration;
determining the outdoor temperature as the average outdoor temperature of the building over the duration;
determining the internal electricity consumption as the average internal electricity consumption over the duration;
determining the average occupancy as observed in the building during the duration;
determining the solar resource produced over the duration; and
determining a status of an HVAC system of the building as observed in the building during the duration; and
finding an efficiency of the HVAC system as a function of a thermal mass of the building and the change in the indoor temperature, the thermal conductivity and the temperature difference, the average occupancy, and the average internal electricity consumption, all divided by a rating of the HVAC system and the status of the HVAC system.

11. A method according to claim 10, further comprising the step of:
finding the efficiency of the HVAC system $\eta^{HVAC}$ of the building in accordance with:

$$\eta^{HVAC} = \left[\frac{M\left(T_{t+\Delta t}^{Indoor} - T_t^{Indoor}\right)}{\Delta t} - UA^{Total}\left(\overline{T}^{Indoor} - \overline{T}^{Outdoor}\right) - (C_1)\overline{P} - \overline{Electric}(C_2)\right]\left[\frac{1}{HeatOrCoolR^{HVAC}\overline{Status}}\right]$$

where M represents the thermal mass, t represents the time at the beginning of the empirical test, $\Delta t$ represents the duration, $T_{t+\Delta t}^{Indoor}$ represents the ending indoor temperature, $T_t^{Indoor}$ represents the starting indoor temperature, $UA^{Total}$ represents the thermal conductivity, $\overline{T}^{Indoor}$ represents the average indoor temperature, $\overline{T}^{Outdoor}$ represents the average outdoor temperature, $C_1$ represents a conversion factor for occupant heating gains, $\overline{P}$ represents the average number of occupants, $\overline{Electric}$ represents average electricity consumption, $C_2$ represents a conversion factor for non-HVAC electric heating gains, $\overline{Status}$ represents an average operation status of the HVAC system during the empirical test, HeatOrCool is a binary number that is 1 in the heating season and −1 in the cooling season, and $R^{HVAC}$ presents the rating of the HVAC system.

12. A method according to claim 10, further comprising the step of:
finding the effective window area W of the building in accordance with:

$$W = \left\{\left[\frac{M(T_{t+\Delta t}^{Indoor} - T_t^{Indoor})}{3{,}412\Delta t}\right] - \frac{UA^{Total}(\overline{T}^{Outdoor} - \overline{T}^{Indoor})}{3{,}412} - \frac{(250)\overline{P}}{3{,}412} - \overline{Electric}\right\}\left[\frac{1}{\overline{Solar}}\right]$$

where M represents the thermal mass, t represents the time at the beginning of the empirical test, $\Delta t$ represents the duration of the empirical test, $T_{t+\Delta t}^{Indoor}$ represents the ending indoor temperature, and $T_t^{Indoor}$ represents the starting indoor temperature, $UA^{Total}$ represents the thermal conductivity, $\overline{T}^{Indoor}$ represents the average indoor temperature, $\overline{T}^{Outdoor}$ represents the average outdoor temperature, $\overline{P}$ represents the average number of occupants during the empirical test, $\overline{Electric}$ represents average electricity consumption during the empirical test, and $\overline{Solar}$ represents the average solar energy produced during the empirical test.

13. A method according to claim 10, further comprising the steps of:
finding the thermal mass M of the building in accordance with:

$$M = \left[\frac{UA^{Total}(\overline{T}^{Outdoor} - \overline{T}^{Indoor}) + (250)\overline{P} + \overline{Electric}\left(\frac{3{,}412 \text{ Btu}}{1 \text{ kWh}}\right)}{(T_{t+\Delta t}^{Indoor} - T_t^{Indoor})}\right]\Delta t$$

where $UA^{Total}$ represents the thermal conductivity, $\overline{T}^{Indoor}$ represents the average indoor temperature during the empirical test, $\overline{T}^{Outdoor}$ represents the average outdoor temperature during the empirical test, $\overline{P}$ represents the average number of occupants during the empirical test, $\overline{Electric}$ represents average indoor electricity consumption during the empirical test, t represents the time at the beginning of the empirical test, $\Delta t$ represents the duration of the empirical test, $T_{t+\Delta t}^{Indoor}$ represents the ending indoor temperature, $T_t^{Indoor}$ represents the starting indoor temperature, and $T_{t+\Delta t}^{Indoor} \neq T_t^{Indoor}$.

14. A method according to claim 10, further comprising the steps of:
finding the thermal conductivity $UA^{Total}$ of the building in accordance with:

$$UA^{Total} = \frac{\left[(250)\overline{P} + \overline{Electric}\left(\frac{3{,}412 \text{ Btu}}{1 \text{ kWh}}\right)\right]}{(\overline{T}^{Indoor} - \overline{T}^{Outdoor})}$$

where $\overline{T}^{Indoor}$ represents the average indoor temperature during the empirical test, $\overline{T}^{Outdoor}$ represents the average outdoor temperature during the empirical test, $\overline{P}$ represents the average number of occupants during the empirical test, and $\overline{Electric}$ represents average indoor electricity consumption during the empirical test.

15. A method according to claim 9, further comprising the step of:
remotely interfacing by the computer to a thermometer located outside the building to obtain the outdoor temperatures.

16. A method according to claim 9, further comprising the step of:
remotely interfacing by the computer to a thermometer inside the building to obtain the indoor temperatures.

\* \* \* \* \*